US012337643B2

(12) United States Patent
Scheuerell et al.

(10) Patent No.: US 12,337,643 B2
(45) Date of Patent: Jun. 24, 2025

(54) REAR SUSPENSION ASSEMBLY FOR A VEHICLE

(71) Applicant: Polaris Industries Inc., Medina, MN (US)

(72) Inventors: Alex R. Scheuerell, Wyoming, MN (US); David D. Helgeson, Vadnais Heights, MN (US); Aaron S. Norton, Oak Grove, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/631,289

(22) Filed: Apr. 10, 2024

(65) Prior Publication Data

US 2025/0001821 A1 Jan. 2, 2025

Related U.S. Application Data

(63) Continuation of application No. 17/972,225, filed on Oct. 24, 2022, now Pat. No. 11,958,331.

(60) Provisional application No. 63/282,368, filed on Nov. 23, 2021.

(51) Int. Cl.
B60G 3/20 (2006.01)
B62D 21/11 (2006.01)

(52) U.S. Cl.
CPC ............... *B60G 3/20* (2013.01); *B62D 21/11* (2013.01); *B60G 2204/148* (2013.01)

(58) Field of Classification Search
CPC ..... B60G 3/20; B60G 2204/148; B62D 21/11
See application file for complete search history.

(56) References Cited

U.S. PATENT DOCUMENTS

| 5,203,585 | A | * | 4/1993 | Pierce | B60G 11/64 |
| | | | | | 280/228 |
| 8,764,039 | B2 | | 7/2014 | Keller et al. | |
| 9,469,173 | B2 | * | 10/2016 | Murray | B60G 3/202 |
| 9,981,519 | B2 | | 5/2018 | Despres-Nadeau et al. | |
| 10,207,554 | B2 | | 2/2019 | Schroeder et al. | |
| 10,464,386 | B2 | | 11/2019 | Hisada et al. | |
| 11,958,331 | B2 | * | 4/2024 | Scheuerell | B60G 7/008 |
| 2018/0147902 | A1 | | 5/2018 | Hu et al. | |
| 2019/0193501 | A1 | * | 6/2019 | Brady | B60G 3/202 |
| 2019/0291521 | A1 | | 9/2019 | Sawai et al. | |
| 2023/0158848 | A1 | | 5/2023 | Scheuerell et al. | |

* cited by examiner

Primary Examiner — Jason D Shanske
Assistant Examiner — Matthew James O'Neill
(74) Attorney, Agent, or Firm — SCHWEGMAN LUNDBERG & WOESSNER, P.A.

(57) ABSTRACT

A utility vehicle includes a rear suspension assembly which has a trailing arm generally extending longitudinally. The trailing arm includes a joint along a longitudinal length of the trailing arm. Also, the rear suspension assembly includes an upper radius rod extending in a generally lateral direction relative to a centerline of the vehicle. Additionally, the rear suspension assembly includes a lower radius rod extending in a generally lateral direction relative to the centerline of the vehicle. The rear suspension assembly further includes a suspension member configured to control toe of the at least one rear ground-engaging member.

19 Claims, 77 Drawing Sheets

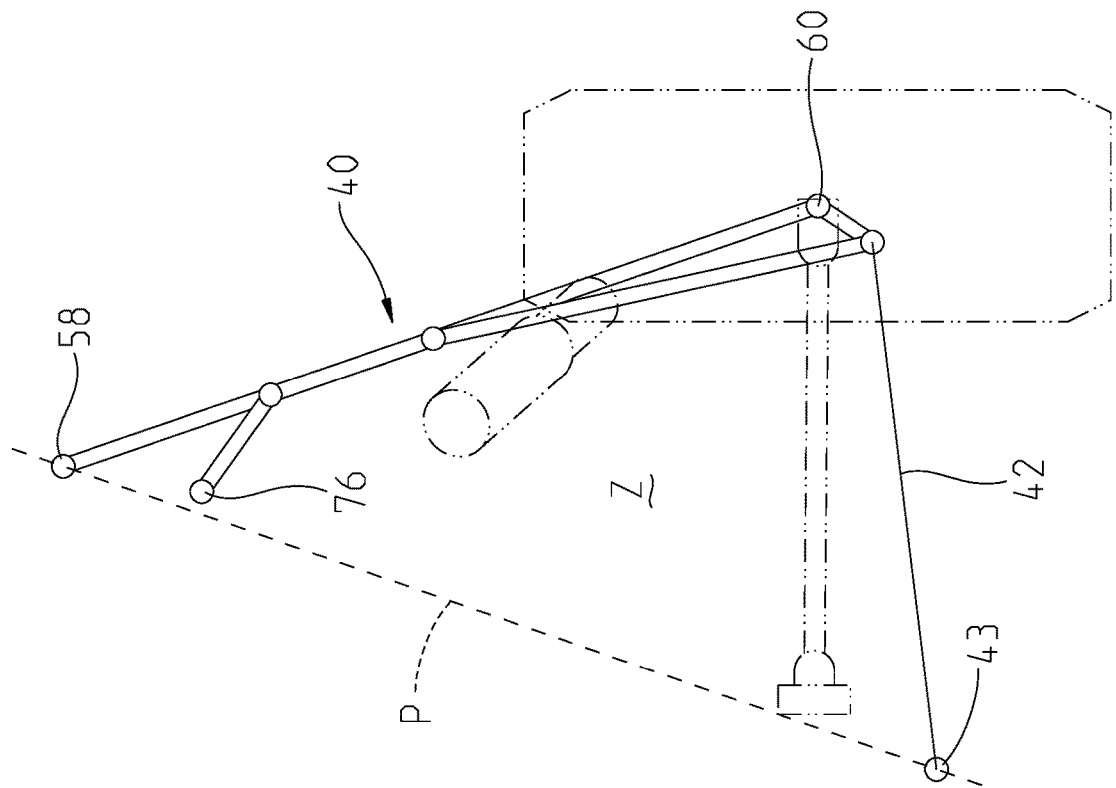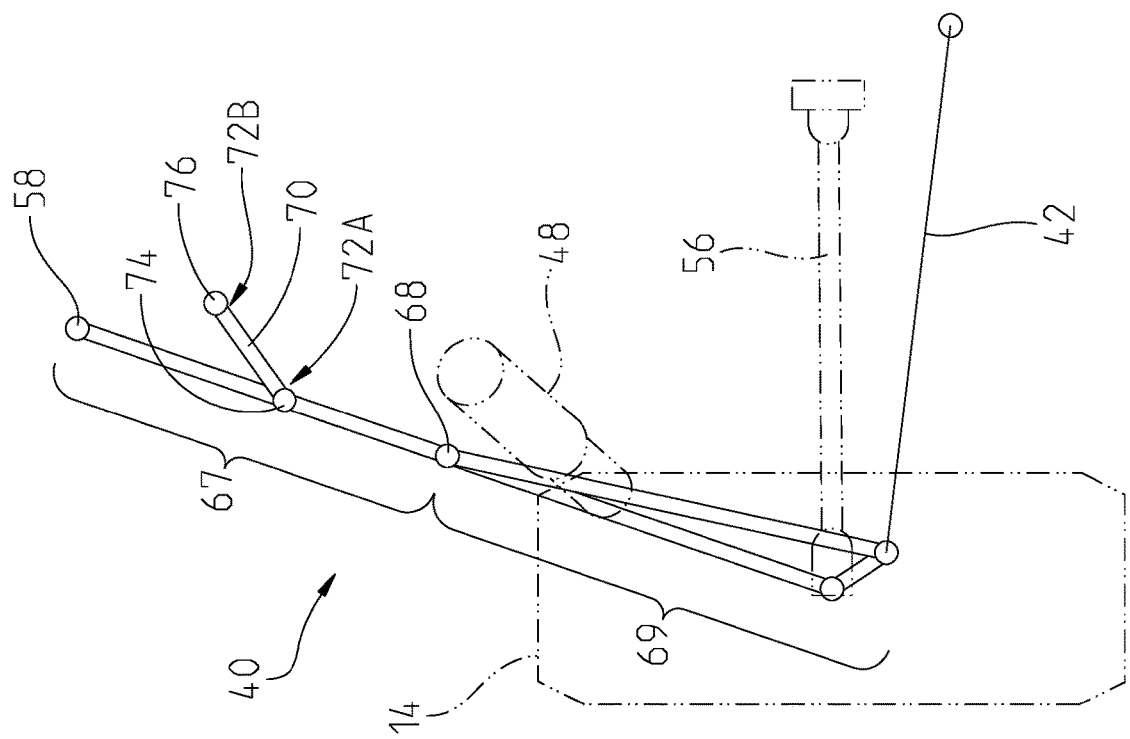
Fig. 11

REAR SUSPENSION ASSEMBLY FOR A VEHICLE

CROSS-REFERENCE TO RELATED APPLICATIONS

The present application is a continuation of U.S. patent application Ser. No. 17/972,225, filed Oct. 24, 2022, which claims priority to U.S. Provisional Patent Application No. 63/282,368, filed Nov. 23, 2021, the entire disclosure of which is incorporated herein by reference.

FIELD OF THE DISCLOSURE

The present disclosure relates to a rear suspension assembly for a utility vehicle and, more particularly, to a rear suspension assembly including a suspension member configured to control toe of the rear ground-engaging members during suspension travel.

BACKGROUND OF THE DISCLOSURE

On-road and off-road vehicles include a rear suspension assembly. For example, in the context of off-road vehicles, various embodiments of a rear suspension assembly may include trailing arms which generally extend in a forward-aft direction and control arms or radius rods which generally extend in a lateral direction.

However, despite the inclusion of a trailing arm and/or radius rod, the rear wheel may toe in or toe out when the vehicle rebounds or at full compression, and through the full travel of the suspension. In this way, the vehicle may not rebound with the rear wheels facing in the longitudinal direction. As such, there is a need for a rear suspension assembly which decreases the toe change, especially when the vehicle rebounds and when the rear suspension assembly is at a full compression position.

SUMMARY OF THE DISCLOSURE

According to an illustrative embodiment of the present disclosure, a utility vehicle includes a frame assembly extending longitudinally along a centerline of the vehicle; at least one front ground-engaging member supporting the frame assembly; at least one rear ground-engaging member supporting the frame assembly; and a rear suspension assembly operably coupled to the frame assembly and the at least one rear ground-engaging member, the rear suspension assembly including a trailing arm generally extending longitudinally and operably coupled to the frame assembly and the at least one rear ground-engaging member, the trailing arm including a joint along a longitudinal length of the trailing arm; an upper radius rod extending in a generally lateral direction relative to the centerline of the vehicle and operably coupled to the trailing arm; a lower radius rod extending in the generally lateral direction relative to the centerline of the vehicle and operably coupled to the trailing arm; and a suspension member configured to control toe of the at least one rear ground-engaging member and operably coupled to the trailing arm and to the frame assembly.

In a further embodiment, the suspension member is operably coupled to the trailing arm forward of the joint.

In a further embodiment, the suspension member is operably coupled to the trailing arm rearward of the joint.

In a further embodiment, the suspension member includes a first link positioned at least partially forward of a longitudinal midpoint of the at least one ground engaging member and a second link positioned at least partially rearward of the longitudinal midpoint of the at least one ground engaging member, the suspension member being coupled to the first link forward of the a longitudinal midpoint of the at least one ground engaging member In a further embodiment, the suspension member is operably coupled to the trailing arm at the joint.

In a further embodiment, the joint includes one degree of freedom.

In a further embodiment, the joint includes a substantially vertical axis of rotation.

In a further embodiment, the rear suspension assembly includes a shock absorber having an upper end operably coupled to the frame assembly and a lower end operably coupled to the trailing arm rearward of the joint.

According to an illustrative embodiment of the present disclosure, a utility vehicle includes a frame assembly extending longitudinally along a centerline of the vehicle; at least one front ground-engaging member supporting the frame assembly; at least one rear ground-engaging member supporting the frame assembly; and a rear suspension assembly operably coupled to the frame assembly and the at least one rear ground-engaging member, the rear suspension assembly comprising a trailing arm generally extending longitudinally and including a front end operably coupled to the frame assembly and a rear end operably coupled to the at least one rear ground-engaging member; an upper radius rod extending in a generally lateral direction relative to the centerline of the vehicle and including an outside end operably coupled to the trailing arm and an inside end extending toward the centerline of the vehicle; a lower radius rod extending in the generally lateral direction relative to the centerline of the vehicle and operably coupled to the trailing arm; and a suspension member configured to control toe of the at least one rear ground-engaging member and operably coupled to the trailing arm and to the frame assembly at positions within a zone defined by the trailing arm, the upper radius rod, and a plane defined between the front end of the trailing arm and the inner end of the upper radius rod as viewed from above.

In a further embodiment, a distance between a position at which the suspension member 70 is coupled to the frame and a nearest point on the plane P is about 1:12 of a distance from the front end of the trailing arm and the inner end of the upper radius rod which define the plane P.

In a further embodiment, the trailing arm includes a first longitudinal portion and a second longitudinal portion, the first and second longitudinal portions are pivotable relative to each other at a joint.

In a further embodiment, the joint includes one degree of freedom.

In a further embodiment, the joint defines a substantially vertical pivot axis.

In a further embodiment, the suspension member is coupled to the first longitudinal portion of the trailing arm.

In a further embodiment, the suspension member is coupled to the second longitudinal portion of the trailing arm.

In a further embodiment, the suspension member includes a first link positioned at least partially forward of a longitudinal midpoint of the at least one ground engaging member and a second link positioned at least partially rearward of the longitudinal midpoint of the at least one ground engaging member, the suspension member being coupled to the first link forward of the a longitudinal midpoint of the at least one ground engaging member In a further embodiment, the suspension member is coupled to the trailing arm at the joint.

In a further embodiment, at least one rear ground-engaging member includes a knuckle, the trailing arm and the upper and lower radius rods being coupled to the knuckle.

In a further embodiment, the second longitudinal portion of the trailing arm is angled relative to the centerline of the vehicle at a fixed angle and the rear suspension assembly is operable to maintain the second longitudinal portion at the fixed angle relative to the centerline of the vehicle through travel of the rear suspension assembly.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings.

FIG. 11 is a top view of the rear suspension assembly of FIG. 8;

Figure 1:
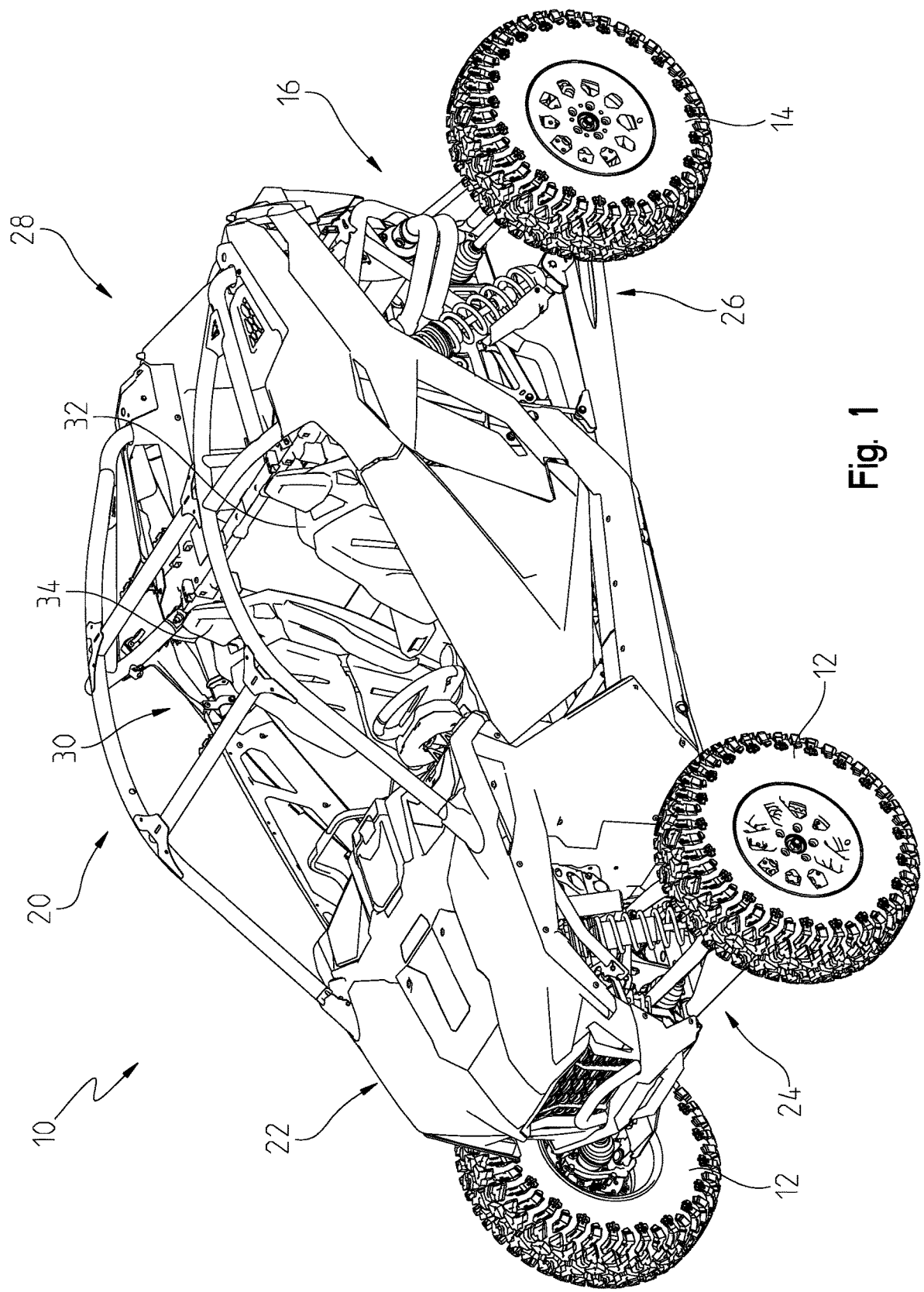
FIG. 1 is a front left perspective view of a utility vehicle of the present disclosure.

Corresponding reference characters indicate corresponding parts throughout the several views. Although the drawings represent embodiments of the present invention, the some of the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to utility vehicles, certain features described herein may be applied to other applications such as all-terrain vehicles, snowmobiles, motorcycles, mopeds, etc.

Referring to FIG. 1, an illustrative embodiment of a utility vehicle 10 is shown which is configured to traverse a variety of terrains, including mud, rocks, dirt, and other trail or off-road conditions. The vehicle 10 may be referred to as a utility vehicle ("UV"), an all-terrain vehicle ("ATV"), or a side-by-side vehicle ("SxS") and is configured for travel over various terrains or surfaces. More particularly, the vehicle 10 may be configured for military, industrial, agricultural, or recreational applications.

Figure 3:
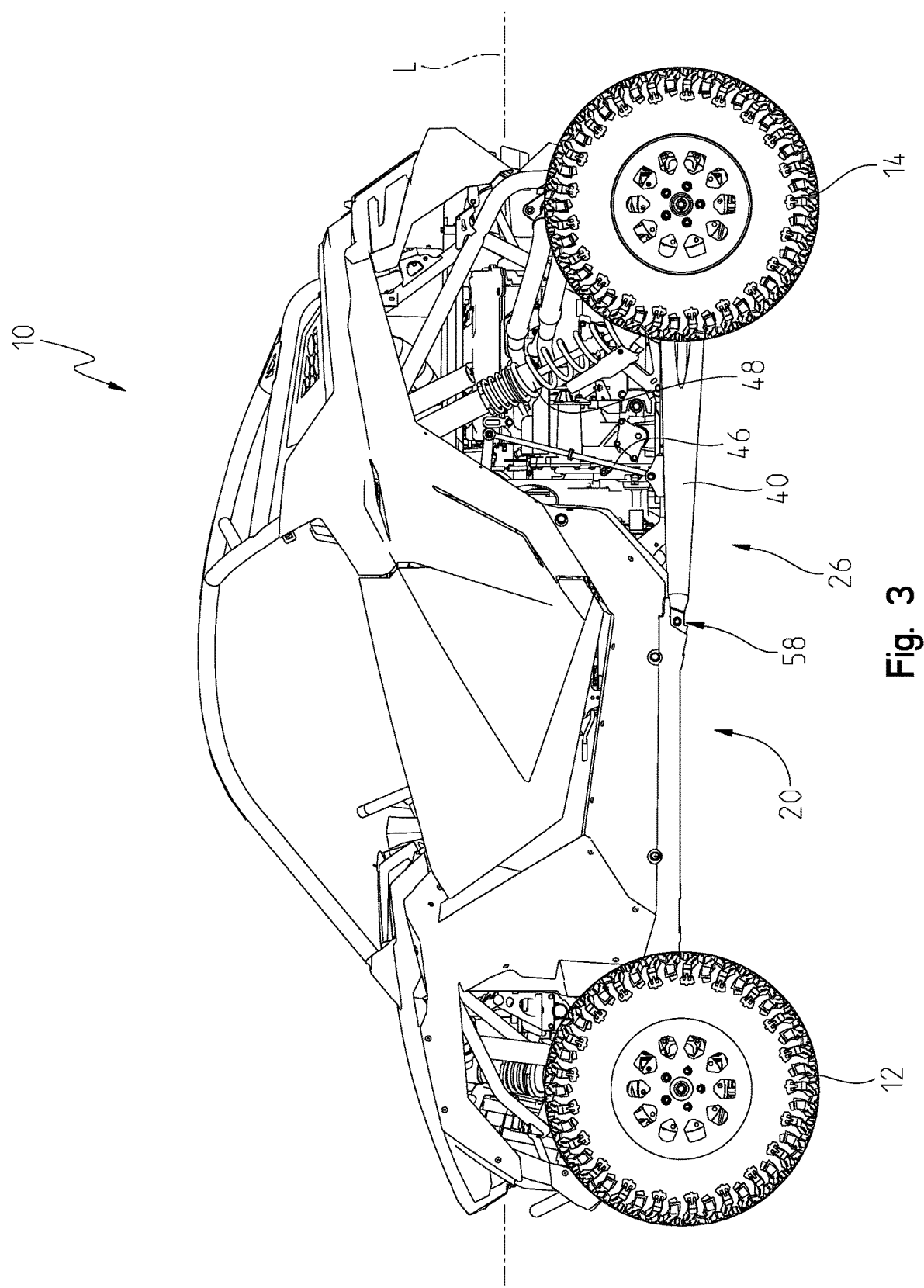
FIG. 3 is a left side view of the vehicle of FIG. 1.

The vehicle 10 includes a plurality of ground-engaging members, including front ground-engaging members 12 (e.g., front wheels) and rear-ground engaging members 14 (e.g., rear wheels), a powertrain assembly 16, a frame assembly 20, a plurality of body panels 22 coupled to frame assembly 20, a front suspension assembly 24 supported by a front portion of frame assembly 20, a rear suspension assembly 26 supported by a rear portion of frame assembly 20, and a rear cargo area 28 supported by the rear portion of frame assembly 20. As shown in FIG. 1, the vehicle 10 extends between the front and rear ground-engaging members 12, 14 in a longitudinal direction along a longitudinal vehicle centerline L (FIG. 3). A prop shaft or other mechanism may extend between various components of the powertrain assembly 16 to provide motive power to the front and/or rear ground-engaging members 12, 14.

In one embodiment, one or more ground-engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein.

Referring still to FIG. 1, the vehicle 10 includes an operator area 30 supported by frame assembly 20 and which includes seating for at least an operator and a passenger. Illustratively, one embodiment of the vehicle 10 includes an operator seat 32 and a front passenger seat 34. More particularly, the operator seat 32 and front passenger seat 34 are in a side-by-side arrangement. The operator seat 32 includes a seat bottom, illustratively a bucket seat, and a seat back. Similarly, the front passenger seat 34 includes a seat bottom, illustratively a bucket seat, and a seat back.

Figure 2:
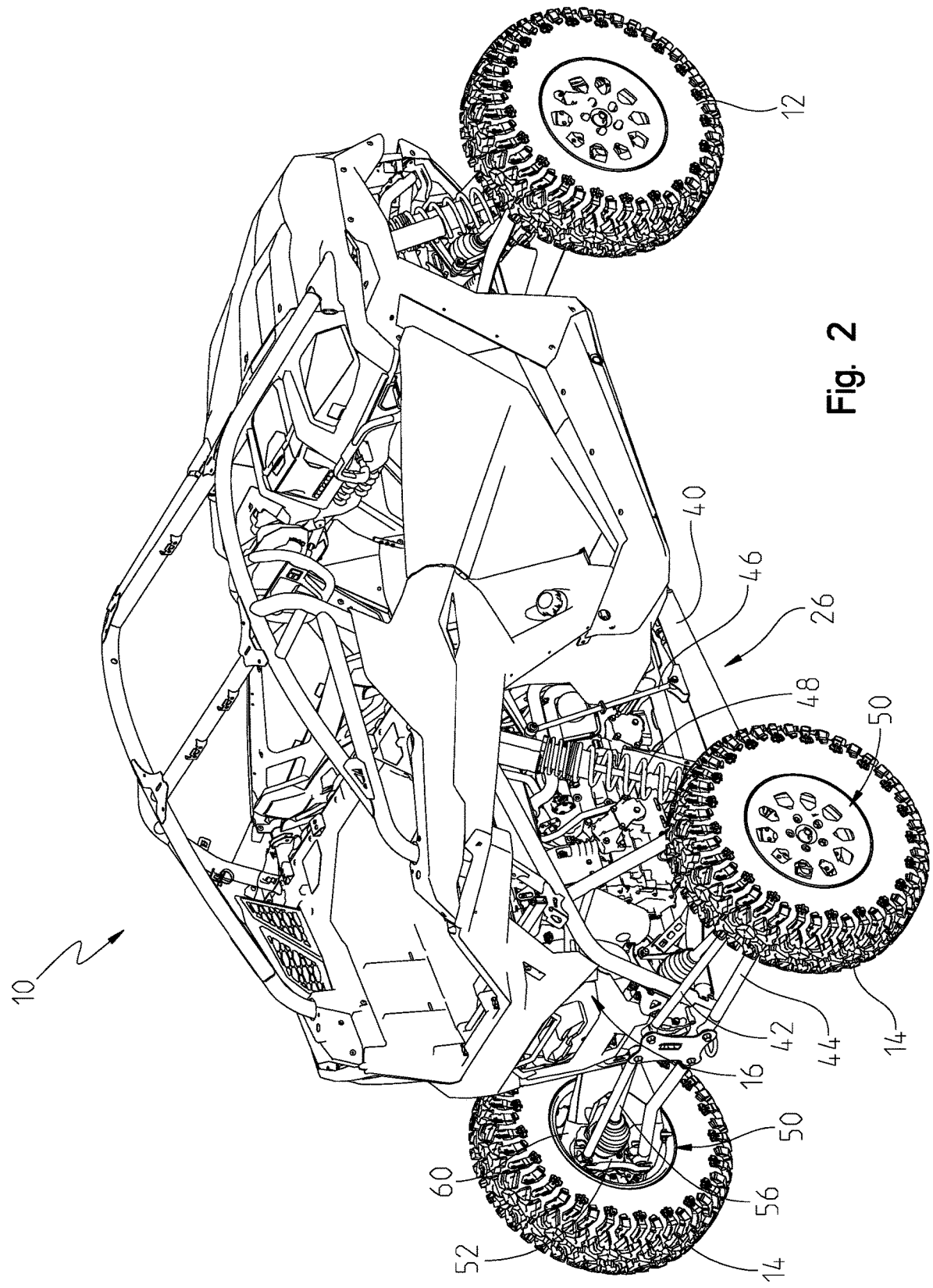
FIG. 2 is a rear right perspective view of the vehicle of FIG. 1.
Figure 4:
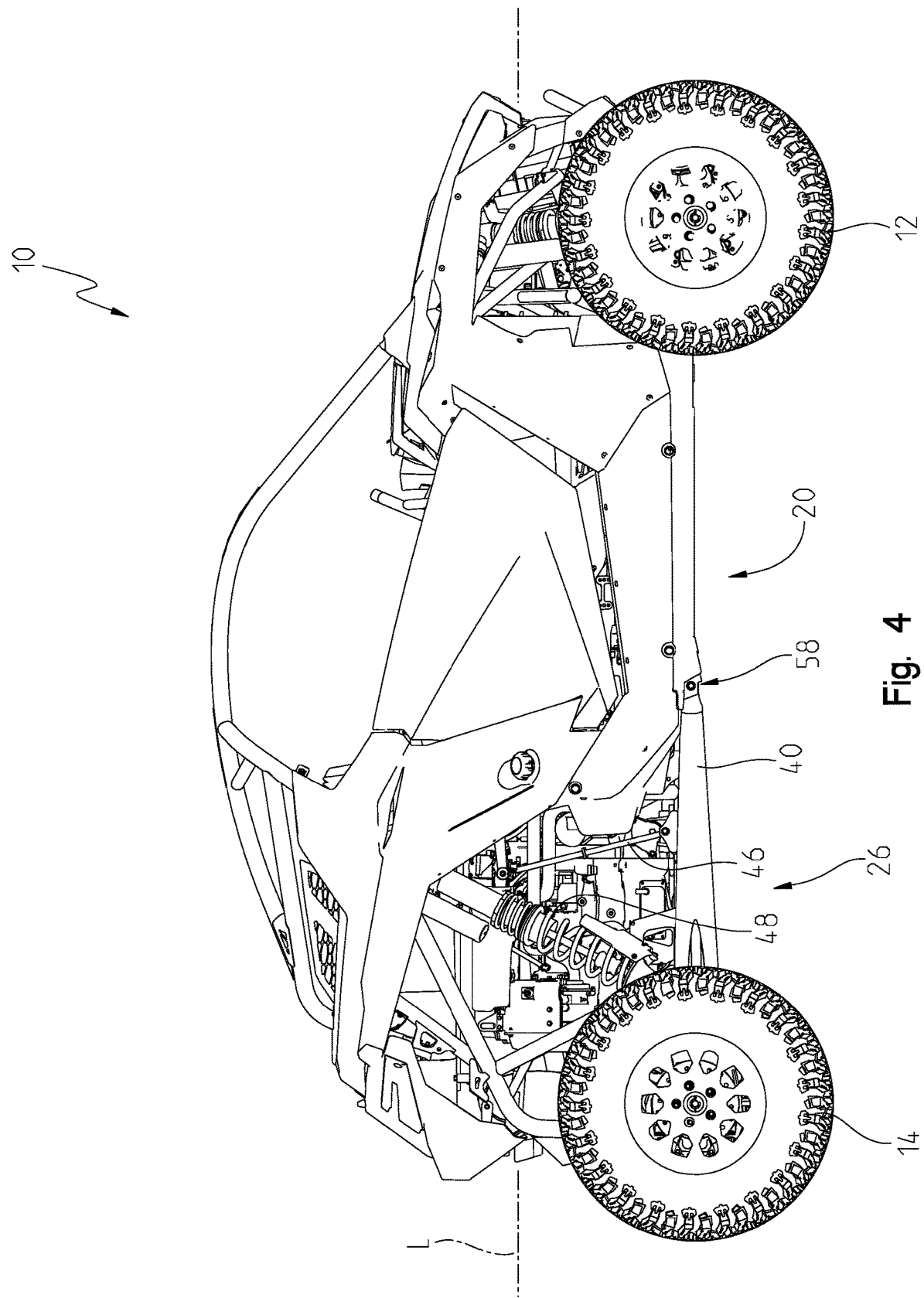
FIG. 4 is a right side view of the vehicle of FIG. 1.
Figure 5:
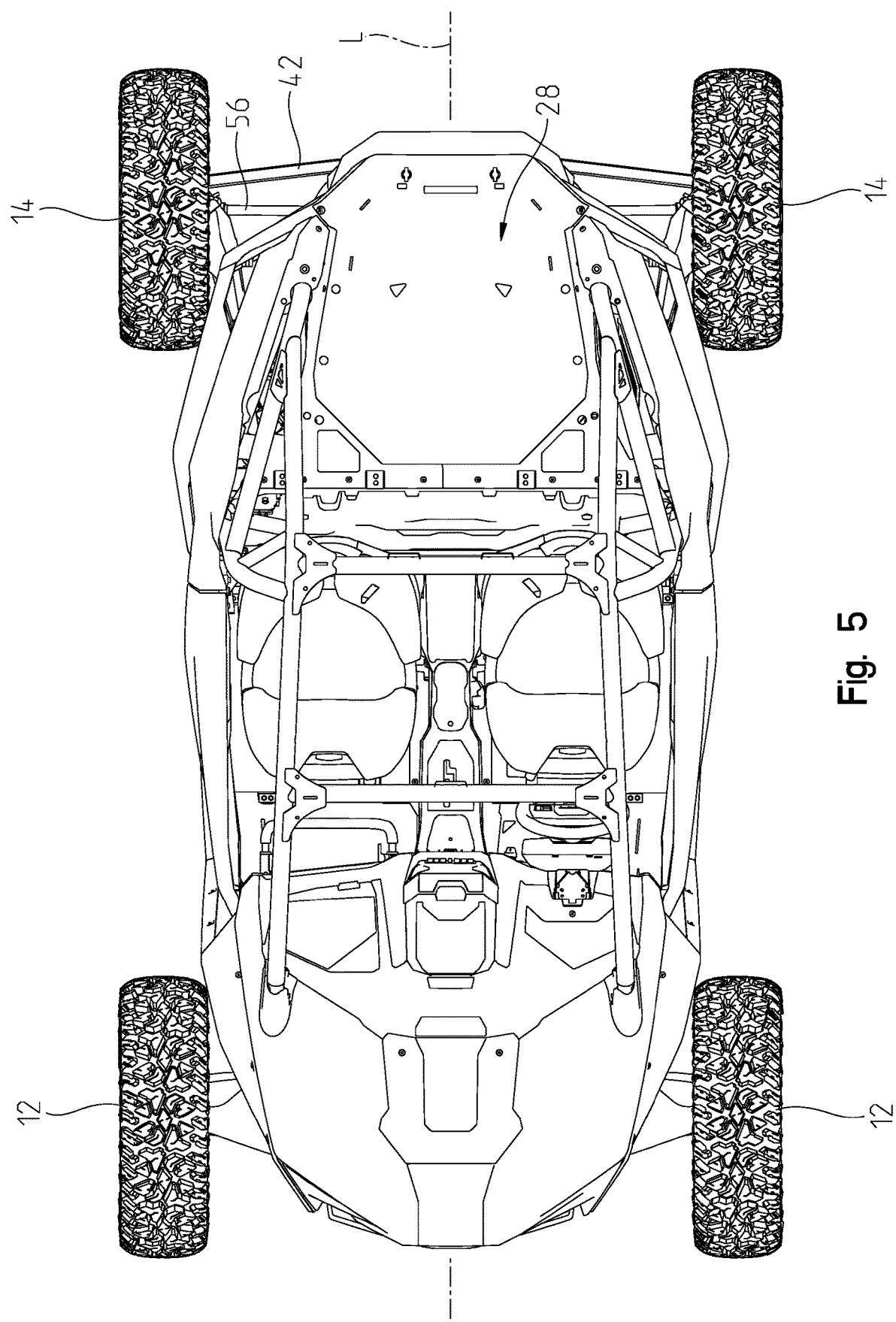
FIG. 5 is a top view of the vehicle of FIG. 1.
Figure 6:
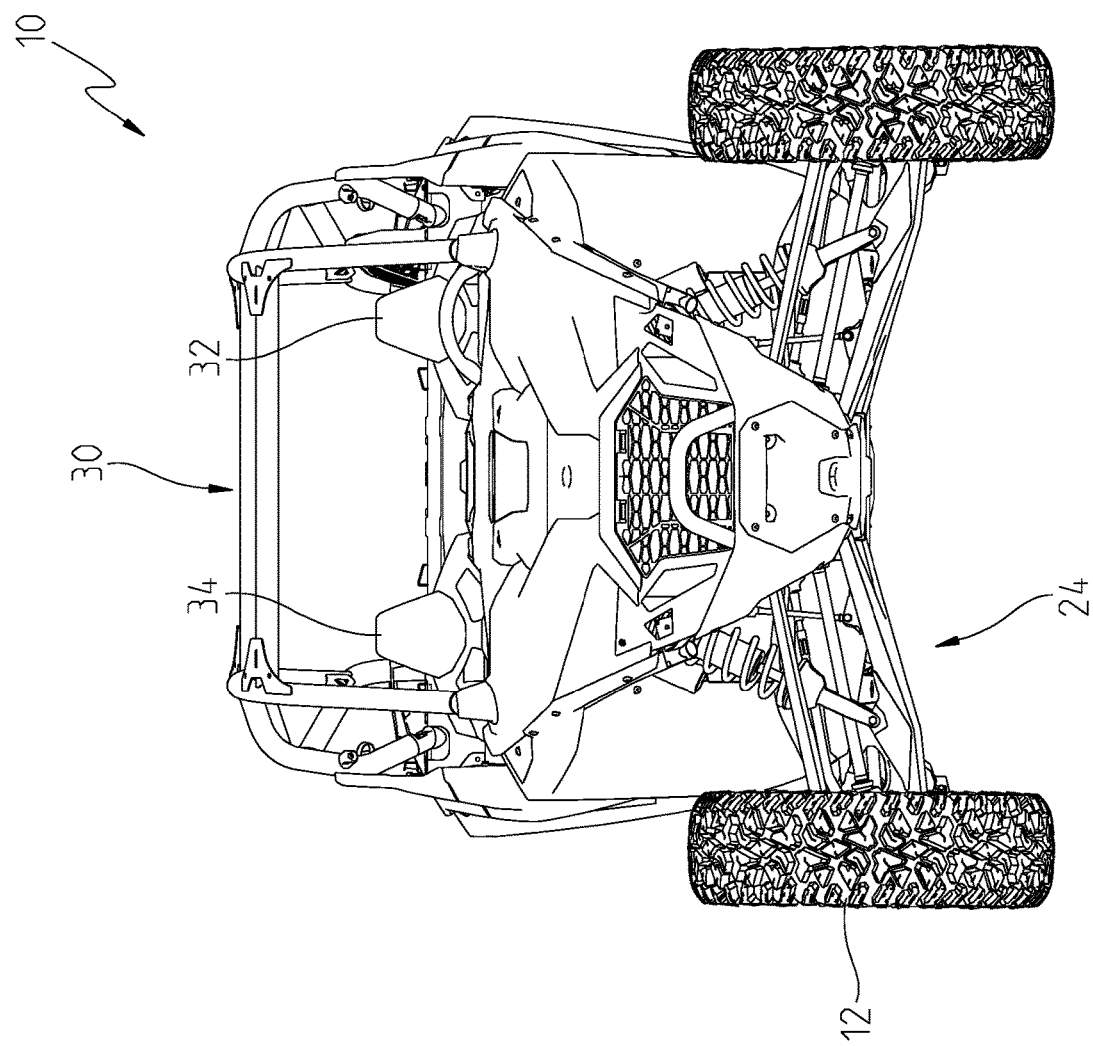
FIG. 6 is a front view of the vehicle of FIG. 1.
Figure 7:
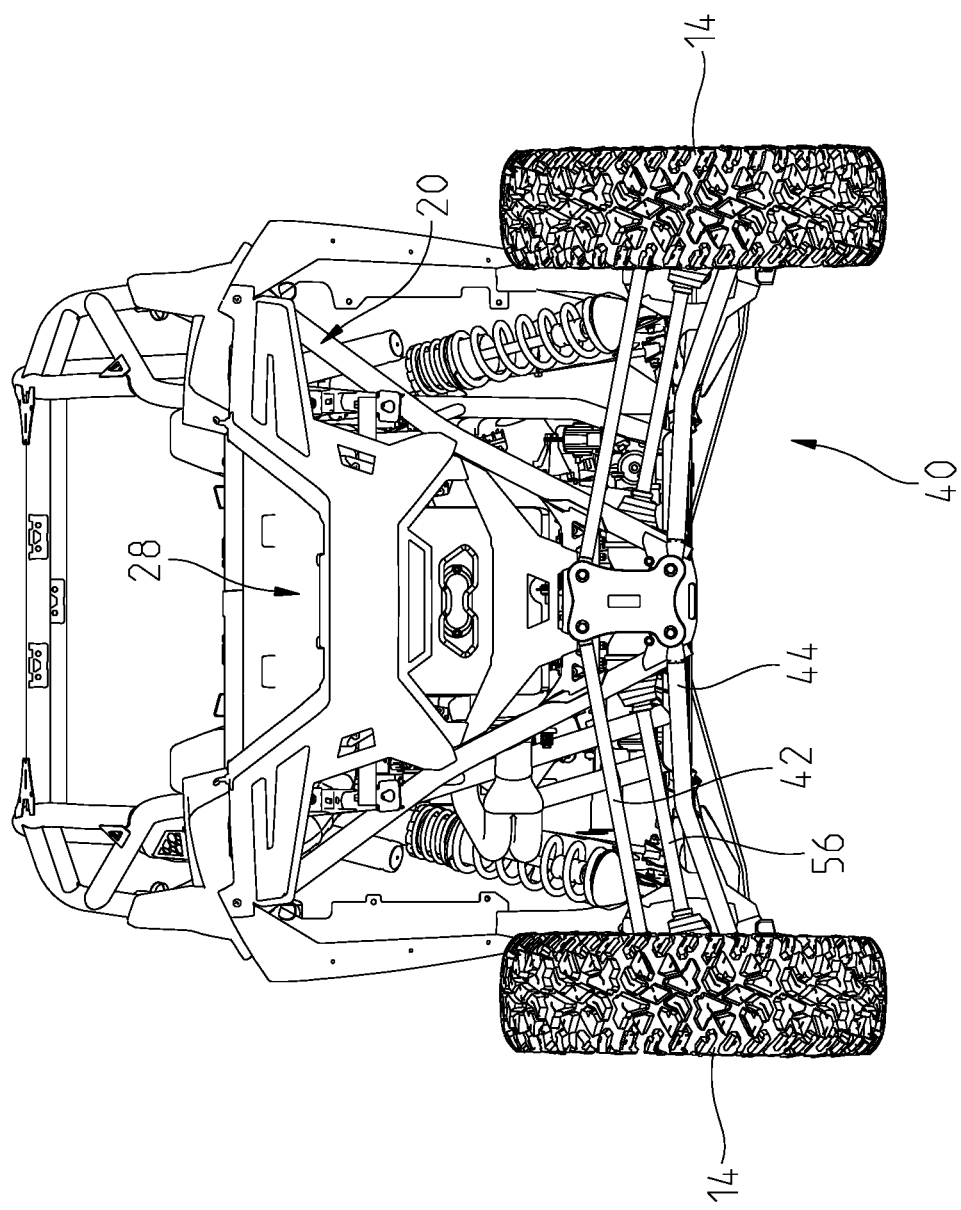
FIG. 7 is a rear view of the vehicle of FIG. 1.

Referring to FIGS. 2-4, the rear suspension assembly 26 is shown. The rear suspension assembly 26 is a trailing arm-type suspension generally comprised of trailing arms 40, an upper or first radius rod 42, a lower or second radius rod 44, a torsion or sway bar 46, and shock absorbers 48. Illustratively, both a right and left side of vehicle 10 includes the trailing arm 40, radius rods 42, 44, and shock absorbers 48 such that both right and left rear ground-engaging members 14 are each operably coupled to one trailing arm 40, upper and lower radius rods 42, 44, and one shock absorber 48. More particularly, each of the rear ground-engaging members 14 includes a wheel hub 50 and a knuckle 52, and at least the trailing arms 40 and radius rods 42, 44 are operably coupled to the knuckle 52.

Additionally, each of the rear ground-engaging members 14 includes a rear axle 56 (e.g., a half shaft) extending between a rear final drive member (not shown) and the knuckle 52. The rear axles 56 are configured to rotate the rear ground-engaging members 14 during operation of the vehicle 10. The rear axles 56 extend laterally and may be generally perpendicular to the centerline L of vehicle 10 (FIG. 3).

Referring again to FIGS. 2-4, the trailing arms 40 include a first coupler 58 positioned at a forward portion thereof and a second coupler 60 positioned at a rearward portion thereof. The first coupler 58 is configured to operably couple trailing arms 40 to the frame assembly 20 (FIG. 3) and the second coupler 60 is configured to operably couple the trailing arms 40 to the rear ground-engaging member 14 (FIG. 2). The first coupler 58 is configured to allow the trailing arms 40 to pivot or rotate in a generally vertically direction relative to the frame assembly 20. The trailing arm 40 is operably coupled to the knuckle 52 of rear ground-engaging member 14 through the second coupler 60.

In one embodiment, the trailing arms 40 are configured to extend in a generally longitudinal or forward-aft direction between the first and second couplers 58, 60. More particularly, the trailing arms 40 may be generally parallel to the centerline L of vehicle 10 and/or may have a longitudinal directional component angled less than 45° relative to the centerline L. Through the couplers 58, 60, the trailing arms 40 are configured to pivot about a generally horizontal axis during operation of the vehicle 10, especially as the vehicle 10 traverses various terrain.

Various configurations of the rear suspension assembly 26 may be implemented on the vehicle 10 are shown schematically and discussed herein in more detail. For example, FIGS. 8-25 illustrate a first embodiment of a rear suspension assembly 26 for controlling toe of the rear ground-engaging members 14.

Figure 8:
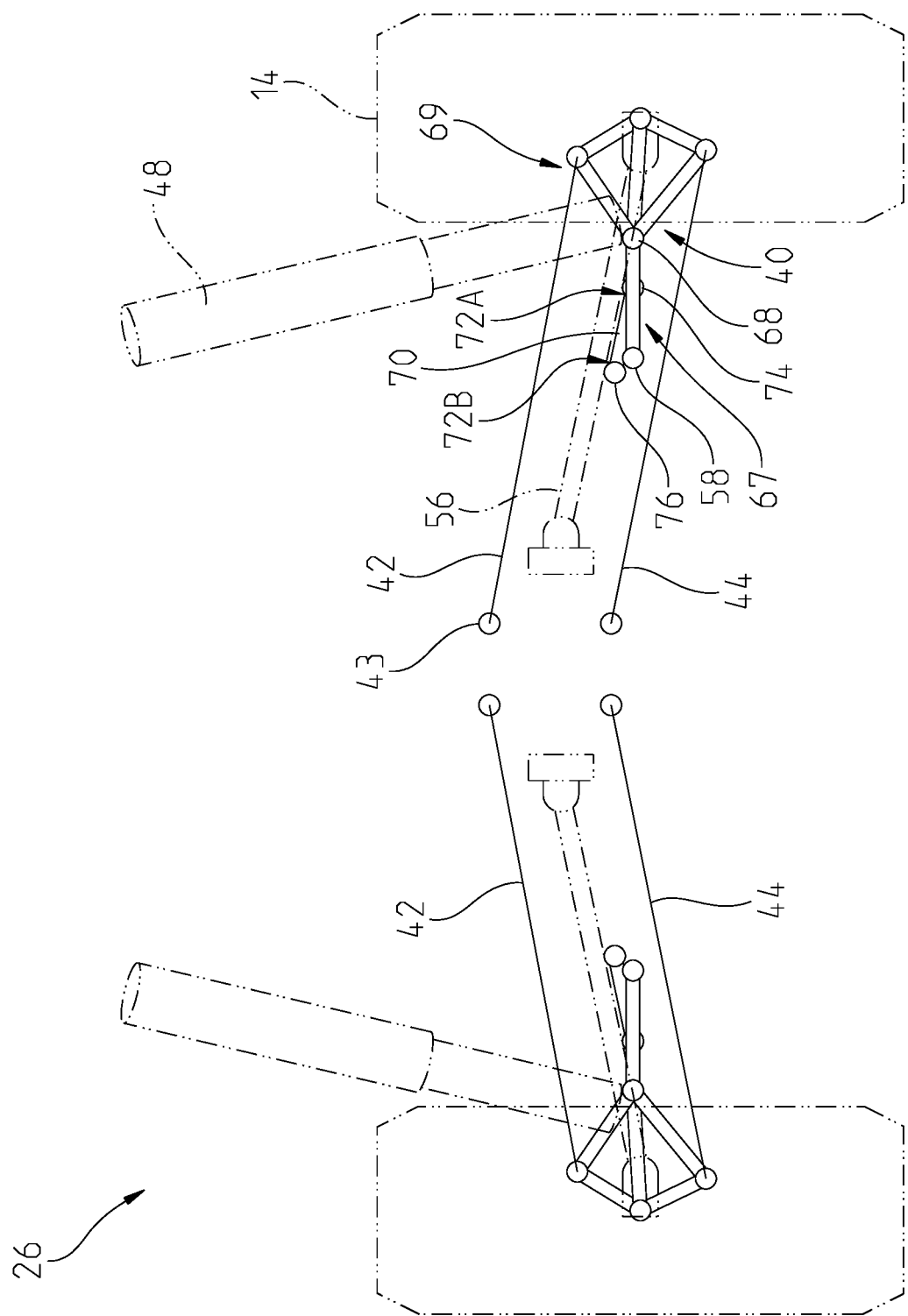
FIG. 8 is a front view of a schematic of a rear suspension assembly of the vehicle of FIG. 1.
Figure 9:
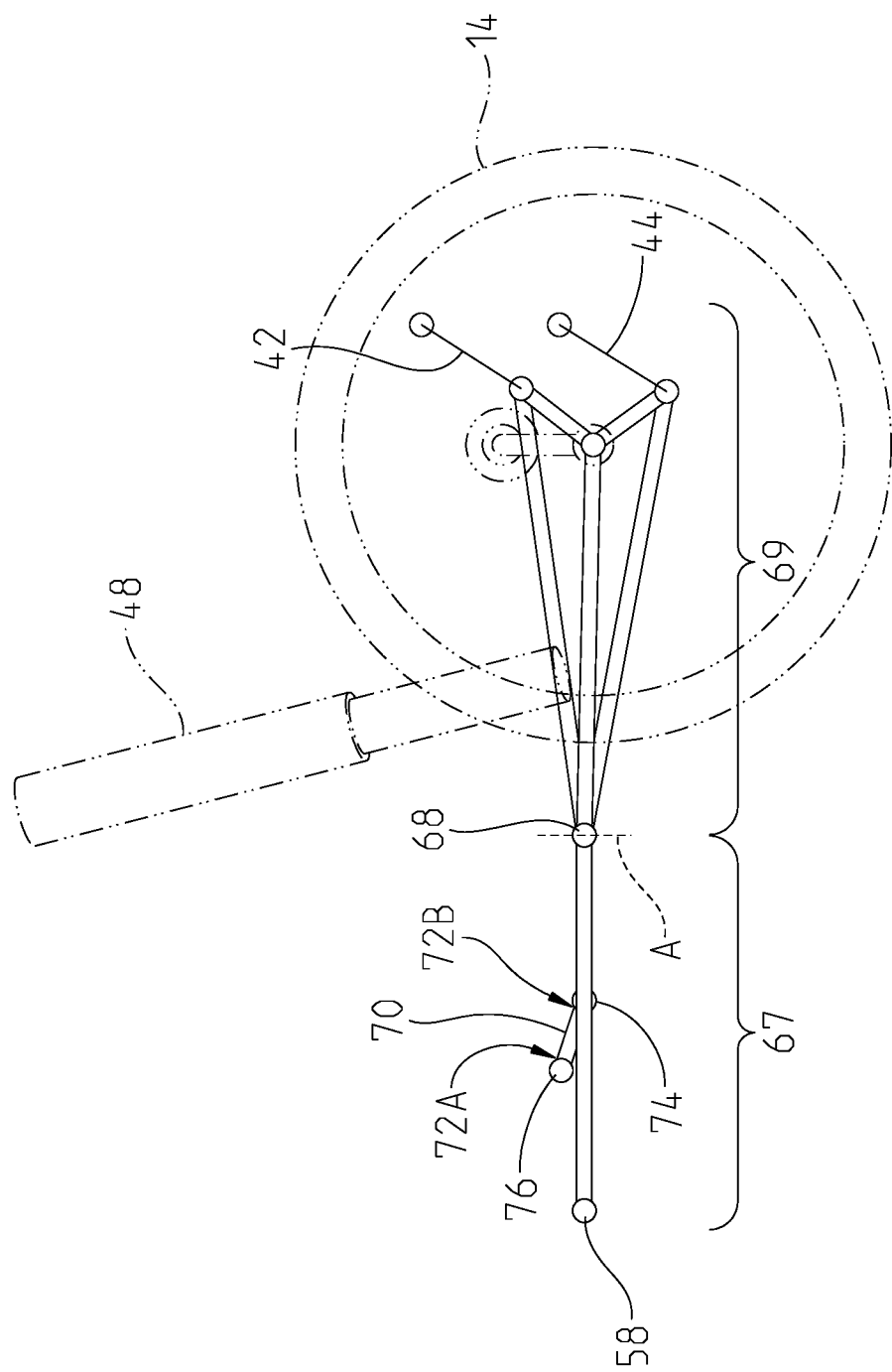
FIG. 9 is a side view of the rear suspension assembly of FIG. 8.
Figure 10:
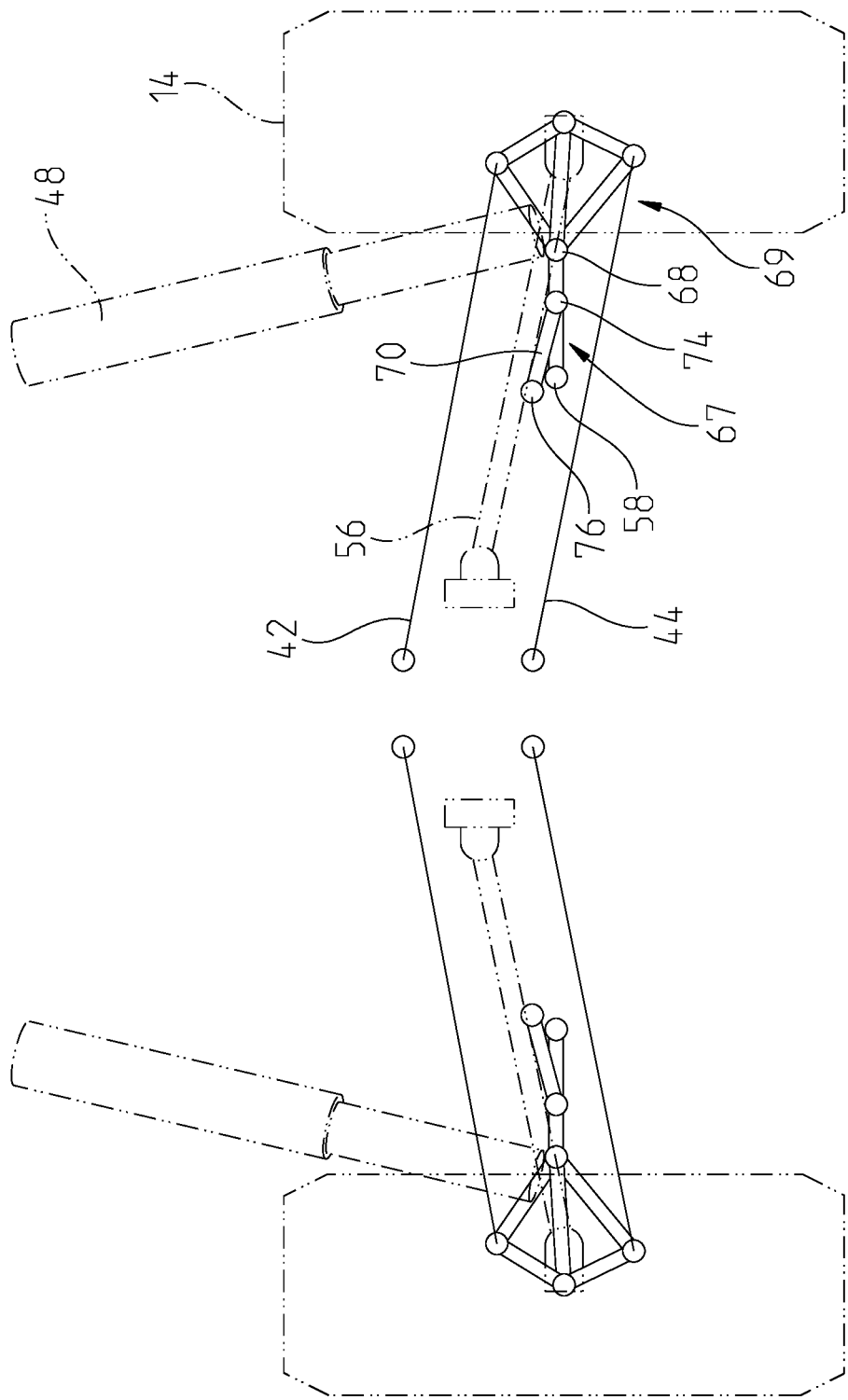
FIG. 10 is a rear view of a rear suspension assembly of FIG. 8.
Figure 12:
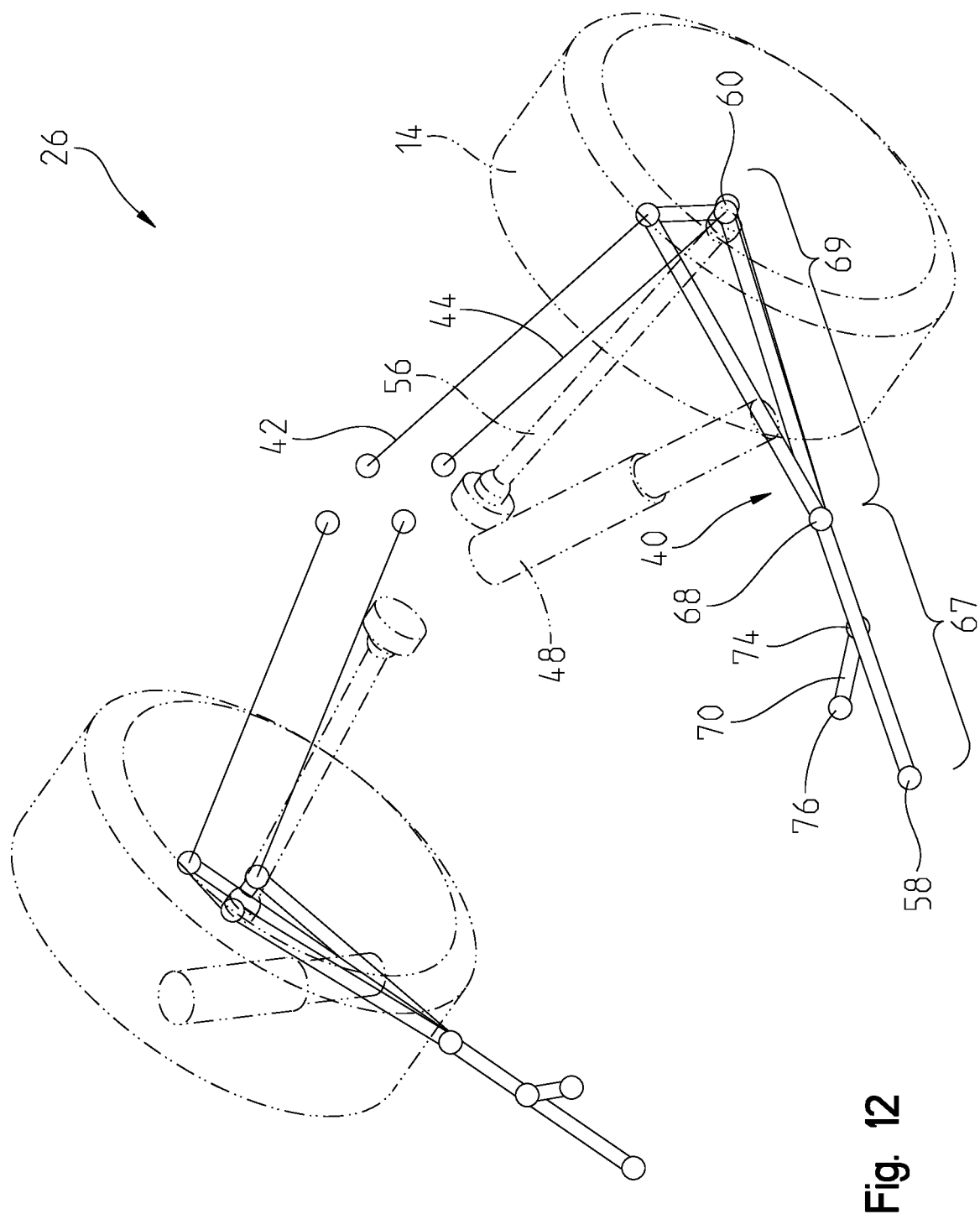
FIG. 12 is a front left perspective view of the rear suspension assembly of FIG. 8.
Figure 13:
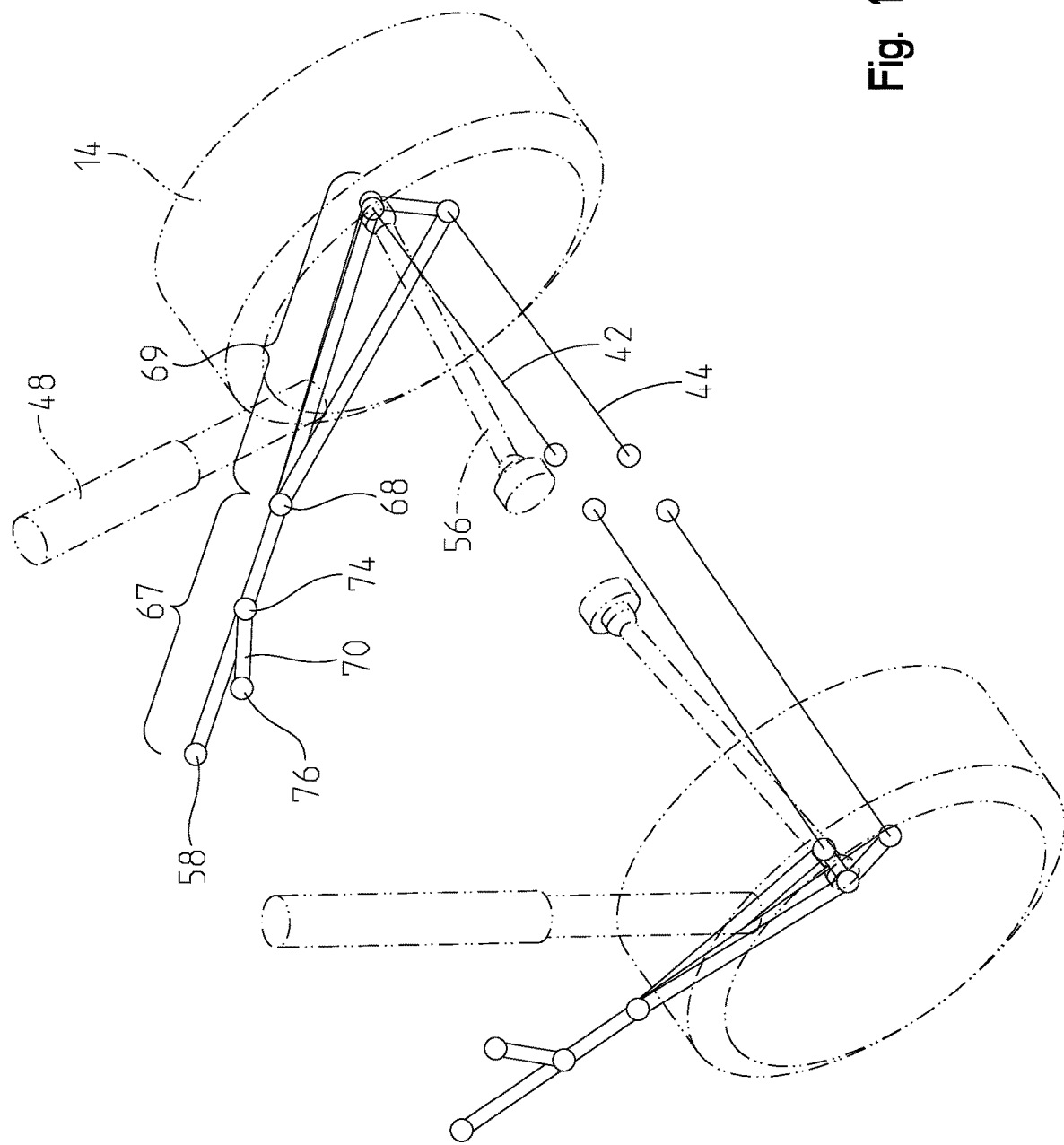
FIG. 13 is a rear left perspective view of the rear suspension assembly of FIG. 8.
Figure 14:
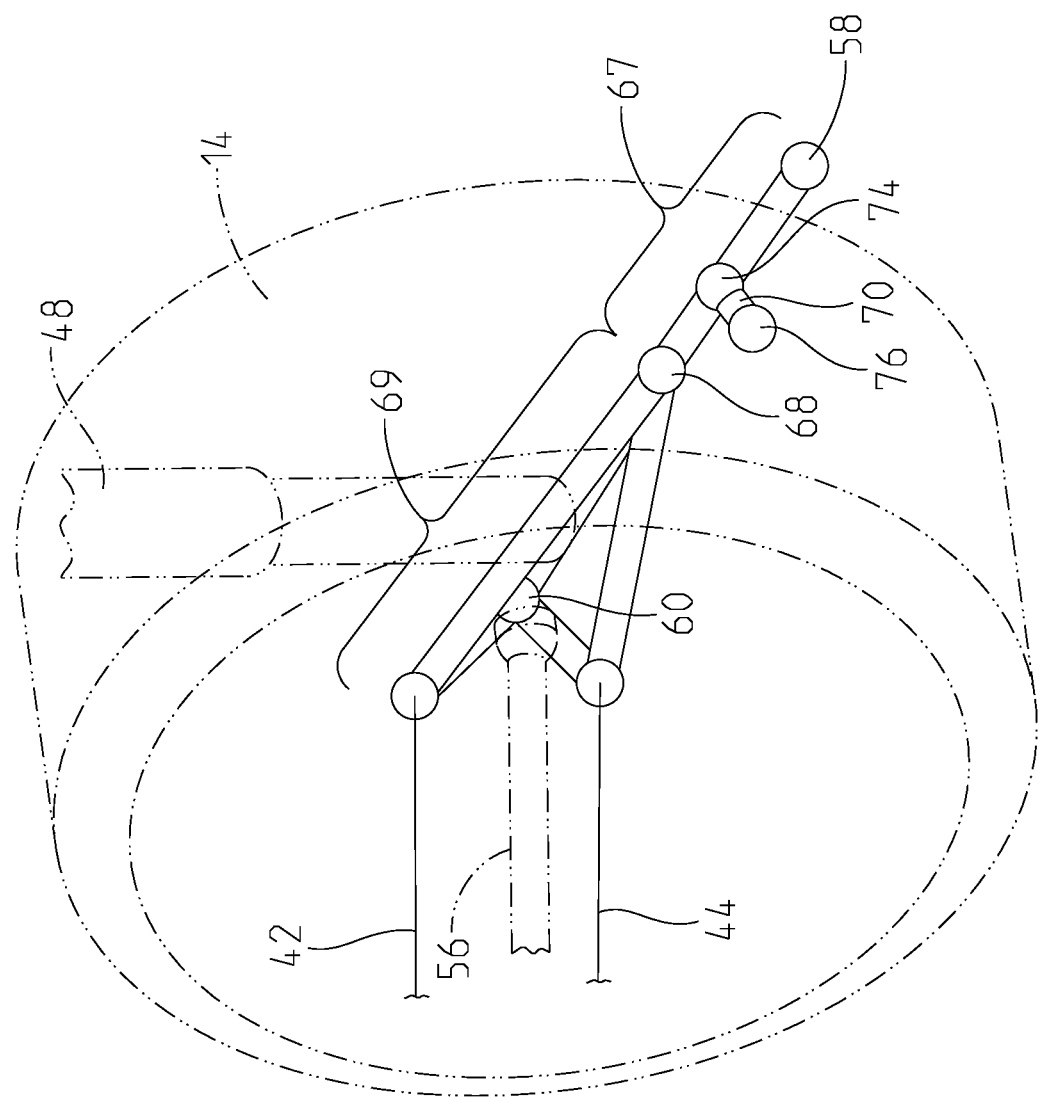
FIG. 14 is a detailed view of the rear suspension assembly of FIG. 8 engaged with a rear-ground engaging member.
Figure 15:
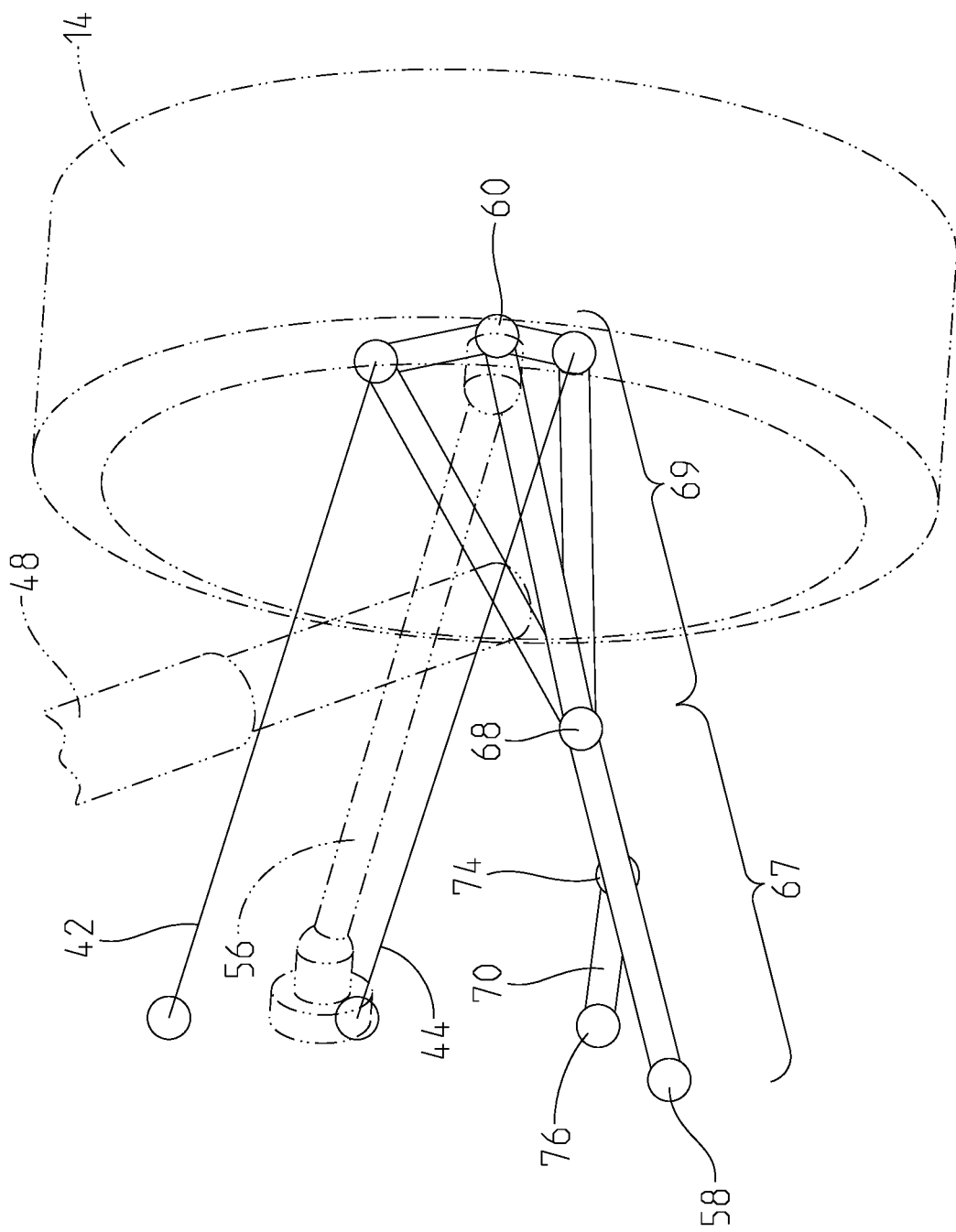
FIG. 15 is another detailed view of the rear suspension assembly of FIG. 14.

As illustrated in FIGS. 8-15, each of the trailing arms 40 may be comprised as a single component or may be comprised of a plurality of components coupled together, such as a first longitudinal portion 67, a second longitudinal portion 69, and a joint 68 positioned between the first and second longitudinal portions 67, 69. The joint 68 is operable to permit the first and second longitudinal portions 67, 69 to pivot relative to each other. Any number of types of joints may be implemented. For example, in one embodiment, the joint 68 includes one degree of freedom. The joint 68 may include a substantially vertical axis of rotation A (FIG. 9). This configuration allows the first and second longitudinal portions 67, 69 to pivot relative to one another within a substantially horizontal plane whereas the first and second longitudinal portions 67, 69 do not pivot relative to each other within a vertical plane. In this way, the first and second portions 67, 69 move laterally relative to each other and do not move vertically relative to each other. Rather, the vertical movement of trailing arm 40 occurs during travel of rear suspension assembly 26 and first and second portions 67, 69 move together during such vertical travel. The joint 68 can couple the first and second longitudinal portions 67, 69 via a revolute joint such as a pin, hinge, or knuckle joint.

The rear suspension assembly 26 further includes a suspension member 70. The suspension member 70 includes a first portion 72A and a second portion 72B. The first portion 72A is coupled to the trailing arm 40 and the second portion 72B is coupled to the frame assembly 20. For example, the trailing arm 40 may include a first coupler 74 that is positioned along the longitudinal length of the trailing arm 40. The first coupler 74 is operable to allow the suspension member 70 to pivot relative to the trailing arm 40. For example, the first coupler 74 may include various types of joints including a ball joint or any other joint or combination of joints that facilitate pivoting of the suspension member 70 relative to the trailing arm 40. In some embodiments, the first coupler 274 includes a bearing carrier or hub. A second coupler 76 may be positioned on the frame assembly 20 to which the second portion 72B of the suspension member 70 is coupled and which is operable to allow the suspension member 70 to pivot relative to the frame assembly 20. For example, the second coupler 76 may include a variety of joints including a ball joint or any other joint or combination of joints that facilitate pivoting of the suspension member 70 relative to the frame assembly 20. In some embodiments, the suspension member 70 may include an actuator that allows for active control of toe of the rear ground-engaging members 14 (e.g., pneumatic, motor, and so forth). Furthermore, it is understood that an actuator may be coupled to the suspension members 70 allowing for active control of toe of the rear ground-engaging members 14 (e.g., coupled between the suspension member 70 and the frame assembly 20 or coupled between the suspension members 70 on each side of the vehicle 10).

Referring still to FIGS. 8 and 9, the rear suspension assembly 26 includes the shock absorbers 48. The shock absorbers 48 are coupled between the trailing arm 40 and the frame assembly 20 (FIG. 2). The positions at which the shock absorber 48 is coupled to the trailing arm 40 and the suspension member 70 is coupled to the trailing arm 40 are different positions. For example, the position at which the shock absorber 48 is coupled to the trailing arm 40 is longitudinally spaced from the position at which the suspension member 70 is coupled to the trailing arm 40. The shock absorber 48 is coupled to the frame assembly 20 at a position spaced from the coupling position of the suspension member 70 to the frame assembly 20. For example, the shock absorber 48 may be coupled to the frame assembly 20 at or near a rear cargo area 28 and the suspension member 70 is coupled to the frame assembly at or near lower frame members. Both coupling positions are outside of any envelope defined by the powertrain assembly 16 so as to not interfere with the operation or location of any powertrain component. For example, the coupling position of shock absorber 48 to frame 20 may be positioned at least vertically higher than an upper surface of an engine of the powertrain assembly 16 while the coupling position of suspension member 70 to frame 20 may be positioned at least laterally outward of the engine.

Referring more specifically to FIG. 11, the first coupler 58 of the trailing arm 40 is shown positioned at a forward end of the first longitudinal portion 67 of the trailing arm 40. The first radius rod 42 is shown with a coupling position 43 at which the first radius rod 42 couples to the frame assembly 20. A plane P is illustrated extending between the first coupler 58 of the trailing arm 40 and the coupling position 43 of the first radius rod 42, the plane extending vertically (i.e., as illustrated in the top view of FIG. 11, into and out of the page). The suspension member 70 couples to the frame assembly 20 at the second coupler 76, wherein the second coupler 76 is positioned within or adjacent the plane P defined between the first coupler 58 of the trailing arm 40 and the coupling position 43 of the first radius rod 42. For example, the second coupler 76 is coupled to the frame assembly 20 such that the distance between the second coupler 76 of the suspension member 70 and the nearest point on the plane P is about 1:12 of the distance from the first coupler 58 of the trailing arm and the coupling position 43 of the first radius rod 42 which define the plane P. Various rations of the distances described above are contemplated including about 1:15, 1:20, 1:25, 1:30, 1:35, 1:40, 1:45, 1:50, 1:55, 1:60, or less. In some embodiments, another way of defining the relative position of the second coupler 76 with respect to components of the rear suspension assembly 26 includes defining a zone Z within which the second coupler 76 is positioned. The zone Z is defined as a space as viewed from above and bounded by the trailing arm 40, the upper radius rod 42, and an interior edge defined between the front end of the trailing arm and the inner end of the upper radius rod as viewed from above (i.e., the plane P described previously). The second coupler 76 is positioned within the zone Z adjacent the interior edge (i.e., the plane P).

As illustrated in FIG. 11, the shock absorber 48 is coupled to the trailing arm 40 rearward of the joint 68. In some embodiments, the shock absorber 48 is coupled between a longitudinal midpoint of the second longitudinal portion 69 of the trailing arm 40 and the joint 68. The placement of the coupling between the shock absorber 48 and the trailing arm 40 in combination with the first coupler 74 of the suspension member 70 to the trailing arm 40 provides control of toe of the rear ground-engaging members 14. In some embodiments, the first coupler 74 of the suspension member 70 is spaced from the joint 68 between the first and second longitudinal portions 67, 69 approximately the same distance as the coupling of the shock absorber 48 to the trailing arm 40 is spaced from the joint 68.

Referring to FIGS. 16-25, the embodiment of FIG. 8 is illustrated with the rear suspension assembly 26 in various positions through the travel of the rear suspension assembly 26 (i.e., through travel of the shock absorber 48 in loaded, unloaded, and partially loaded conditions). FIGS. 16-20 show views of the rear suspension assembly 26 through its travel from a front view, and FIGS. 21-25 show views of the rear suspension assembly 26 through its corresponding travel from a top view. In other words, the position of the rear suspension assembly 26 of FIG. 16 corresponds with the position of the rear suspension assembly 26 of FIG. 21, the position of the rear suspension assembly 26 of FIG. 17 corresponds with the position of the rear suspension assembly 26 of FIG. 22, the position of the rear suspension assembly 26 of FIG. 18 corresponds with the position of the rear suspension assembly 26 of FIG. 23, the position of the rear suspension assembly 26 of FIG. 19 corresponds with the position of the rear suspension assembly 26 of FIG. 24, and the position of the rear suspension assembly 26 of FIG. 20 corresponds with the position of the rear suspension assembly 26 of FIG. 25. Although the frame assembly 20 is not shown in these figures, it is understood that the coupling positions of the rear suspension assembly 26 to the frame assembly 20 (e.g., coupling position 43, at first coupler 58, and at second coupler 76) represent the correct positions of the couplings (e.g., those positions are substantially static) and other portions and/or components of the rear suspension assembly 26 move with respect to the frame assembly 20.

Figure 16:
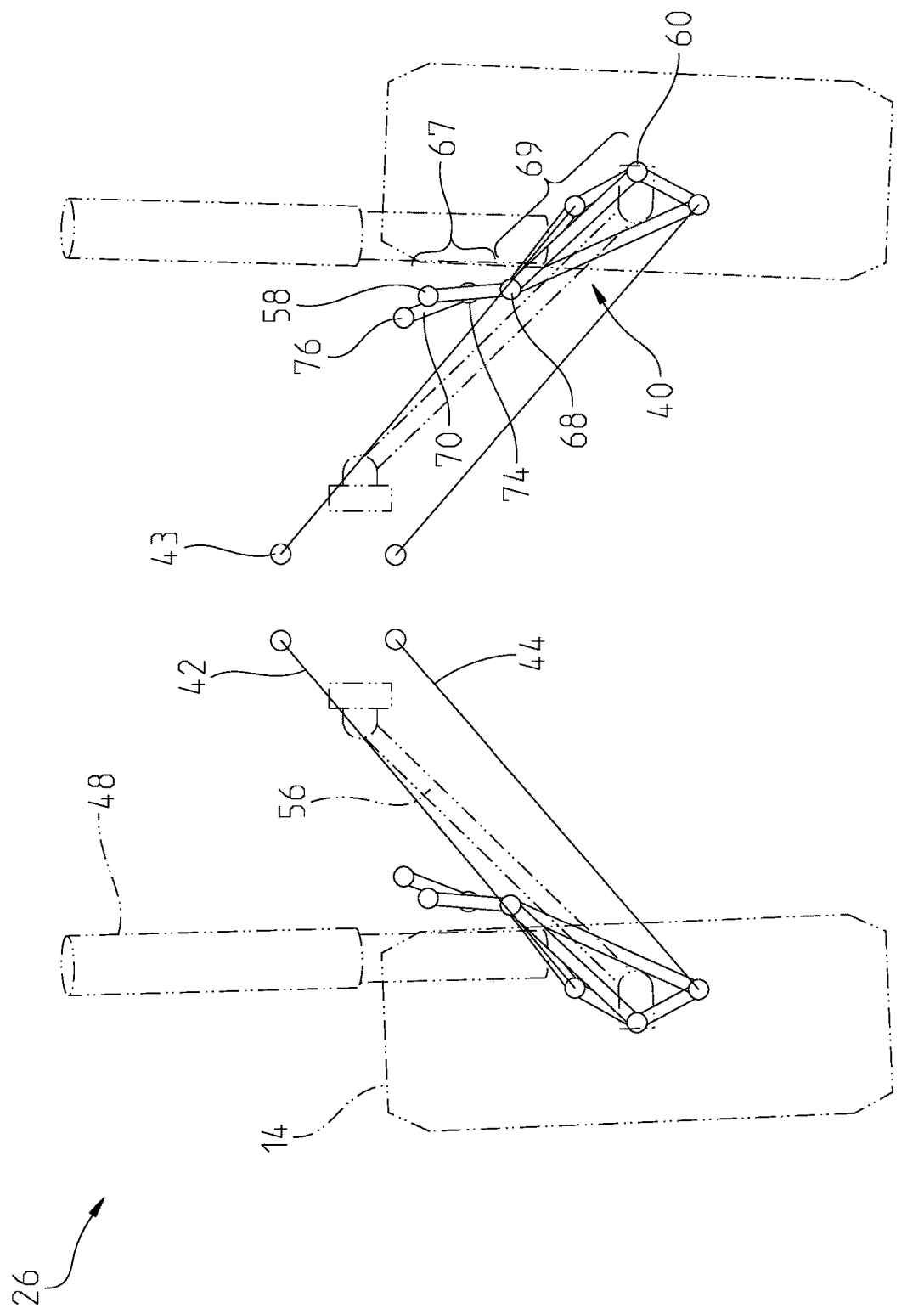
FIGS. 16-20 are front views of the rear suspension assembly of FIG. 8 illustrated throughout varying loading configurations of the rear suspension assembly.
Figure 17:
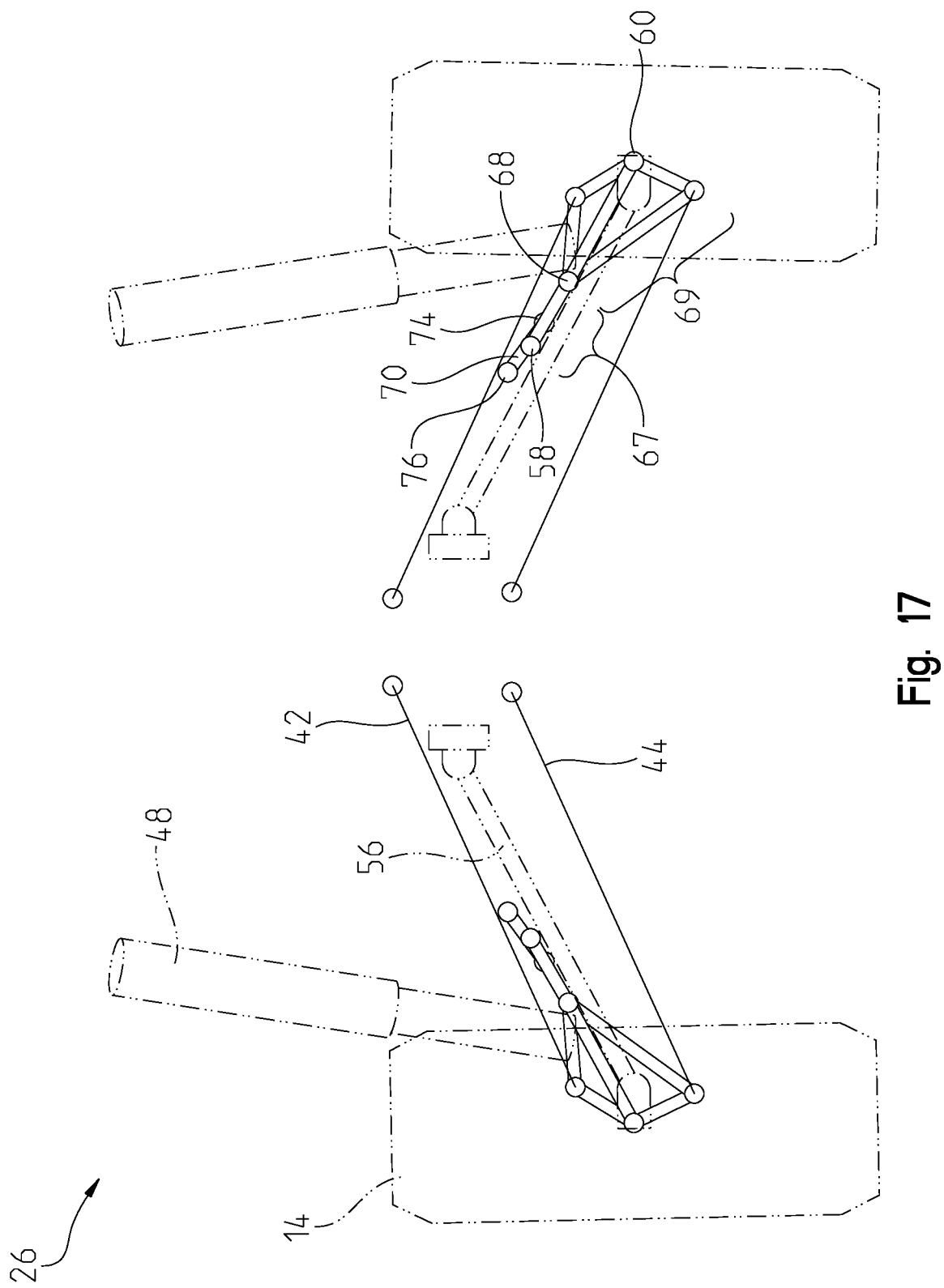
Figure 18:
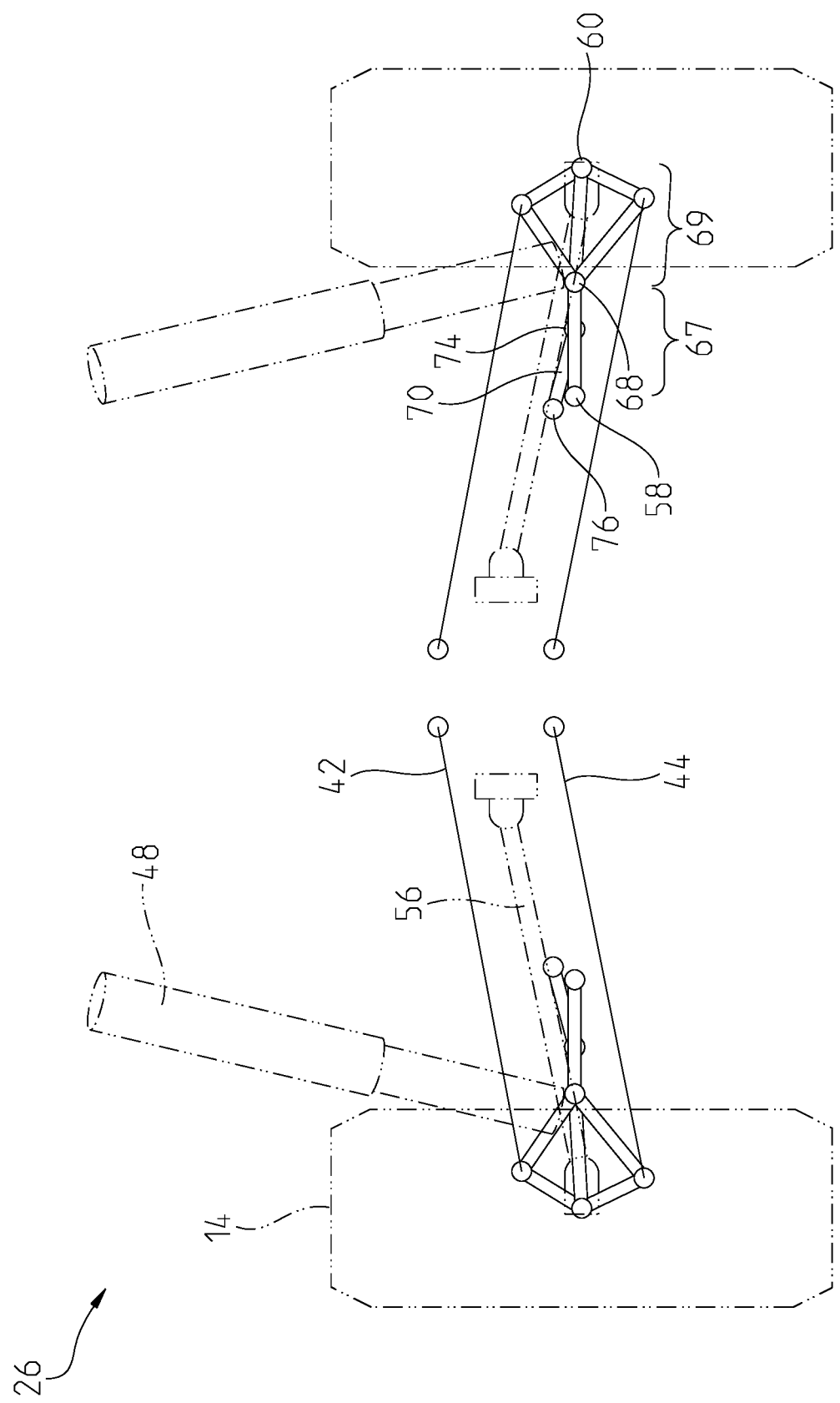
Figure 19:
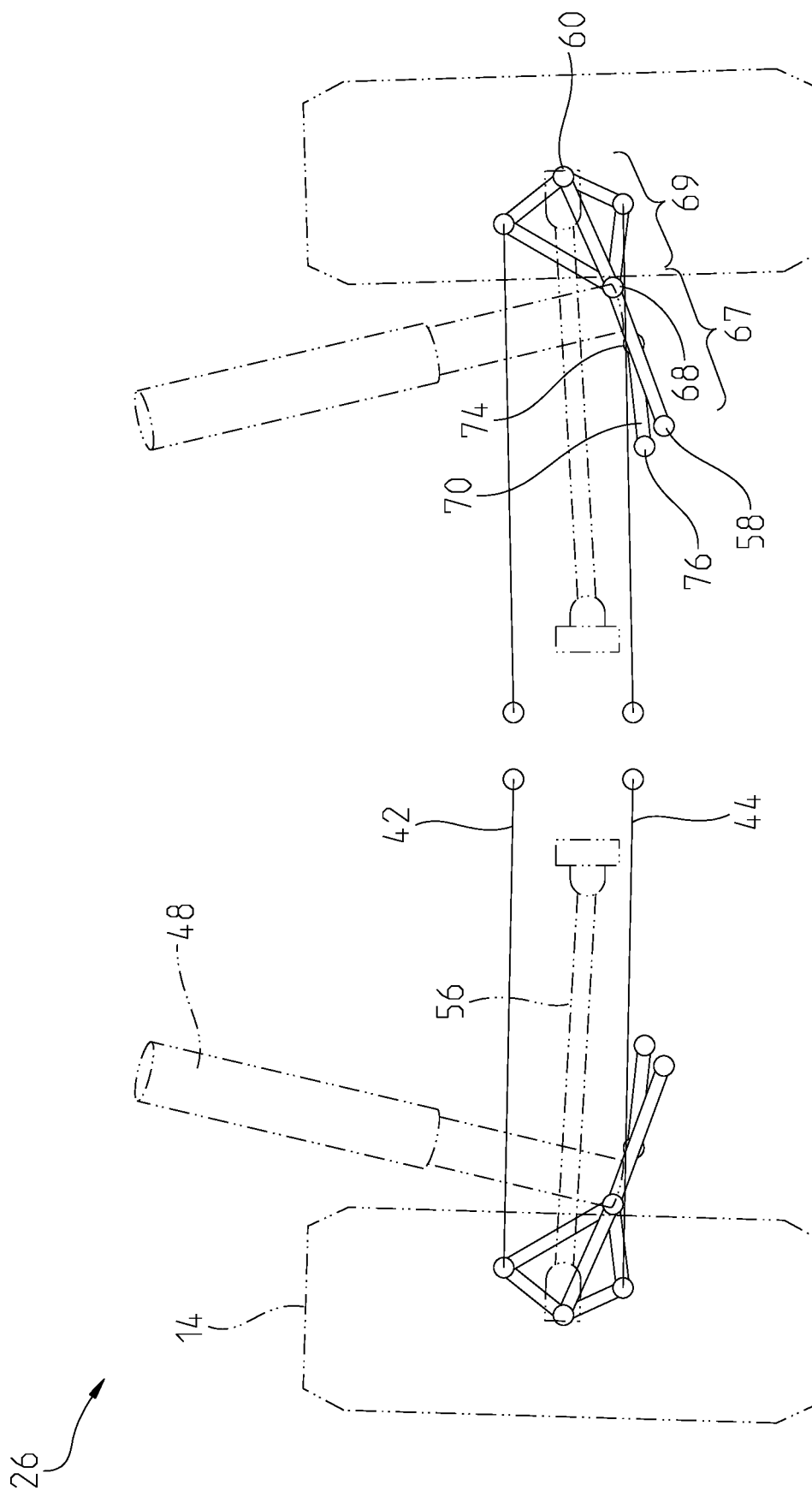
Figure 20:
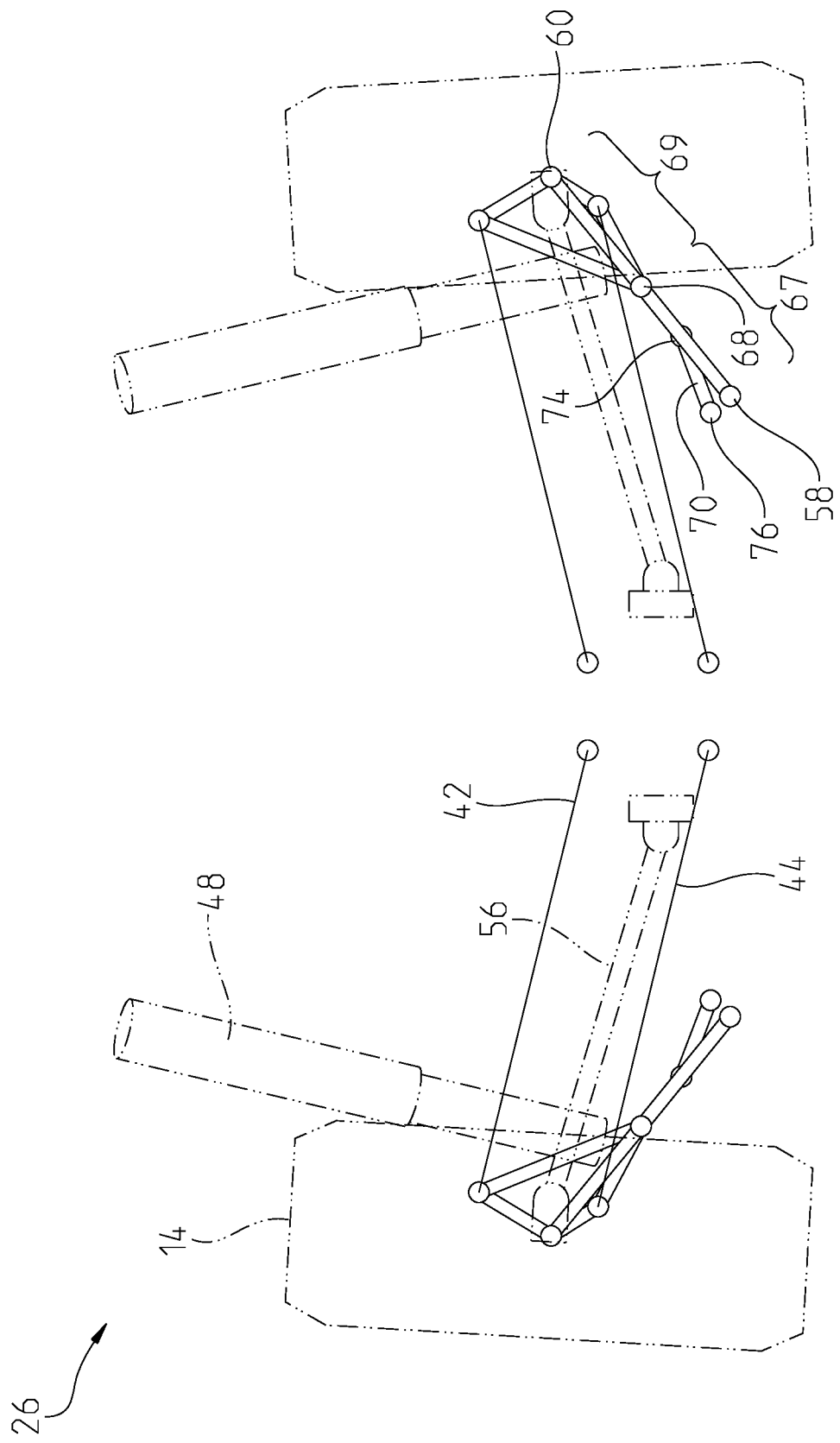
Figure 21:
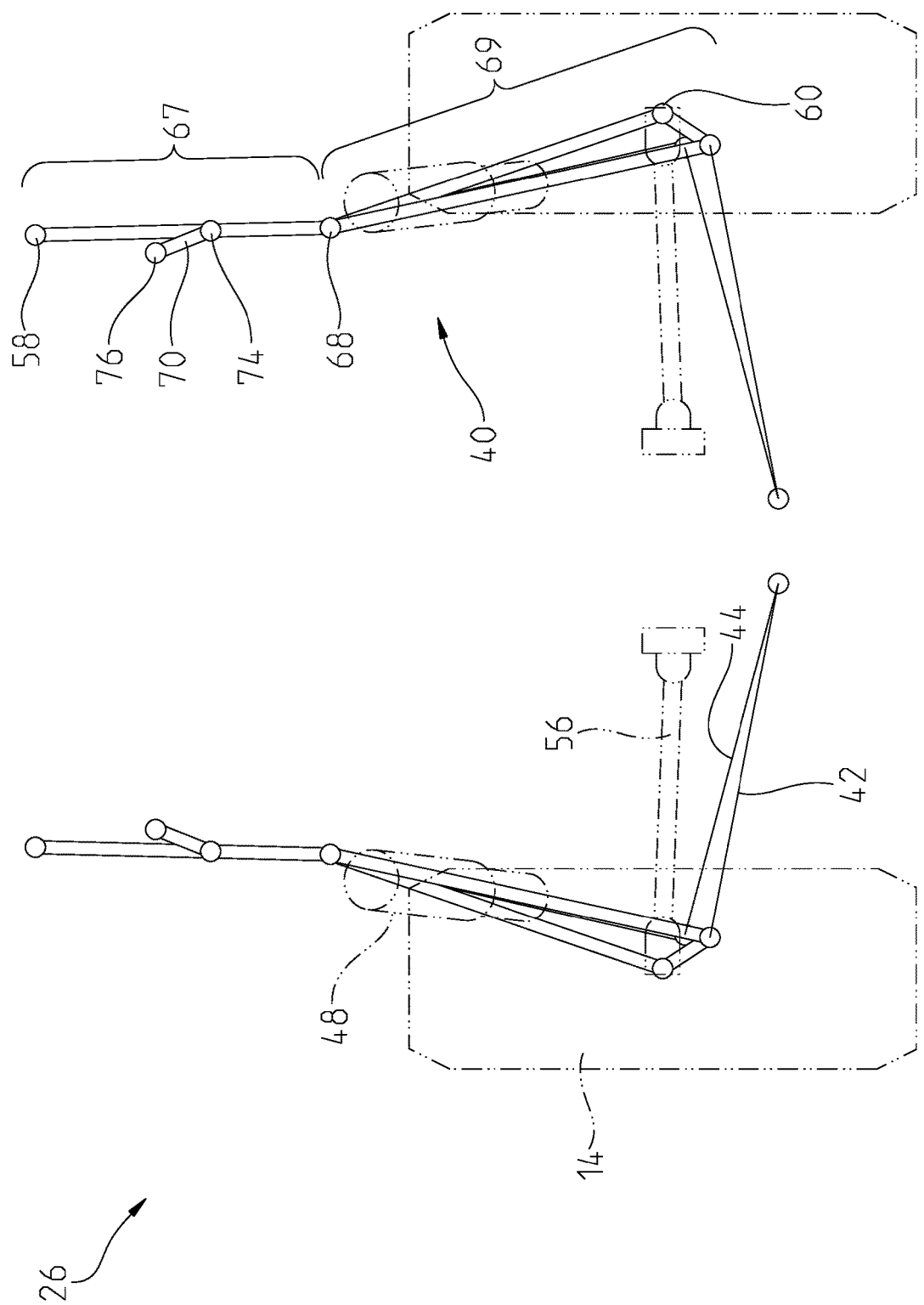
FIGS. 21-25 are top views of the rear suspension assembly of FIG. 8 illustrated throughout varying loading configurations of the rear suspension assembly.
Figure 22:
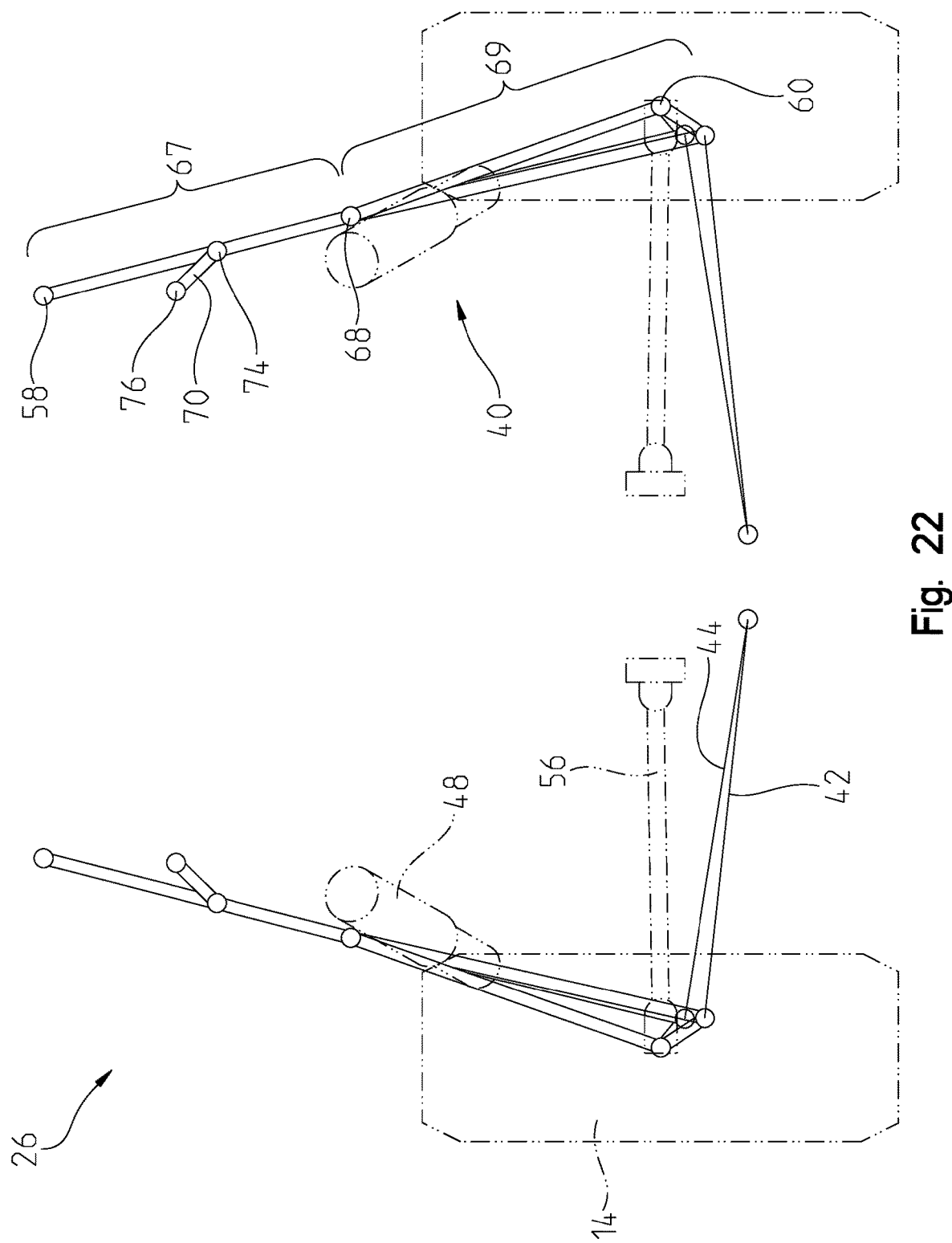
Figure 23:
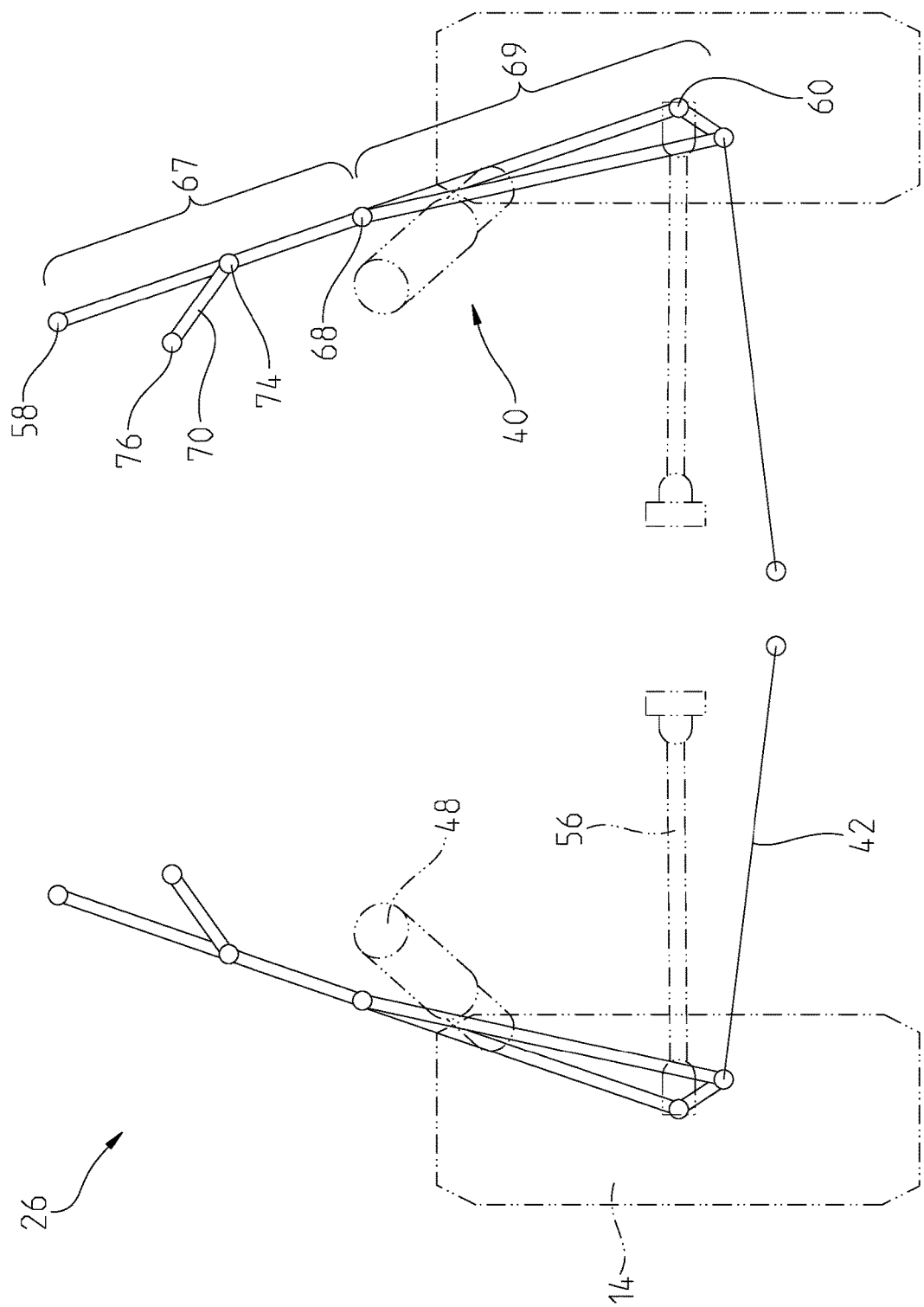
Figure 24:
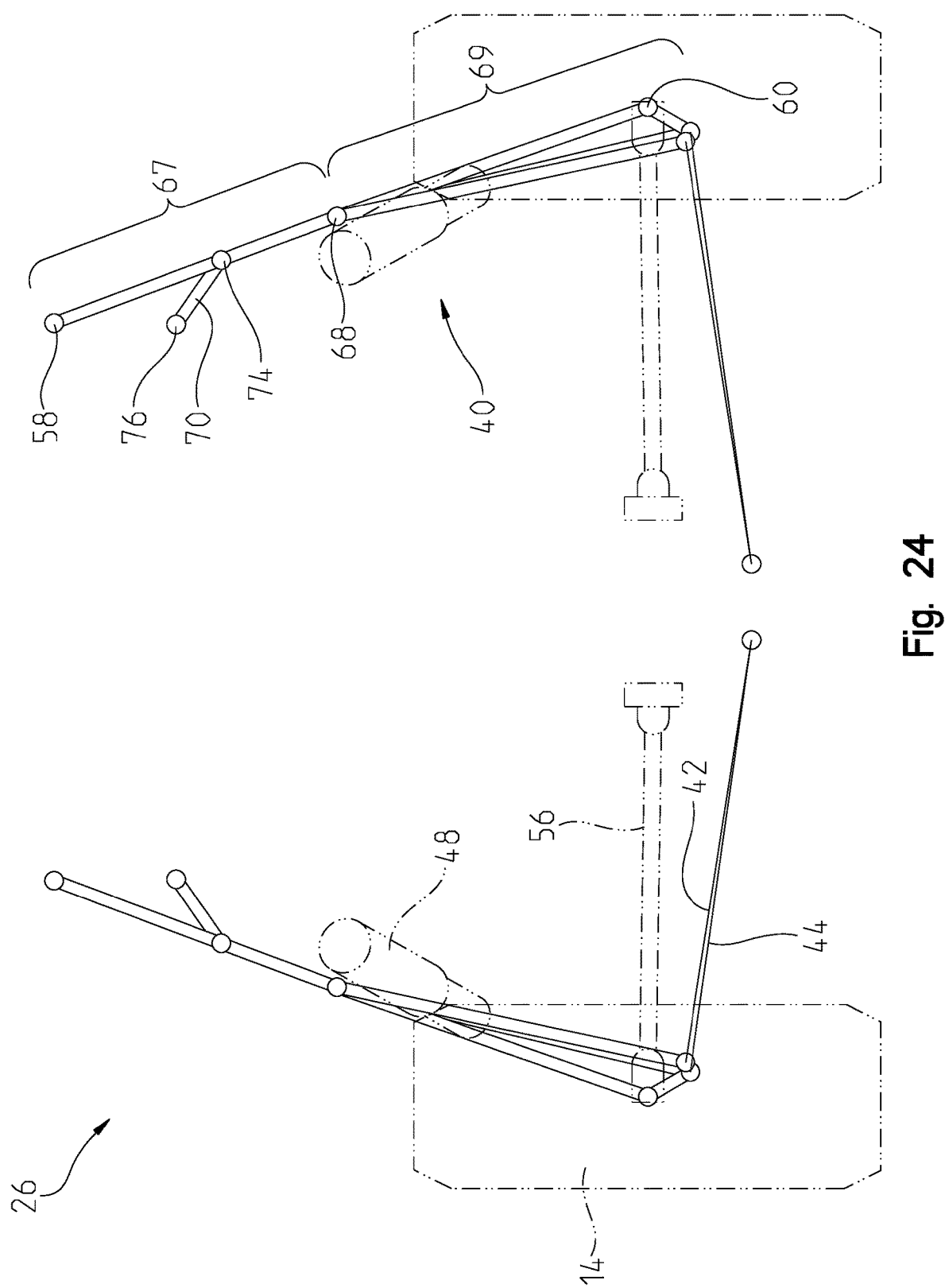
Figure 25:
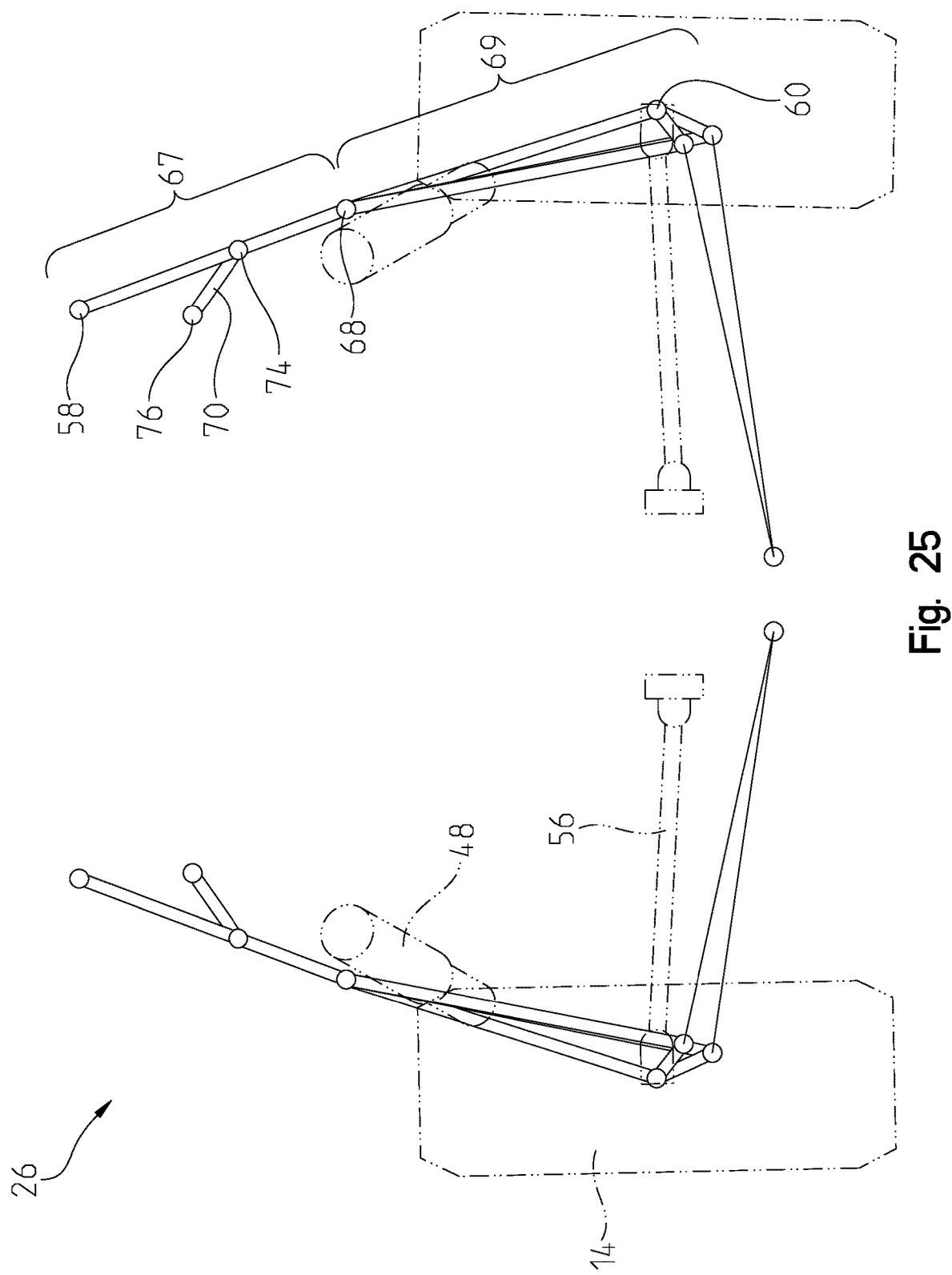

FIGS. 16 and 21 illustrate the rear suspension assembly 26 in a substantially unloaded state. As discussed, the coupling positions at which the rear suspension assembly 26 is coupled to the frame assembly 20 are substantially static. The toe of the rear ground-engaging members 14 is generally neutral or zero (or at a predetermined toe such as plus or minus three degrees) when the rear suspension assembly 26 is in a substantially unloaded state (and throughout the loading process, as illustrated in FIGS. 17-20 and 22-25). The joint 68 between the first and second longitudinal portions 67, 69 of the trailing arm 40 allows the second longitudinal portion 69 to have a substantially fixed configuration relative to the rear ground-engaging member 14 while the first longitudinal portion 67 pivots generally laterally at the joint 68 and relative to the first coupler 58 to adjust for positional adjustment of other components of the rear suspension assembly 26. This pivoting and moving of the first longitudinal portion 67 can be appreciated in the remaining FIGS. 17-20 and 22-25. FIGS. 17-19 and 22-24 show a progression of the rear suspension assembly 26 through loading of the rear suspension assembly 26 until the rear suspension assembly 26 is illustrated in a fully loaded state in FIGS. 20 and 25.

As the suspension is loaded, the suspension member 70 pivots relative to the frame assembly 20 and the trailing arm 40 in order to constrain the trailing arm in a configuration that maintains the rear ground-engaging member 14 in a neutral toe configuration (or at a predetermined toe such as plus or minus three degrees) while permitting the remaining components of the rear suspension assembly 26 to pivot and move as appropriate to travel during loading and unloading. The relative positioning of the coupling positions (e.g., the joint 68, the first coupler 74 of the suspension member 70, and the coupling of the shock absorber 48 to the trailing arm 40) is operable to adjust the sensitivity of the toe control of suspension member 70. As mentioned, the relative position of the second coupler 76 relative to the coupling position 43 of the first radius rod 42 and the first coupler 58 of the trailing arm 40 is operable to adjust the sensitivity of the toe control of suspension member 70. It is noted that in some embodiments, the toe of the rear ground-engaging member 14 may not be such that the rear ground-engaging member 14 are exactly parallel to each other, however, the toe of the rear ground-engaging members 14 is constrained to less than five degrees off-axis of the desired longitudinal axis of the rear ground-engaging members 14 as the rear suspension assembly 26 travels through varying levels of loading (e.g., compression and decompression of the shock absorbers 48).

Figure 26:
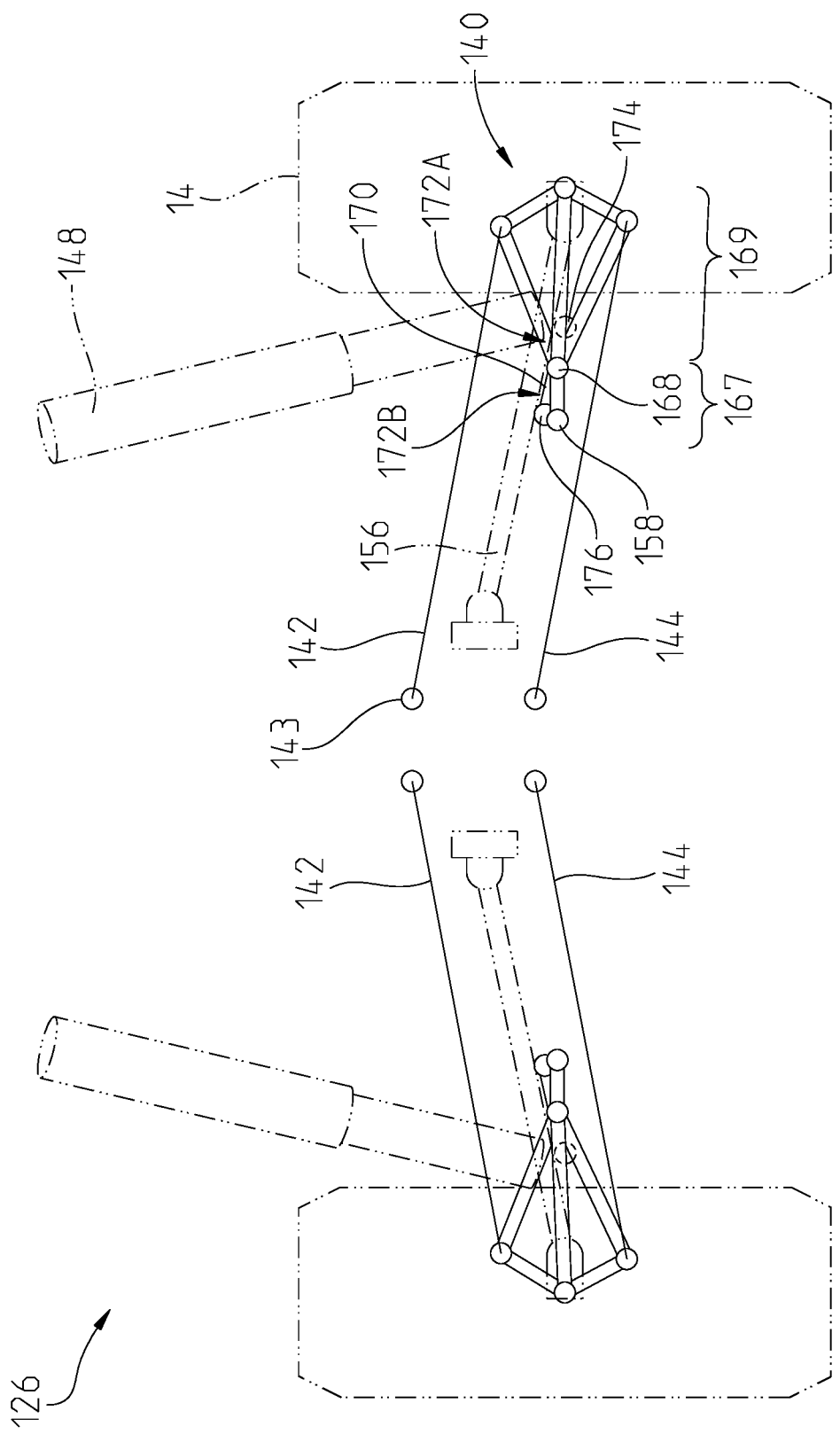
FIG. 26 is a front view of another embodiment of a rear suspension assembly of the vehicle of FIG. 1.

Referring now to FIGS. 26-42, another embodiment of a rear suspension assembly 126 is provided. Referring more specifically to FIG. 26, a schematic of the rear suspension assembly 126 is illustrated in which the rear suspension assembly 126 is coupled to rear ground-engaging members 14. The rear suspension assembly 126 of this embodiment includes a trailing arm 140 with a first longitudinal portion 167 and a second longitudinal portion 169 coupled at a joint 168. The rear suspension assembly 126 includes an upper or first radius rod 142 coupled to the second longitudinal portion 169 of the trailing arm and a lower or second radius rod 144 coupled to the second longitudinal portion 169 of the trailing arm 140 at a position vertically lower than the coupling position of the first radius rod 142.

Figure 27:
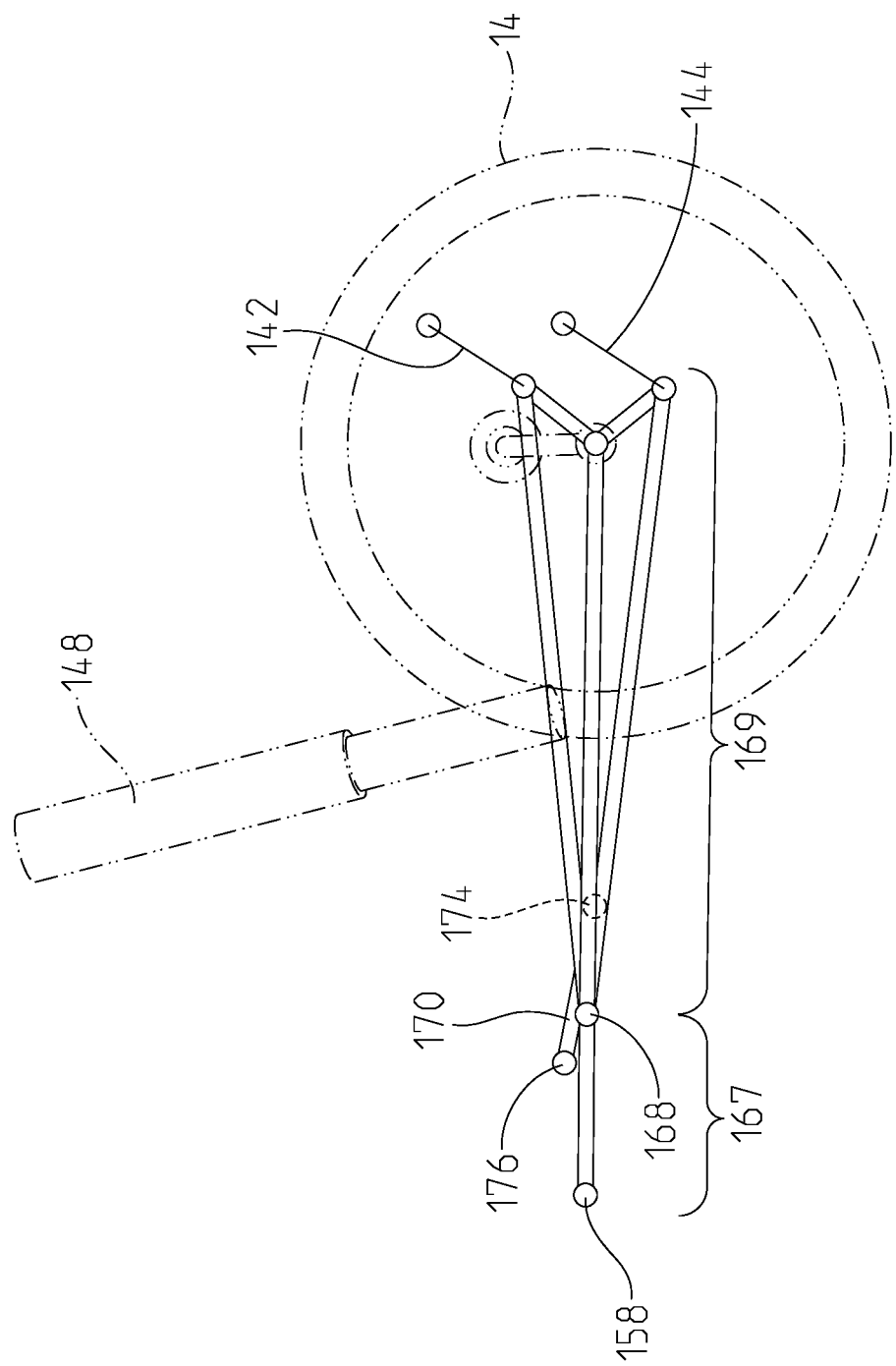
FIG. 27 is a side view of the rear suspension assembly of FIG. 26.
Figure 28:
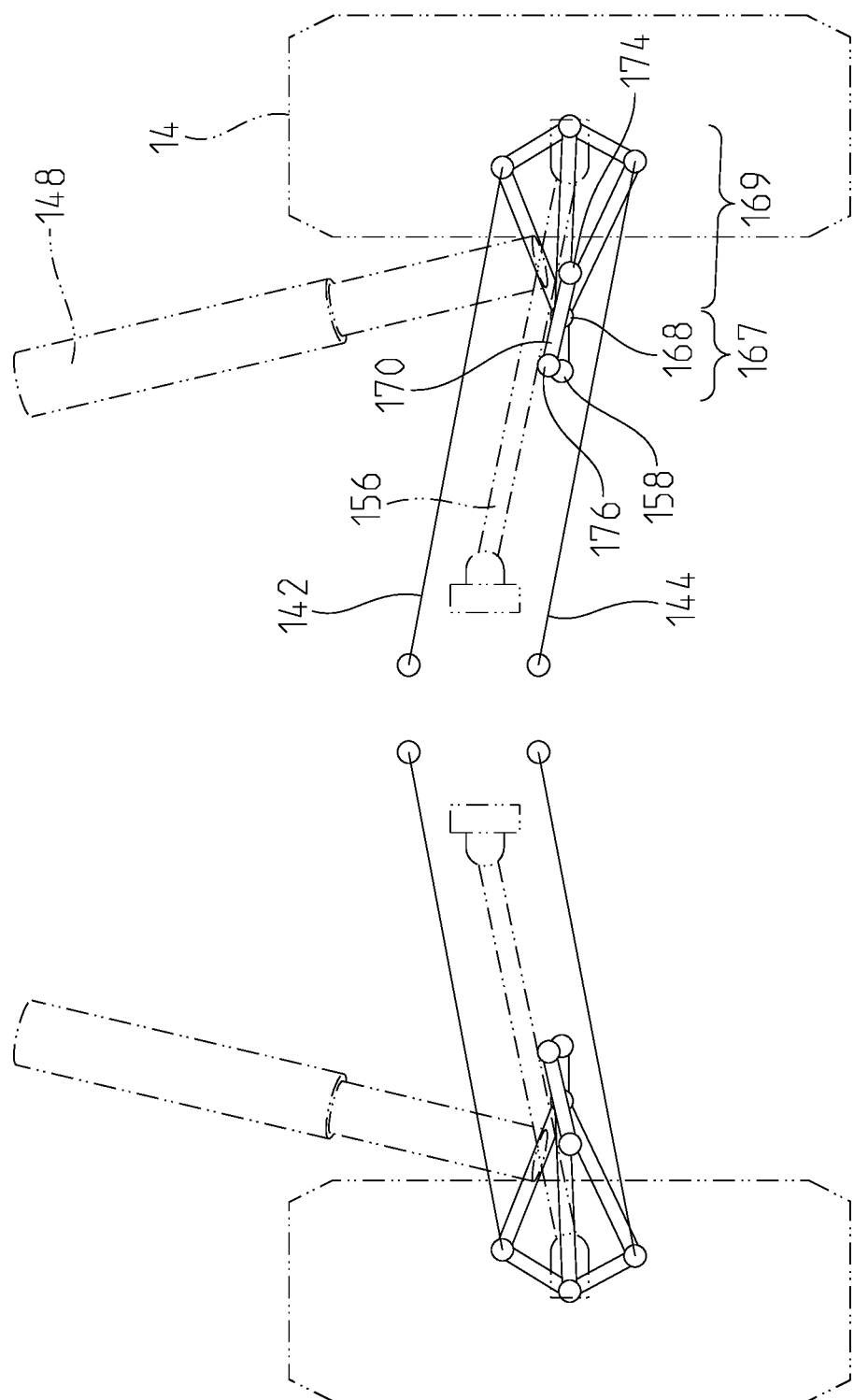
FIG. 28 is a rear view of a rear suspension assembly of FIG. 26.

FIG. 27 illustrates a side schematic view of the embodiment of FIG. 26 which includes a shock absorber 148 coupled to the second longitudinal portion 169 of the trailing arm 140 at a position longitudinally rearward of the joint 168. The rear suspension assembly 126 includes a suspension member 170 that is coupled to the second longitudinal portion 169 of the trailing arm 140 forward of and longitudinally spaced from the coupling position of the shock absorber 148 to the second longitudinal portion 169. The suspension member 170 is coupled to the second longitudinal portion 69 at a first coupler 174 that is longitudinally rearward of the joint 168 and forward of the position at which the shock absorber 148 is coupled to the trailing arm 140. The suspension member 170 extends from the trailing arm 140 at an angle greater than zero degrees relative to the trailing arm 140, for example laterally inward and longitudinally forward (see FIGS. 28-33).

Figure 29:
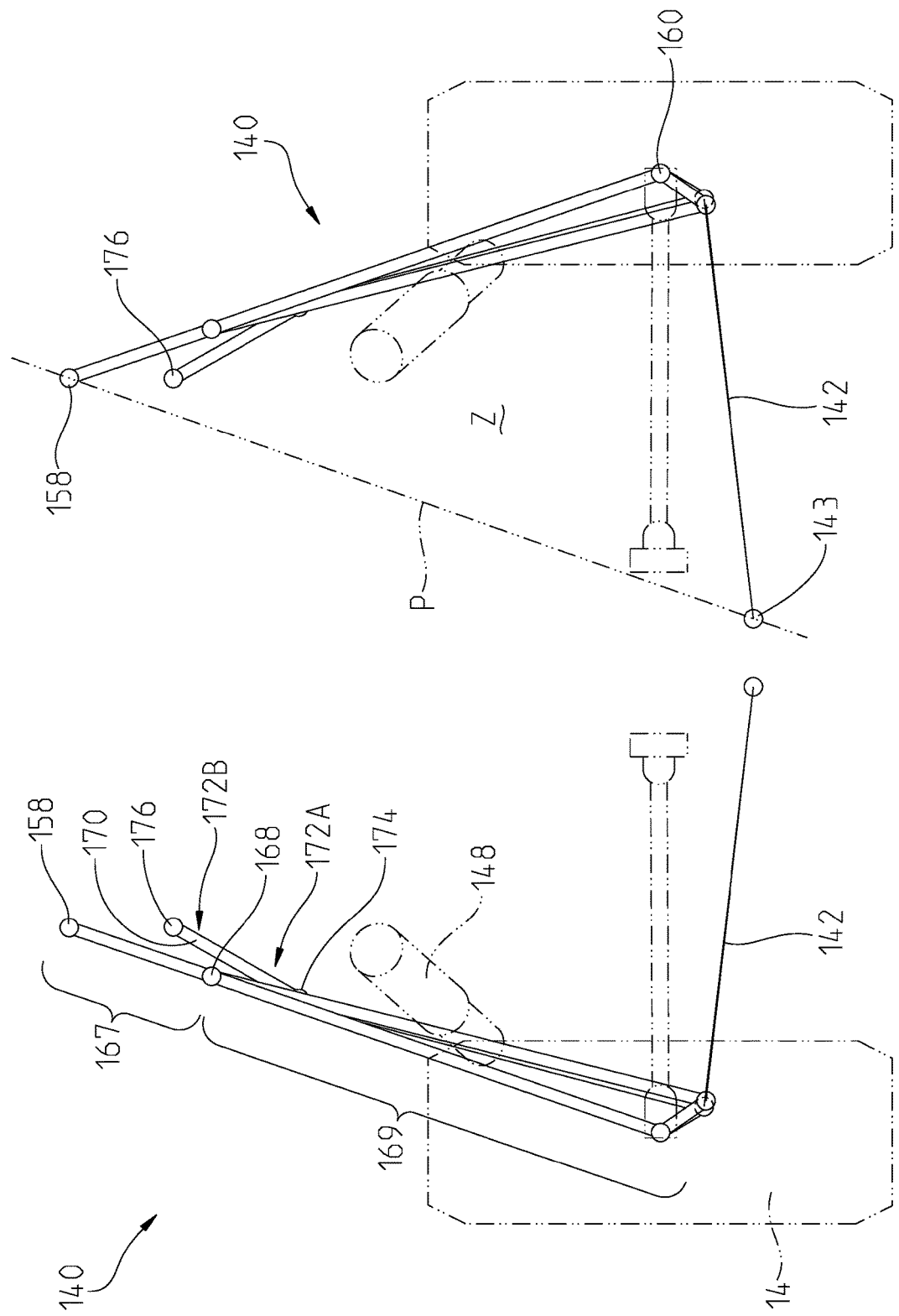
FIG. 29 is a top view of the rear suspension assembly of FIG. 26.
Figure 30:
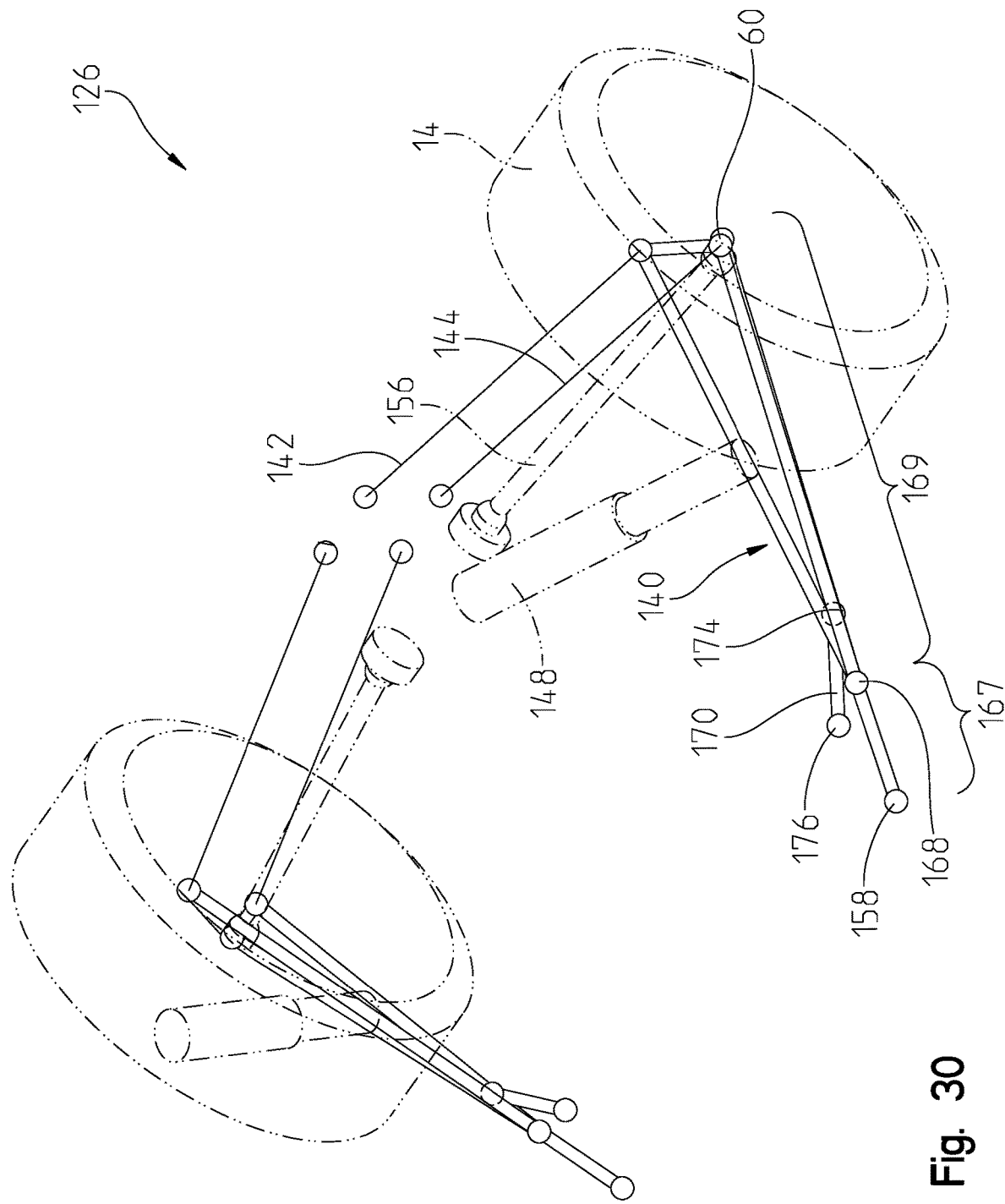
FIG. 30 is a front left perspective view of the rear suspension assembly of FIG. 26.
Figure 31:
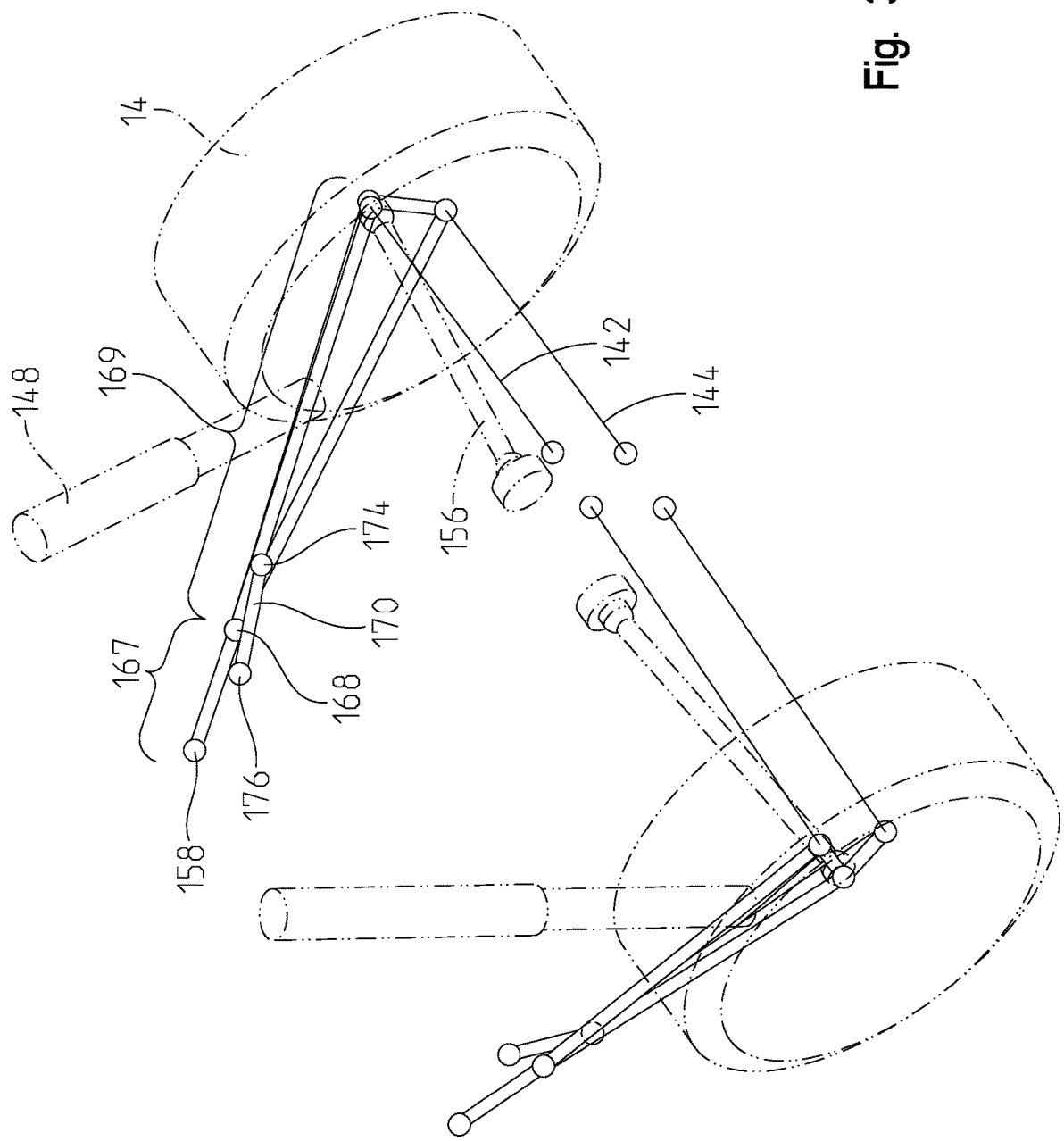
FIG. 31 is a rear left perspective view of the rear suspension assembly of FIG. 26.
Figure 32:
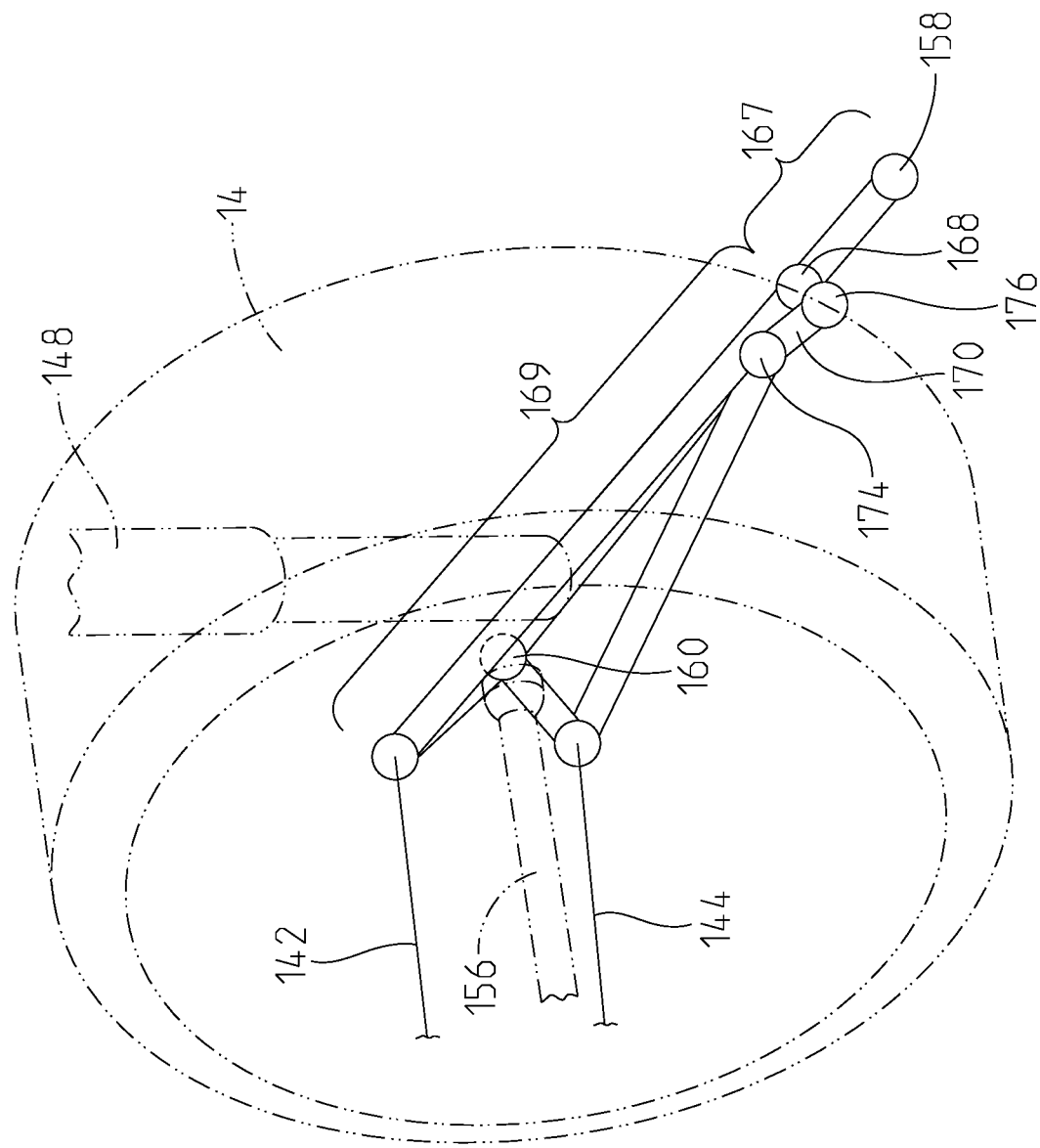
FIG. 32 is an expanded view of the rear suspension assembly of FIG. 26 engaged with a rear-ground engaging member.
Figure 33:
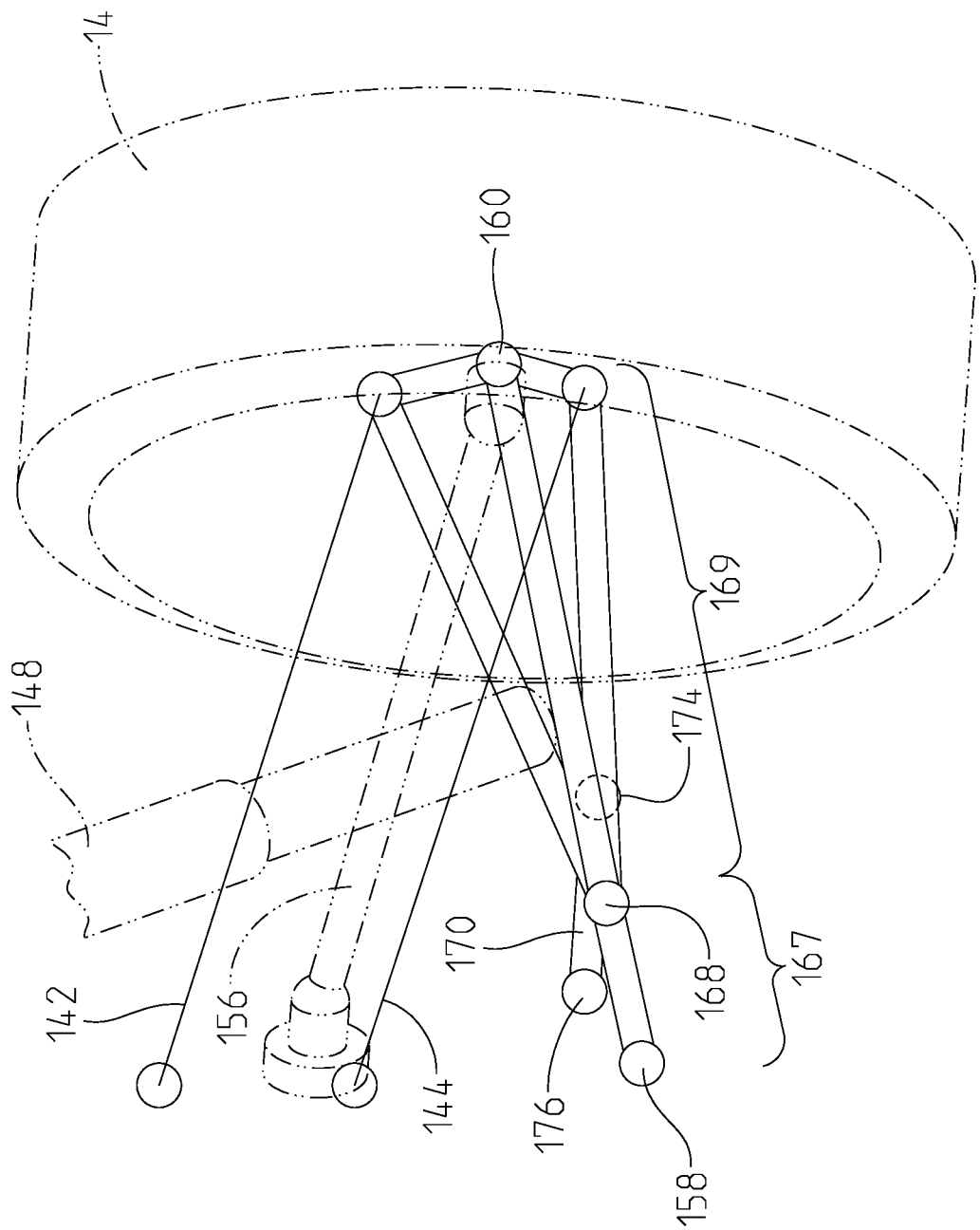
FIG. 33 is another detailed view of the rear suspension assembly of FIG. 32.

Referring to FIG. 29, the rear suspension assembly 126 is illustrated from a top view. The first portion 172A of the suspension member 170 is coupled to the second longitudinal portion 167 of the trailing arm 140 (e.g., at the first coupler 174). A second coupler 176 may be positioned on the frame assembly 20 to which the second portion 172B of the suspension member 170 is coupled and which is operable to allow the suspension member 170 to pivot relative to the frame assembly 20. In some embodiments, the suspension member 170 may include an actuator that allows for active control of toe of the rear ground-engaging members 14 (e.g., pneumatic, motor, and so forth).

Referring still to FIG. 29, the first coupler 158 of the trailing arm 140 is shown positioned at a forward end of the first longitudinal portion 167 of the trailing arm 140. The first radius rod 142 is shown with a coupling position 143 at which the first radius rod 142 couples to the frame assembly 20. A plane P is illustrated extending between the first coupler 158 of the trailing arm 140 and the coupling position 143 of the first radius rod 142, the plane extending vertically into and out of the page. The suspension member 170 couples to the frame assembly 120 at the second coupler 176, wherein the second coupler 176 is positioned within or adjacent the plane P defined between the first coupler 158 of the trailing arm 140 and the coupling position 143 of the first radius rod 142. For example, the second coupler 176 is coupled to the frame assembly 20 such that the distance between the second coupler 176 of the suspension member 170 and the nearest point on the plane P is about 1:12 of the distance from the first coupler 158 of the trailing arm and the coupling position 143 of the first radius rod 142 which define the plane P. Various rations of the distances described above are contemplated including about 1:15, 1:20, 1:25, 1:30, 1:35, 1:40, 1:45, 1:50, 1:55, 1:60, or less. In some embodiments, another way of defining the relative position of the second coupler 176 with respect to components of the rear suspension assembly 126 includes defining a zone Z within which the second coupler 176 is positioned. The zone Z is defined as a space as viewed from above and bounded by the trailing arm 140, the first radius rod 142, and an interior edge defined between the front end of the trailing arm 140 and the inner end of the first radius rod 142 as viewed from above (i.e., the plane P described previously). The second coupler 176 is positioned within the zone Z adjacent the interior edge (i.e., the plane P).

As illustrated in FIG. 29, the shock absorber 148 is coupled to the trailing arm 140 rearward of the joint 168. In some embodiments, the shock absorber 148 is coupled between a longitudinal midpoint of the second longitudinal portion 169 of the trailing arm 140 and the second coupler 160 to the rear ground-engaging member 14 (in some embodiments closer to the longitudinal midpoint than to the second coupler 160). The placement of the coupling between the shock absorber 148 and the trailing arm 140 in combination with the first coupler 174 of the suspension member 170 to the trailing arm 140 provides control of toe of the rear ground-engaging members 14. In some embodiments, the first coupler 174 includes a bearing carrier or hub.

Referring to FIGS. 34-42, the embodiment of FIG. 26 is illustrated with the rear suspension assembly 126 in various positions through the travel of the rear suspension assembly 126 (i.e., through travel of the shock absorber 148 in loaded, unloaded, and partially loaded conditions). FIGS. 34-38 show views of the rear suspension assembly 126 through its travel from a frontal view, and FIGS. 39-42 show views of the rear suspension assembly 126 through its travel from a top view. The position of the rear suspension assembly 126 of FIG. 34 corresponds with the position of the rear suspension assembly 126 of FIG. 39, the position of the rear suspension assembly 126 of FIG. 35 corresponds with the position of the rear suspension assembly 126 of FIG. 40, the position of the rear suspension assembly 126 of FIG. 36 corresponds with the position of the rear suspension assembly 126 of FIG. 41, and the position of the rear suspension assembly 126 of FIG. 37 corresponds with the position of the rear suspension assembly 126 of FIG. 42. Although the frame assembly 20 is not shown in these figures, it is understood that the coupling positions of the rear suspension assembly 126 to the frame assembly 20 (e.g., coupling position 143, first coupler 158, and second coupler 176) represent the correct positions of the couplings (e.g., those positions are substantially static) and the rear suspension assembly 126 moves with respect to the frame assembly 20.

Figure 34:
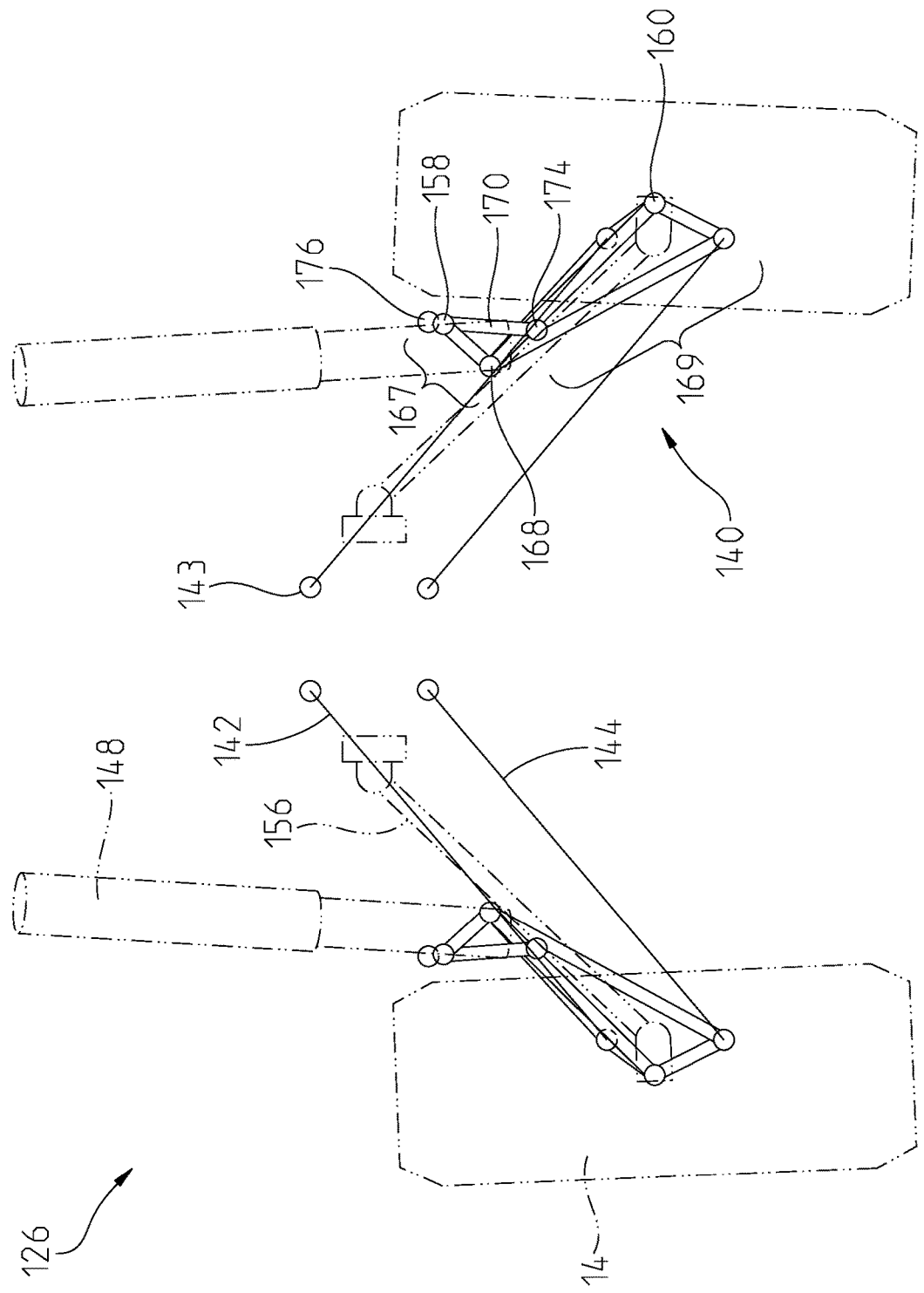
FIGS. 34-38 are front views of the rear suspension assembly of FIG. 26 illustrated throughout varying loading configurations of the rear suspension assembly.
Figure 35:
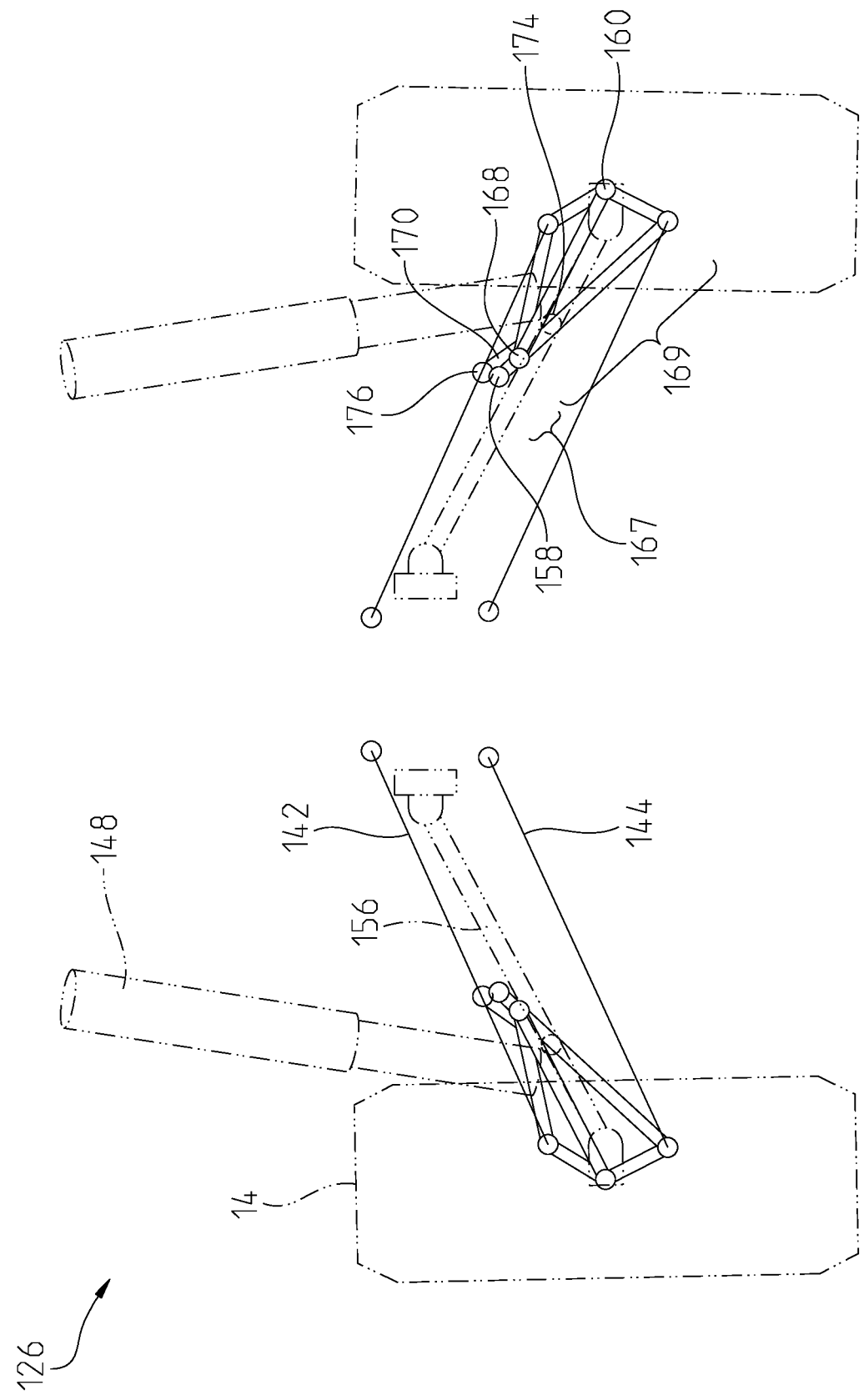
Figure 36:
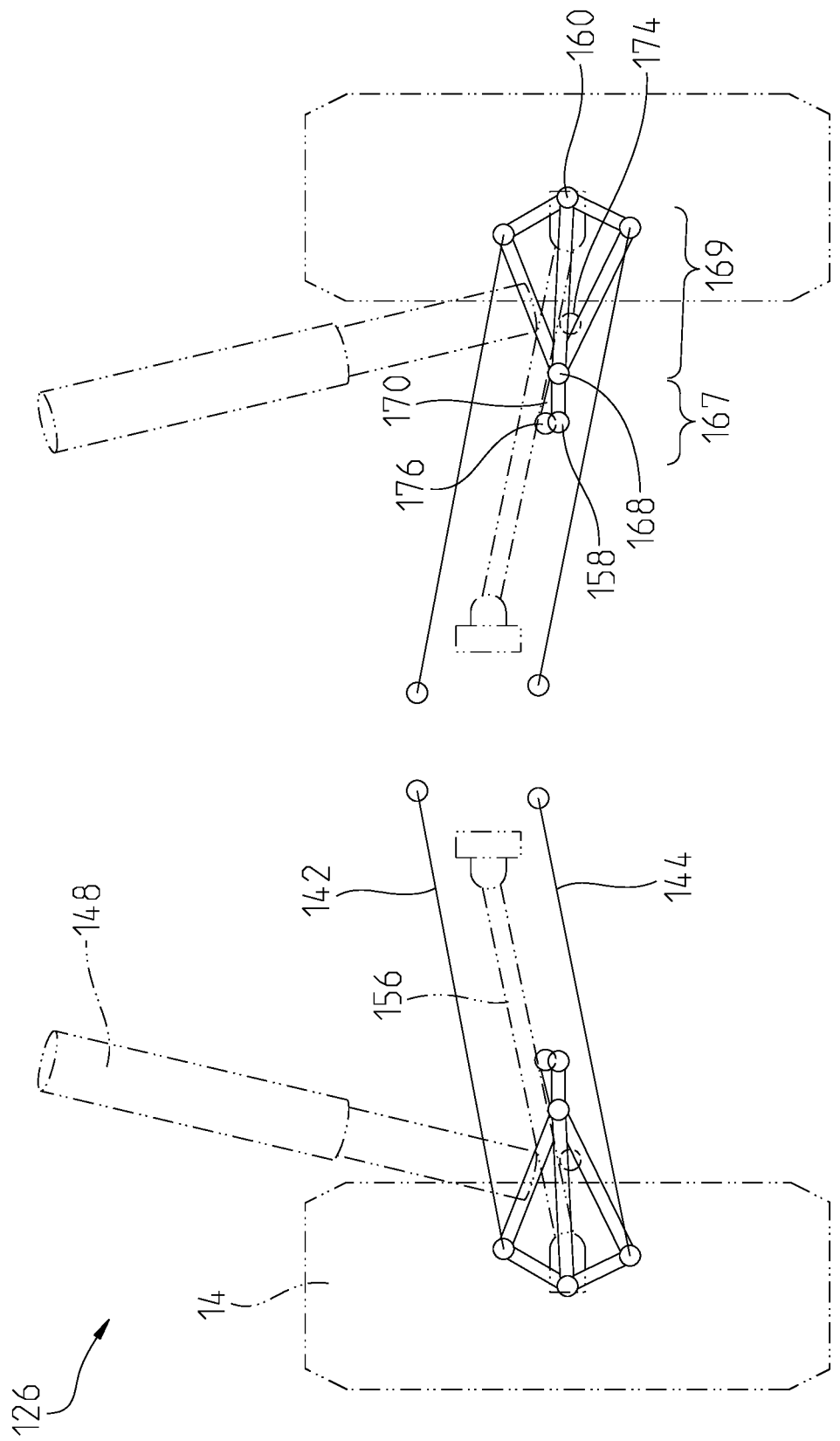
Figure 37:
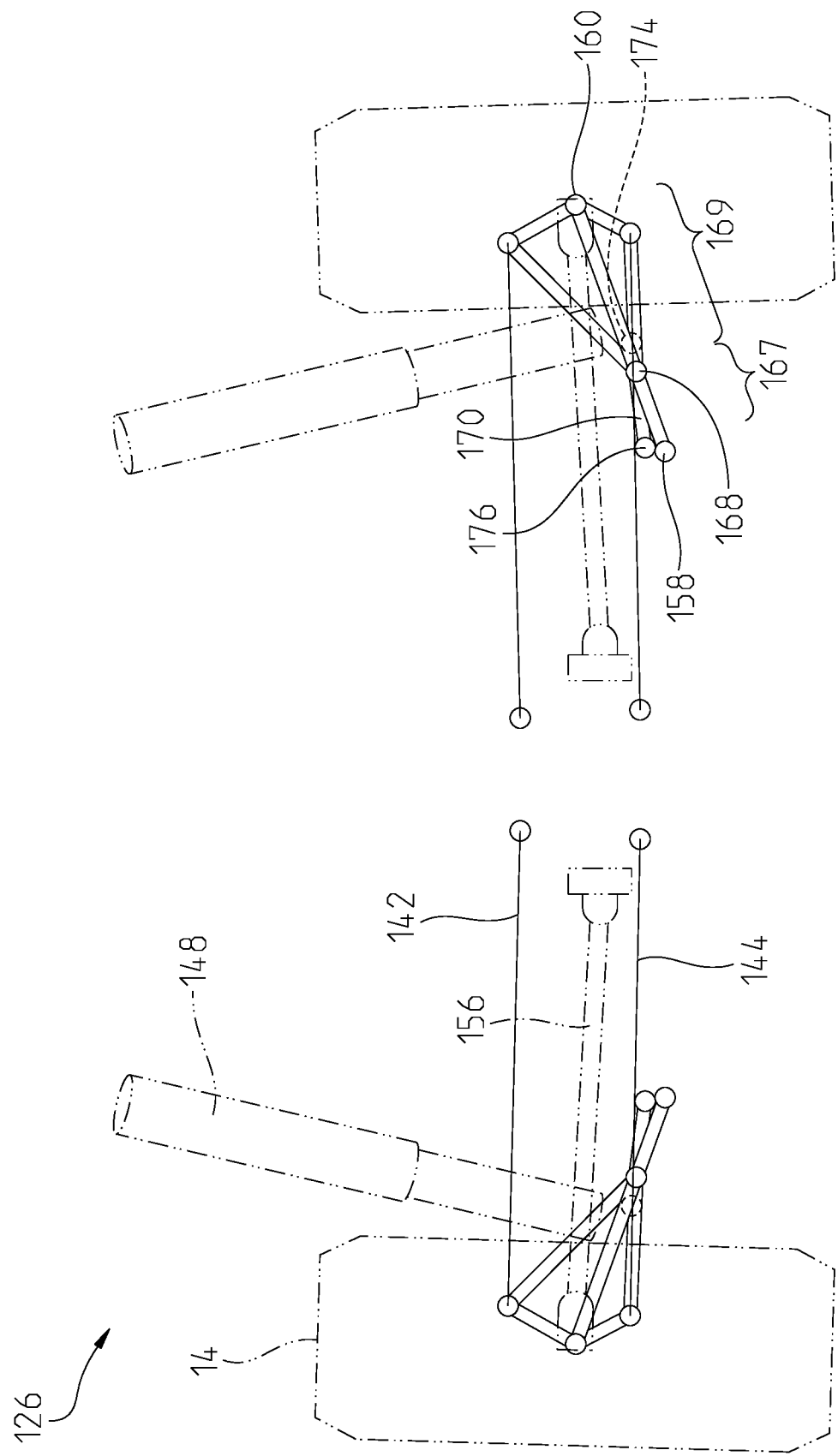
Figure 38:
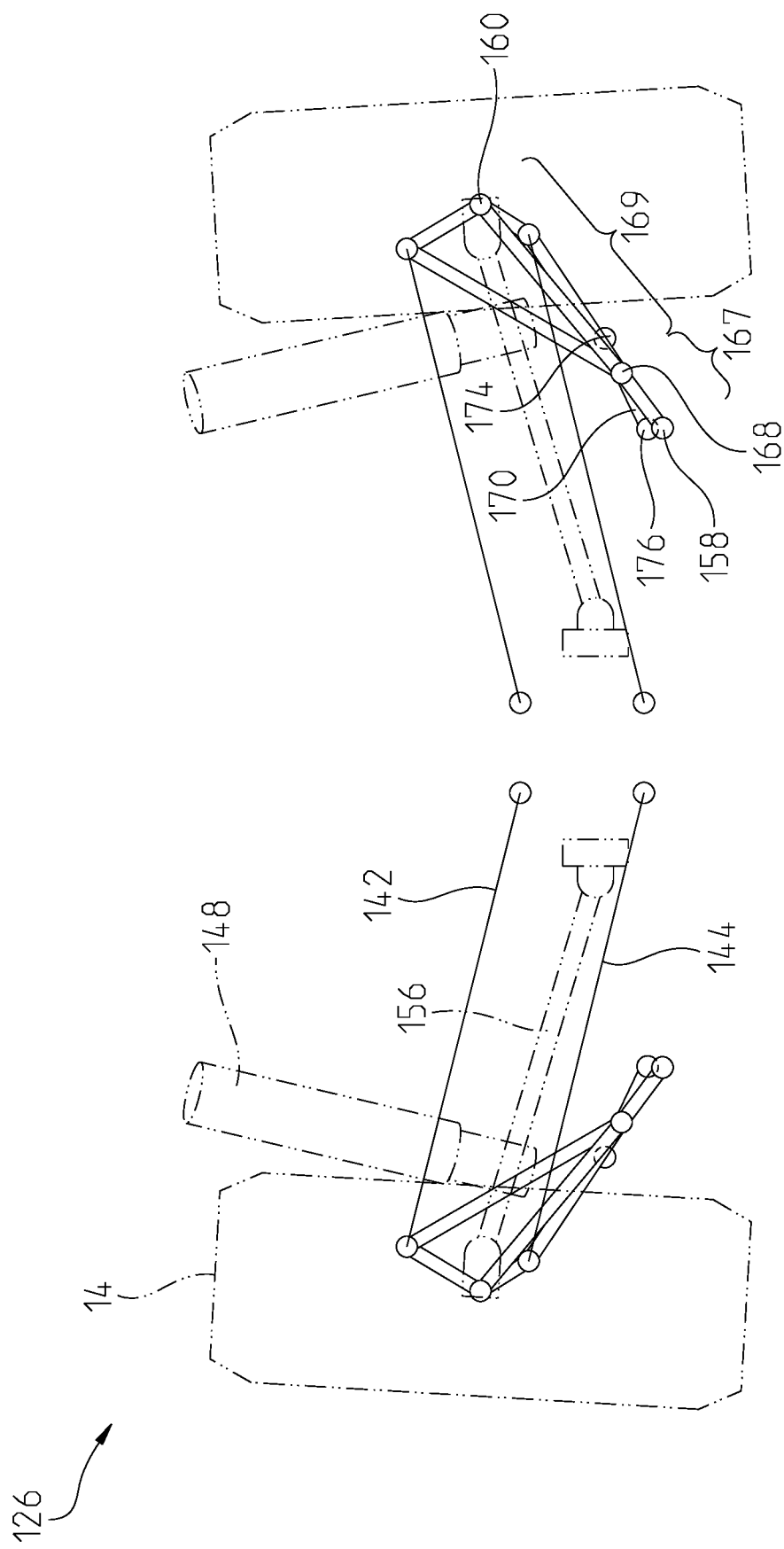
Figure 39:
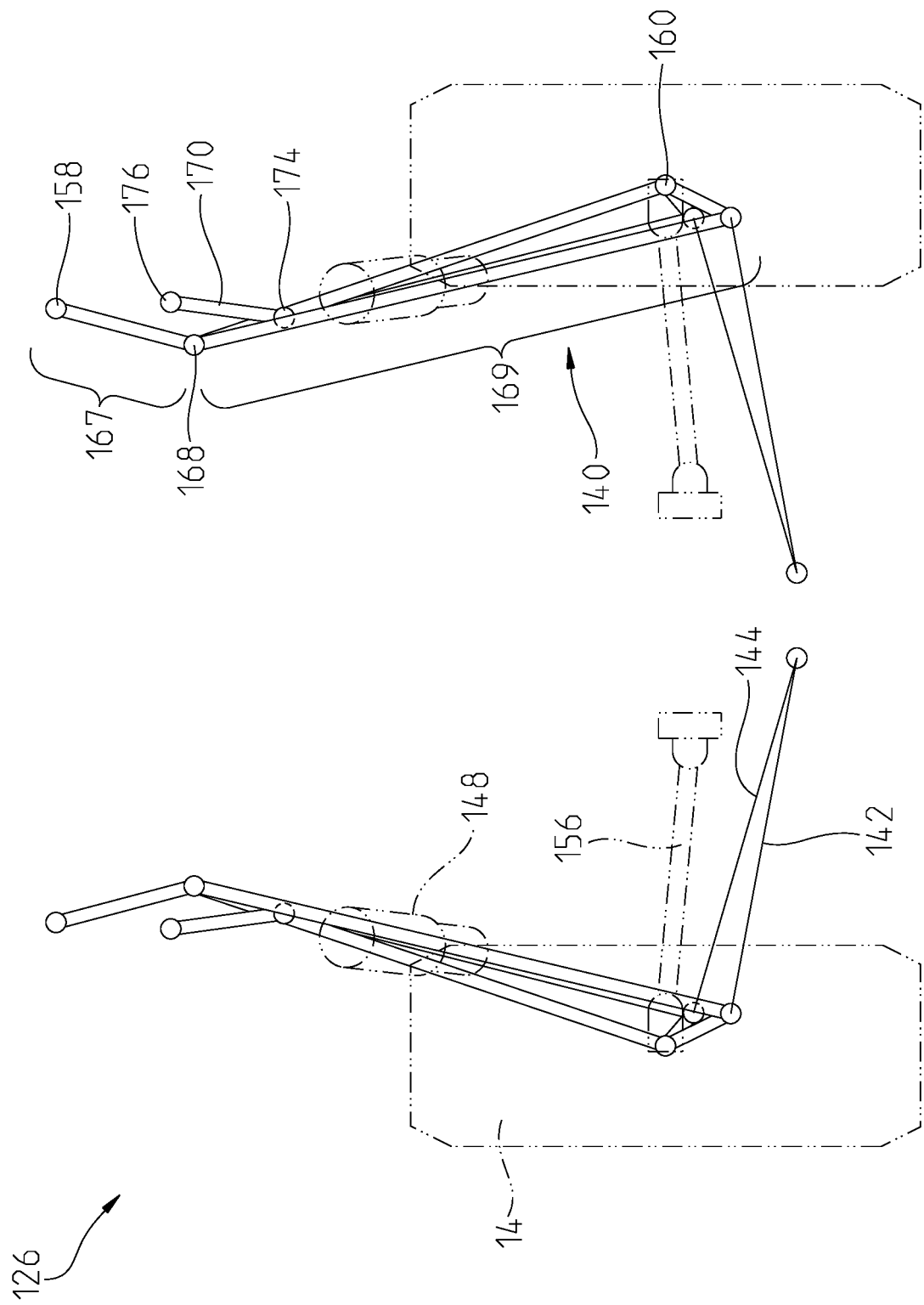
FIGS. 39-42 are top views of the rear suspension assembly of FIG. 26 illustrated throughout varying loading configurations of the rear suspension assembly.
Figure 40:
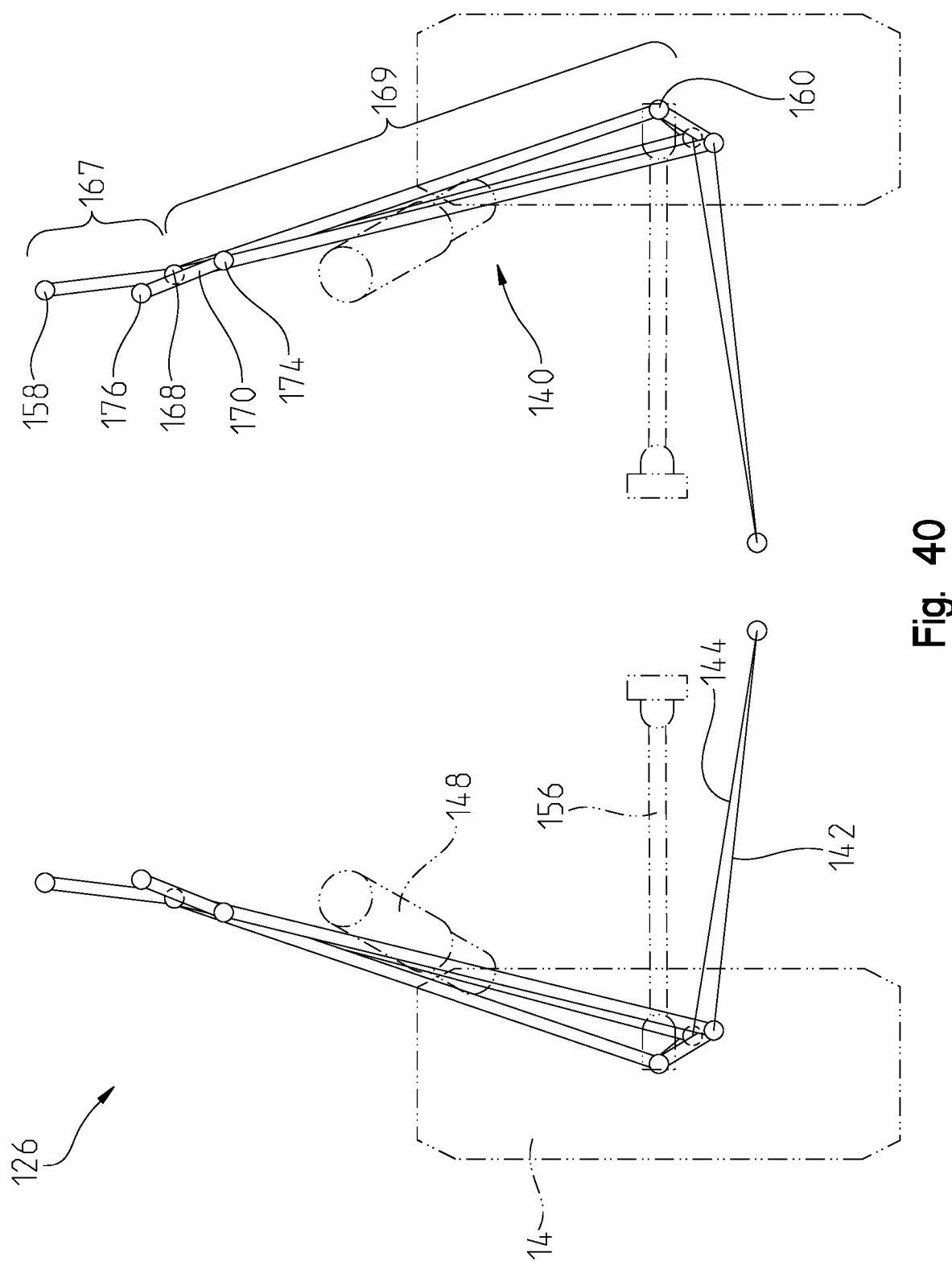
Figure 41:
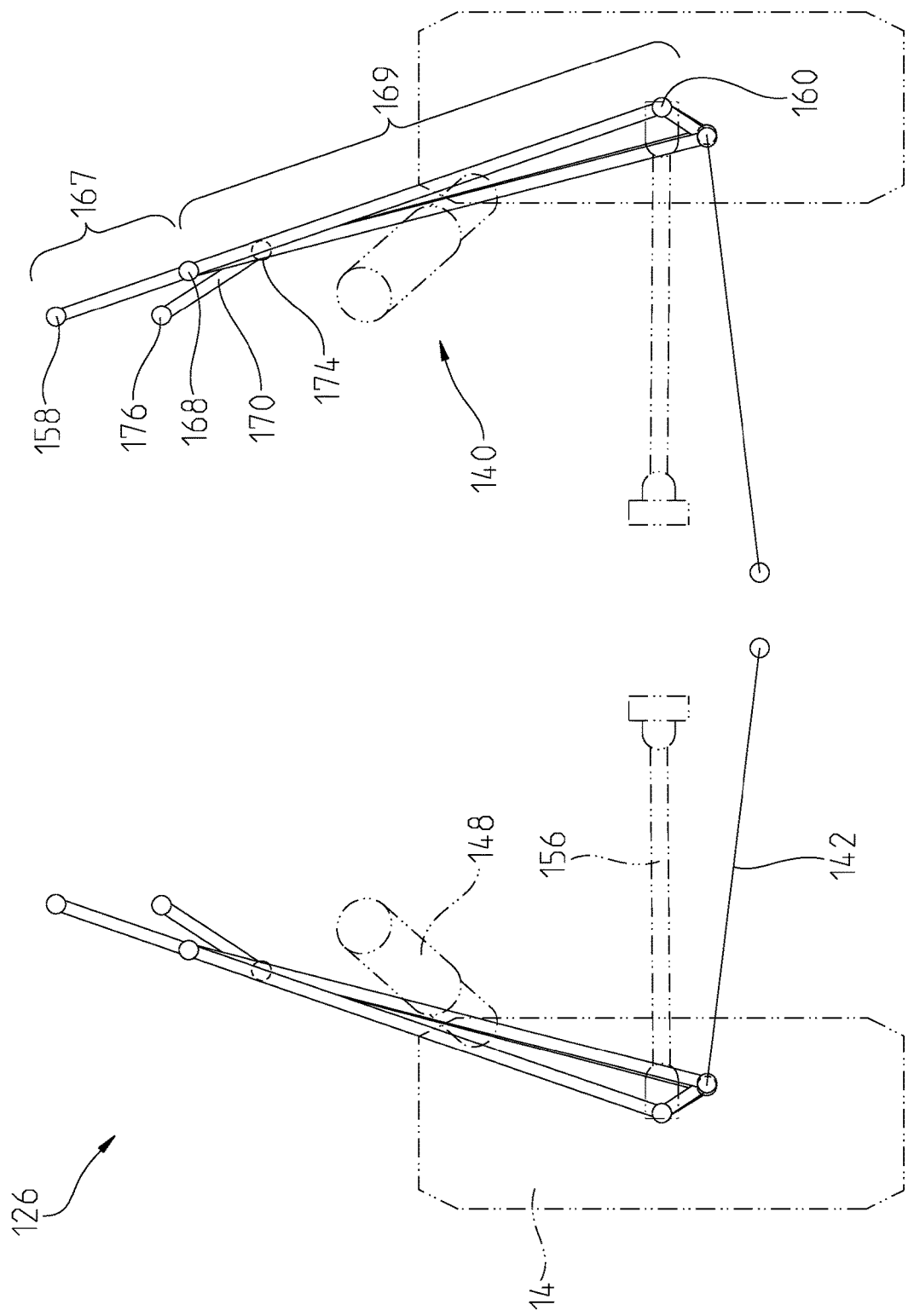
Figure 42:
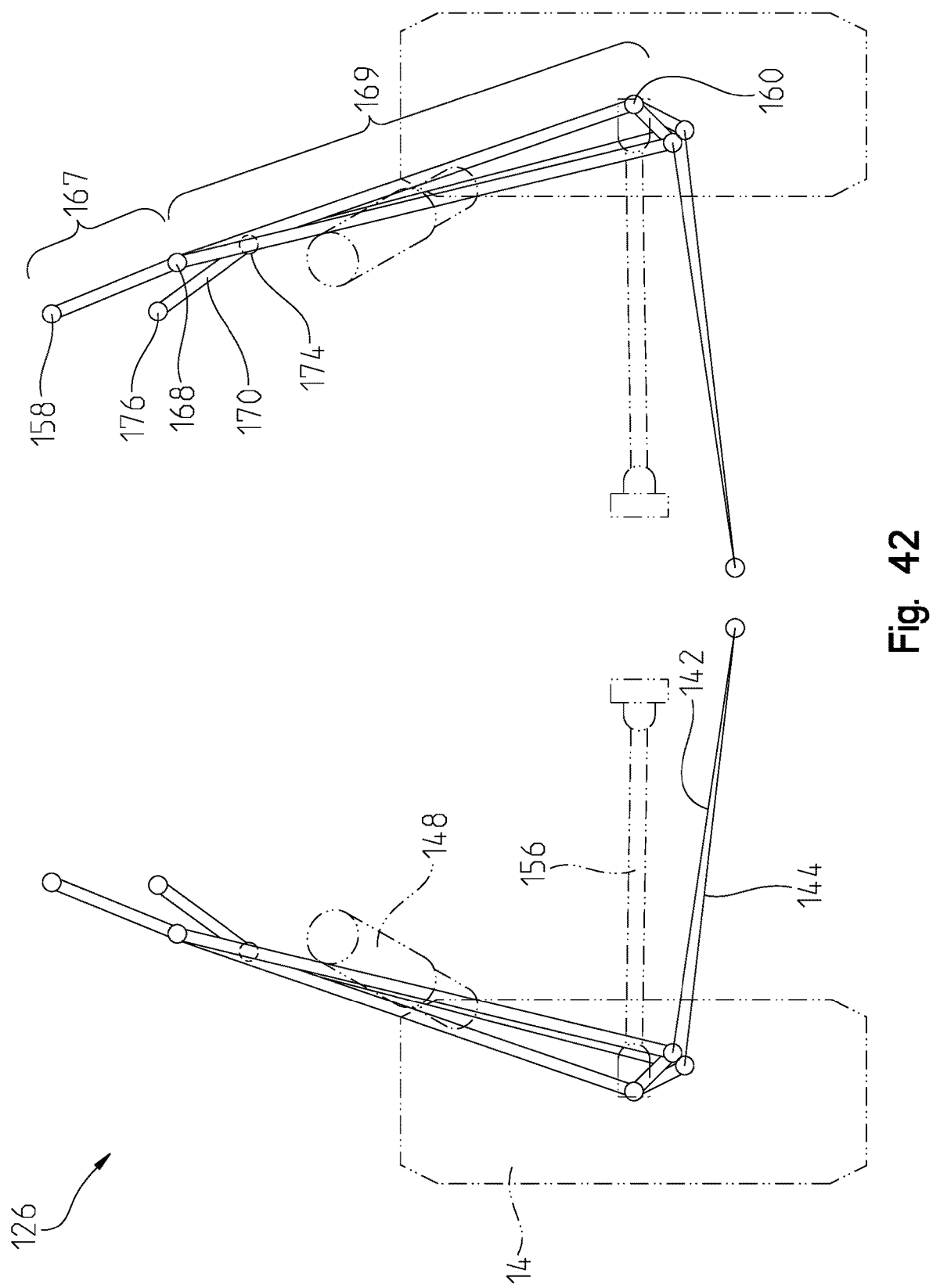

FIGS. 34 and 39 illustrate the rear suspension assembly 126 in a substantially unloaded state. As discussed, the coupling positions at which the rear suspension assembly 126 is coupled to the frame assembly 20 are substantially static. The toe of the rear ground-engaging members 14 is generally neutral or zero (or at a predetermined toe such as plus or minus three degrees) when the rear suspension assembly 126 is in a substantially unloaded state. The joint 168 between the first and second longitudinal portions 167, 169 of the trailing arm 140 allows the second longitudinal portion 169 to have a substantially fixed configuration relative to the rear ground-engaging member 14 while the first longitudinal portion 167 pivots generally laterally at the joint 168 and relative to the first coupler 158 to adjust for positional adjustment of other components of the rear suspension assembly 126. This pivoting and moving of the first longitudinal portion 167 can be appreciated in the remaining FIGS. 35-38 and 40-42. FIGS. 35-37 and 40-42 show a progression of the rear suspension assembly 126 through loading of the rear suspension assembly 126 until the rear suspension assembly 26 is illustrated in a fully loaded state in FIG. 38.

As the suspension is loaded, the suspension member 170 pivots relative to the frame assembly 20 and the trailing arm 140 in order to constrain the trailing arm in a configuration that maintains the rear ground-engaging member 14 in a neutral toe configuration (or at a predetermined toe such as plus or minus three degrees) while permitting the remaining components of the rear suspension assembly 126 to pivot and move as appropriate to travel during loading and unloading. The relative positioning of the coupling positions (e.g., the joint 168, the first coupler 174 of the suspension member 170, and the coupling of the shock absorber 148 to the trailing arm 140) is operable to adjust the sensitivity of the toe control of suspension member 170. As mentioned, the relative position of the second coupler 176 relative to the coupling position 143 of the first radius rod 142 and the first coupler 158 of the trailing arm 40 is operable to adjust the sensitivity of the toe control of suspension member 170. It is noted that in some embodiments, the toe of the rear ground-engaging member 14 may not be such that the rear ground-engaging member 14 are exactly parallel to each other, however, the toe of the rear ground-engaging members 14 is constrained to less than five degrees off-axis of the desired longitudinal axis of the rear ground-engaging members 14 as the rear suspension assembly 126 travels through varying levels of loading (e.g., compression and decompression of the shock absorbers 148).

Figure 43:
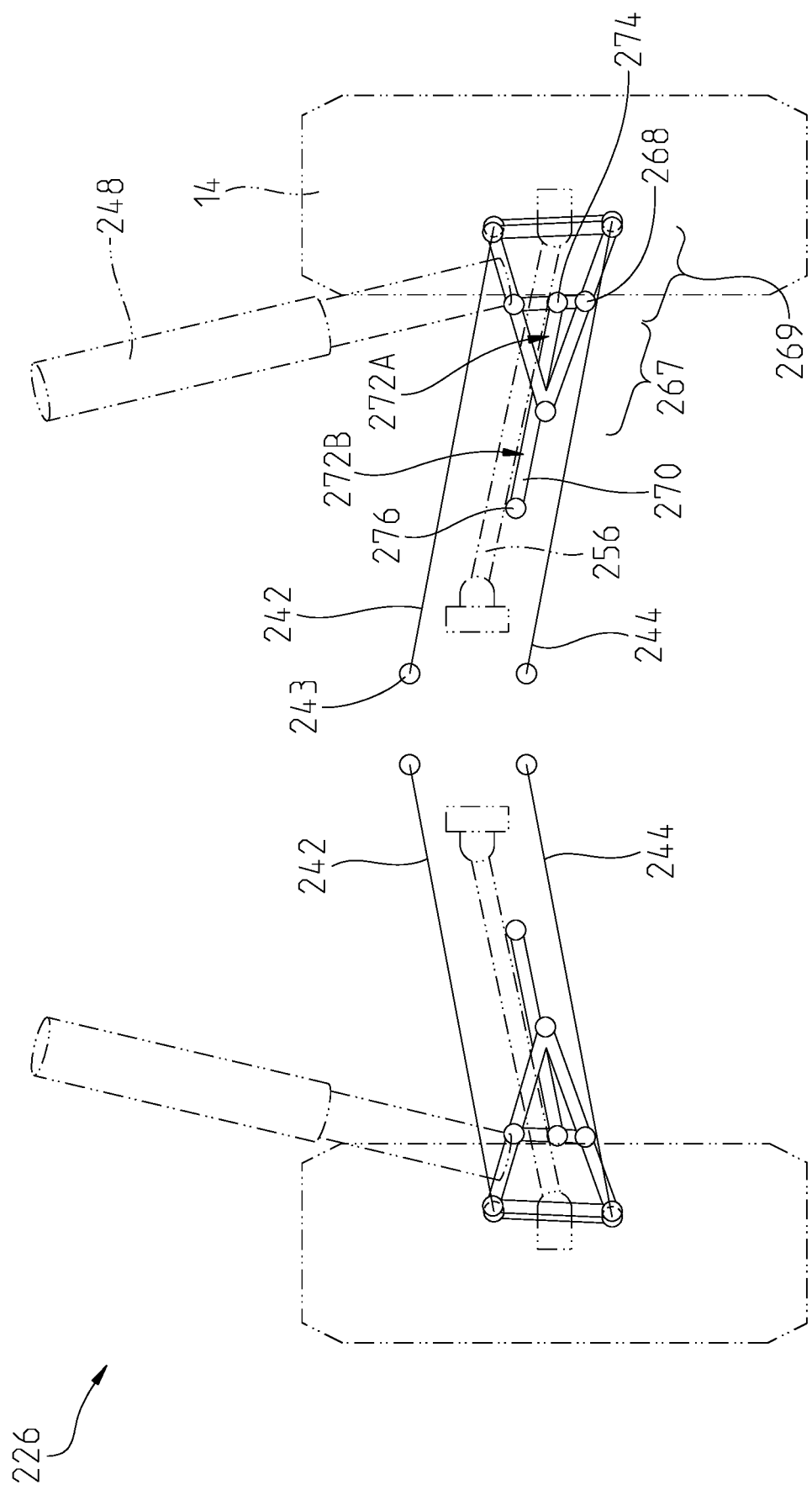
FIG. 43 is a front view of another embodiment of a rear suspension assembly of the vehicle of FIG. 1.

Referring now to FIGS. 43-60, another embodiment of a rear suspension assembly 226 is provided. Referring more specifically to FIG. 43, a schematic of the rear suspension assembly 226 is illustrated in which the rear suspension assembly 226 is coupled to rear ground-engaging members 14. The rear suspension assembly 226 of this embodiment includes a trailing arm 240 with a first longitudinal portion 267 and a second longitudinal portion 269. The trailing arm 240 is coupled to a hub 261 at a joint 268. In some embodiments, the joint 268 is positioned at a longitudinal position aligned with the center of the rear ground engaging member 14. The rear suspension assembly 226 includes an upper or first radius rod 242 coupled to the hub 161 at a position longitudinally rearward of the coupling of the trailing arm 240 to the hub 241 (e.g., rearward of the center of the rear ground engaging member 14) and a lower or second radius rod 244 coupled to the second the hub 161 at a position vertically lower than the coupling position of the first radius rod 242 and longitudinally rearward of the coupling of the trailing arm 240 to the hub 241 (e.g., rearward of the center of the rear ground engaging member 14).

Figure 44:
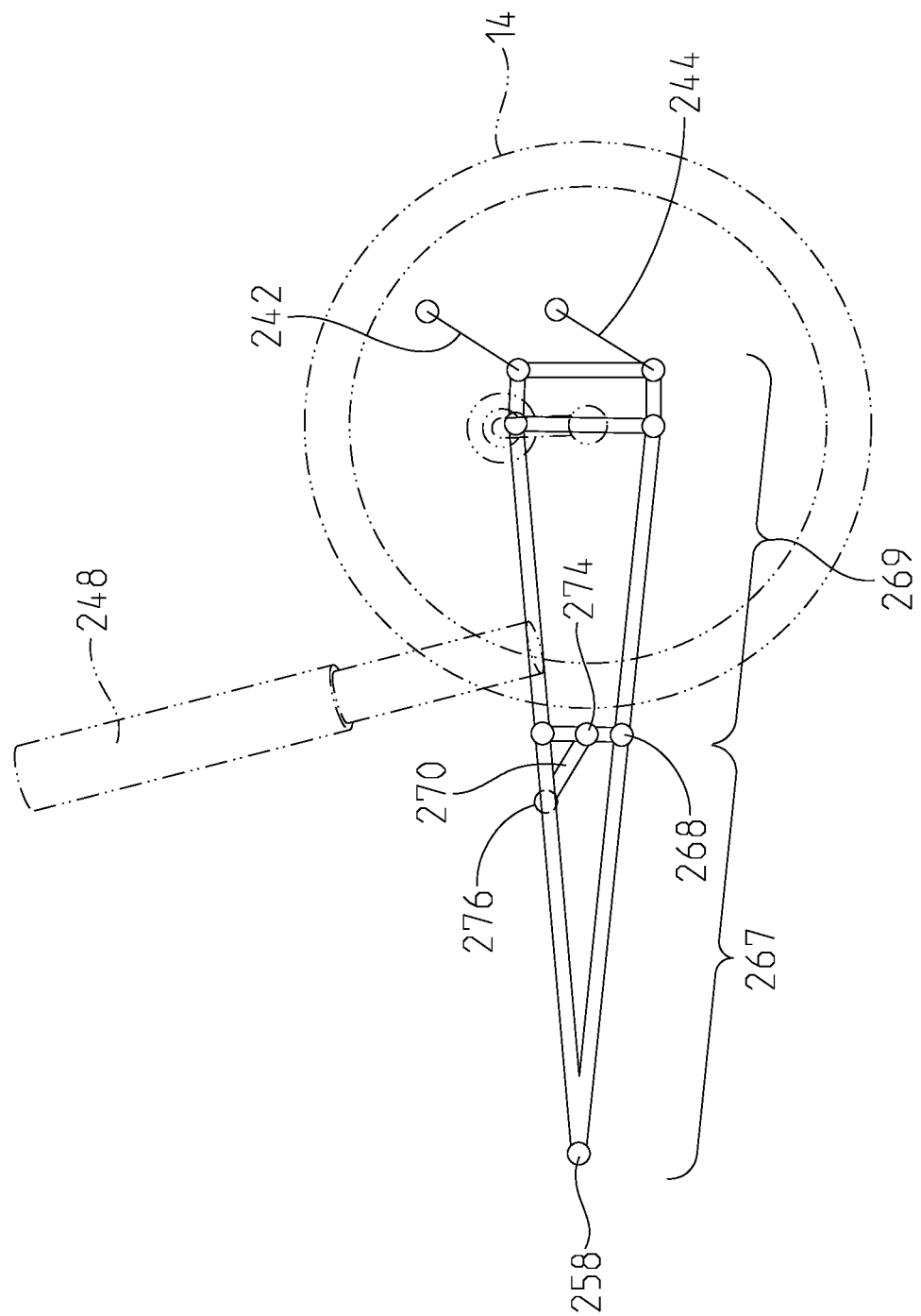
FIG. 44 is a side view of the rear suspension assembly of FIG. 43.
Figure 45:
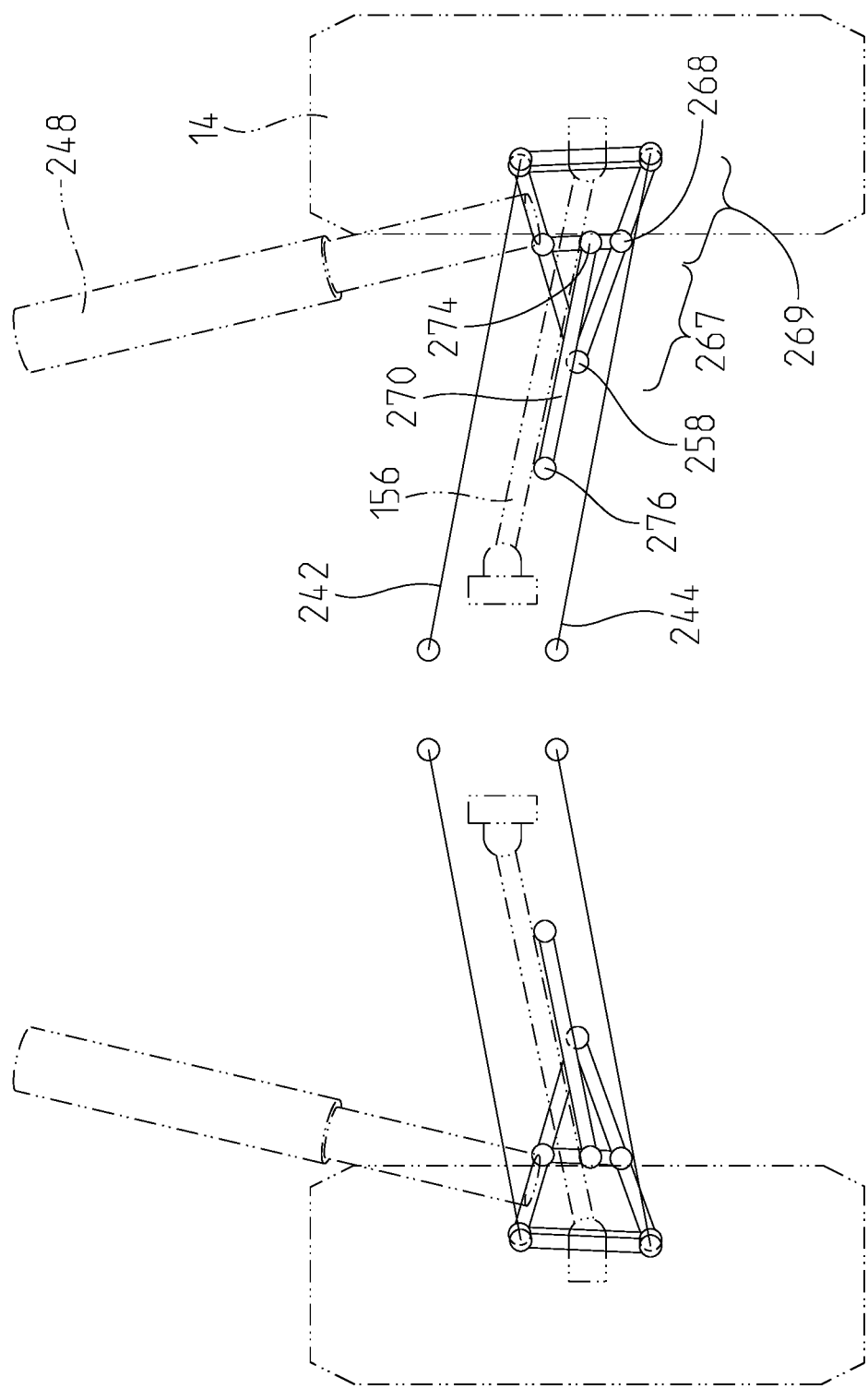
FIG. 45 is a rear view of a rear suspension assembly of FIG. 43.

FIG. 44 illustrates a side schematic view of the embodiment of FIG. 43 which includes a shock absorber 248 coupled to the second longitudinal portion 269 of the trailing arm 240 at a position longitudinally rearward of a coupling of a suspension member 270 to the trailing arm 240. Thus, the suspension member 270 is coupled to the trailing arm 240 forward of and longitudinally spaced from the coupling position of the shock absorber 248 to the second longitudinal portion 269. The suspension member 270 is coupled to the trailing arm 240 at a first coupler 274 that is longitudinally forward of the position at which the shock absorber 248 is coupled to the trailing arm 240. The coupling of the suspension member 270 and the shock absorber 248 are both longitudinally forward of the joint 268 at which the trailing arm 240 is coupled to the hub 241. The suspension member 270 extends from the trailing arm 240 at an angle greater than zero degrees, for example laterally inward and longitudinally forward (see FIGS. 45-49) relative to the trailing arm 240. In some embodiments, the joint 268 includes a bearing carrier or hub.

Figure 46:
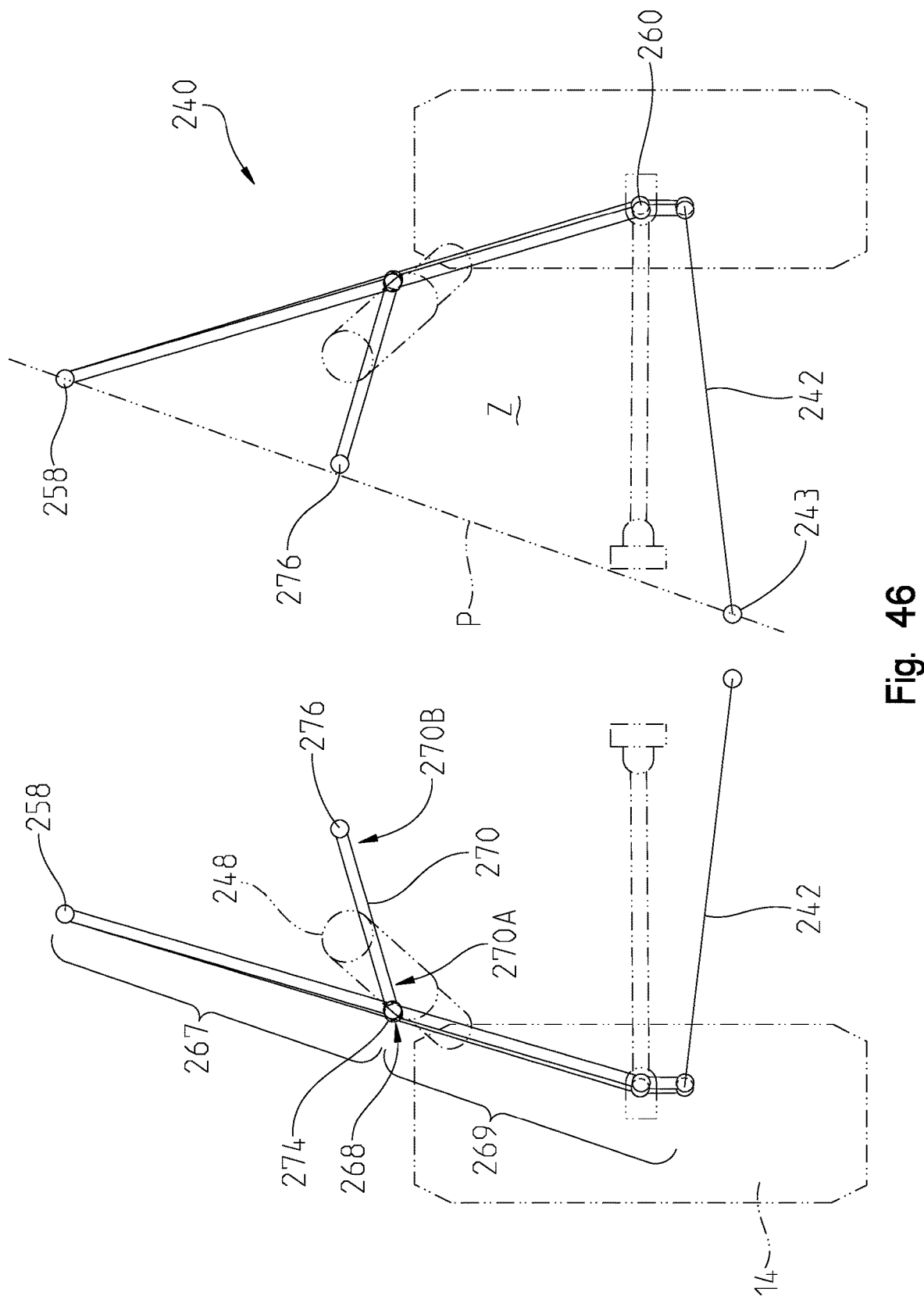
FIG. 46 is a top view of the rear suspension assembly of FIG. 43.
Figure 47:
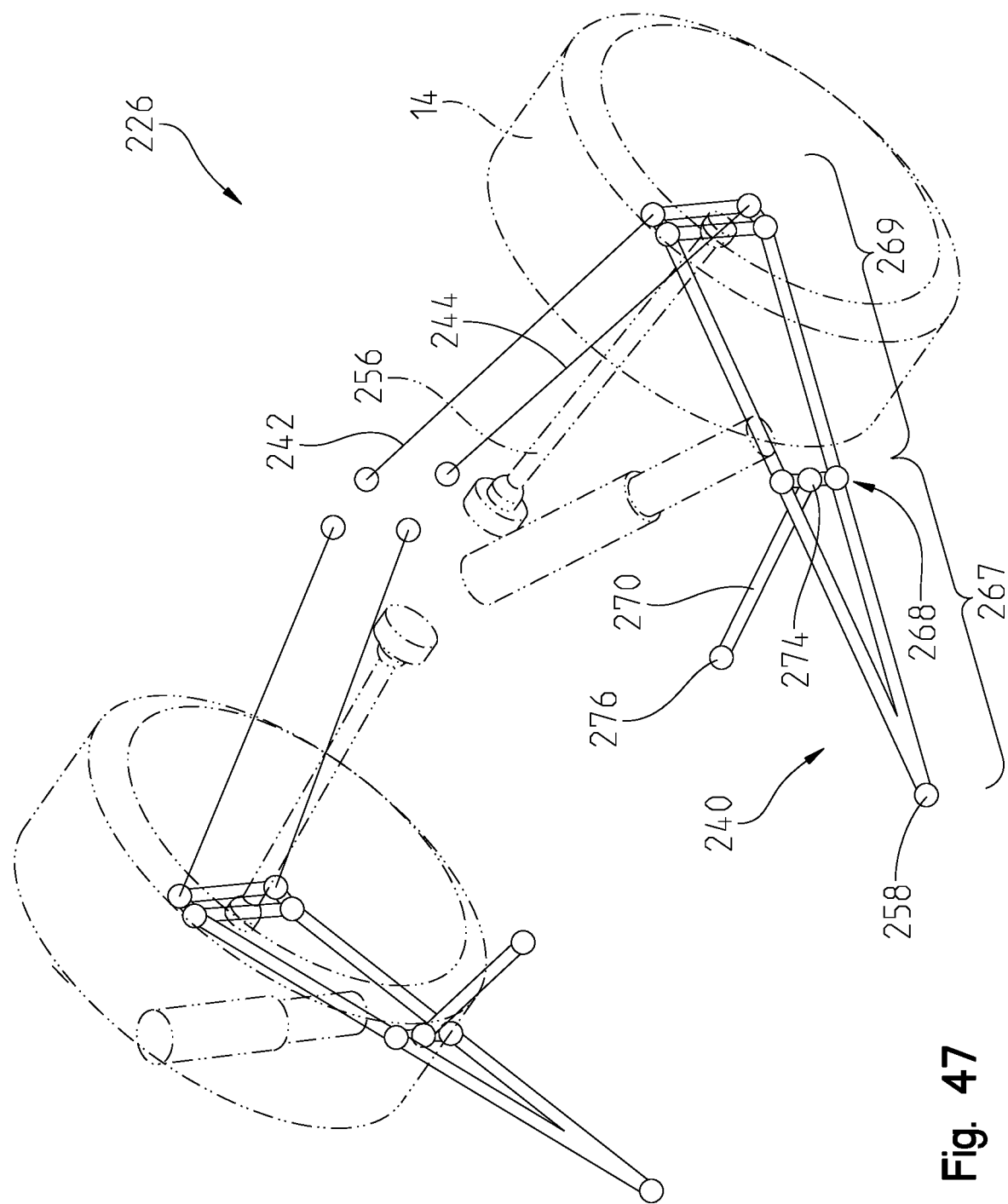
FIG. 47 is a front left perspective view of the rear suspension assembly of FIG. 43.
Figure 48:
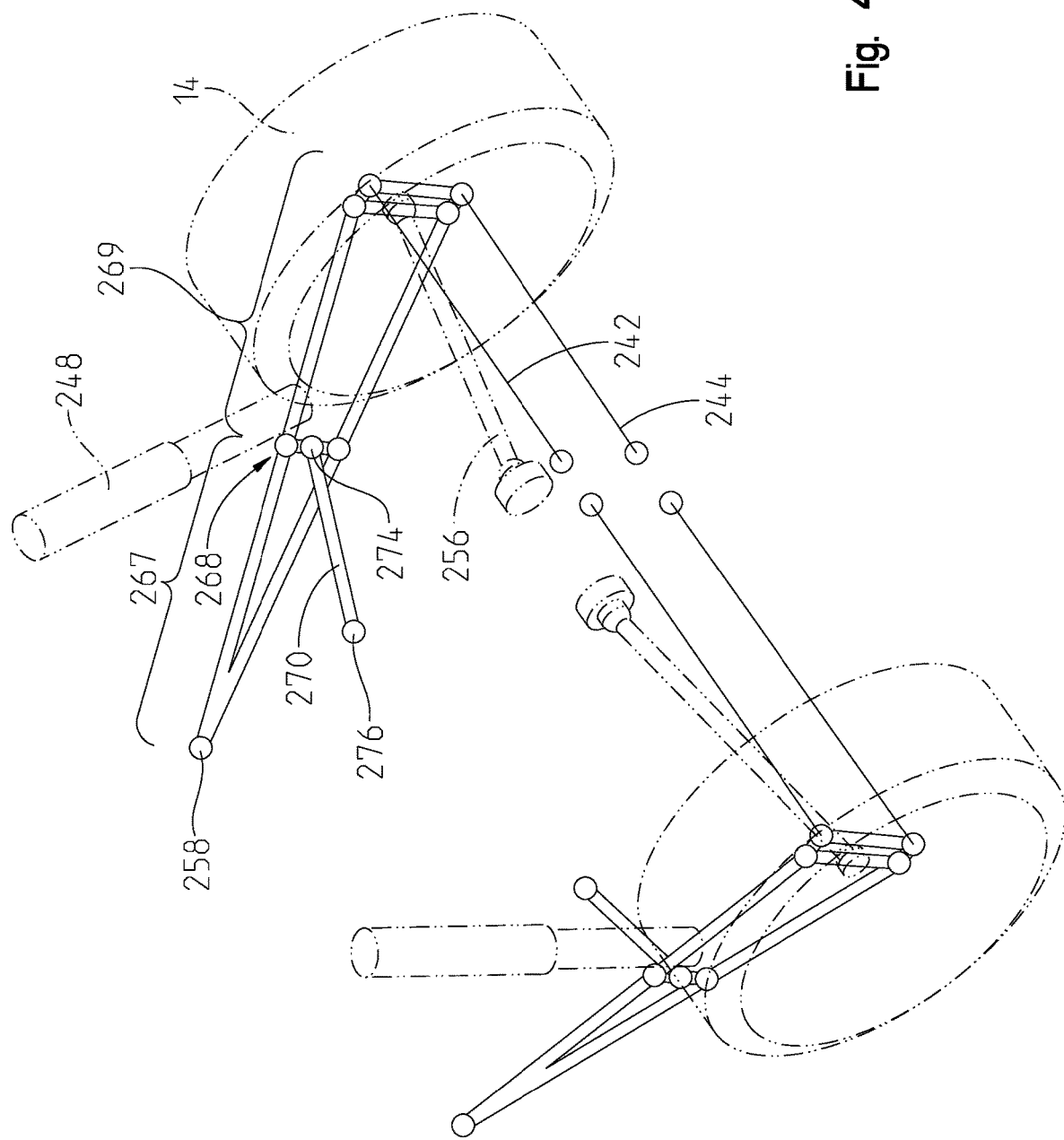
FIG. 48 is a rear left perspective view of the rear suspension assembly of FIG. 43.
Figure 49:
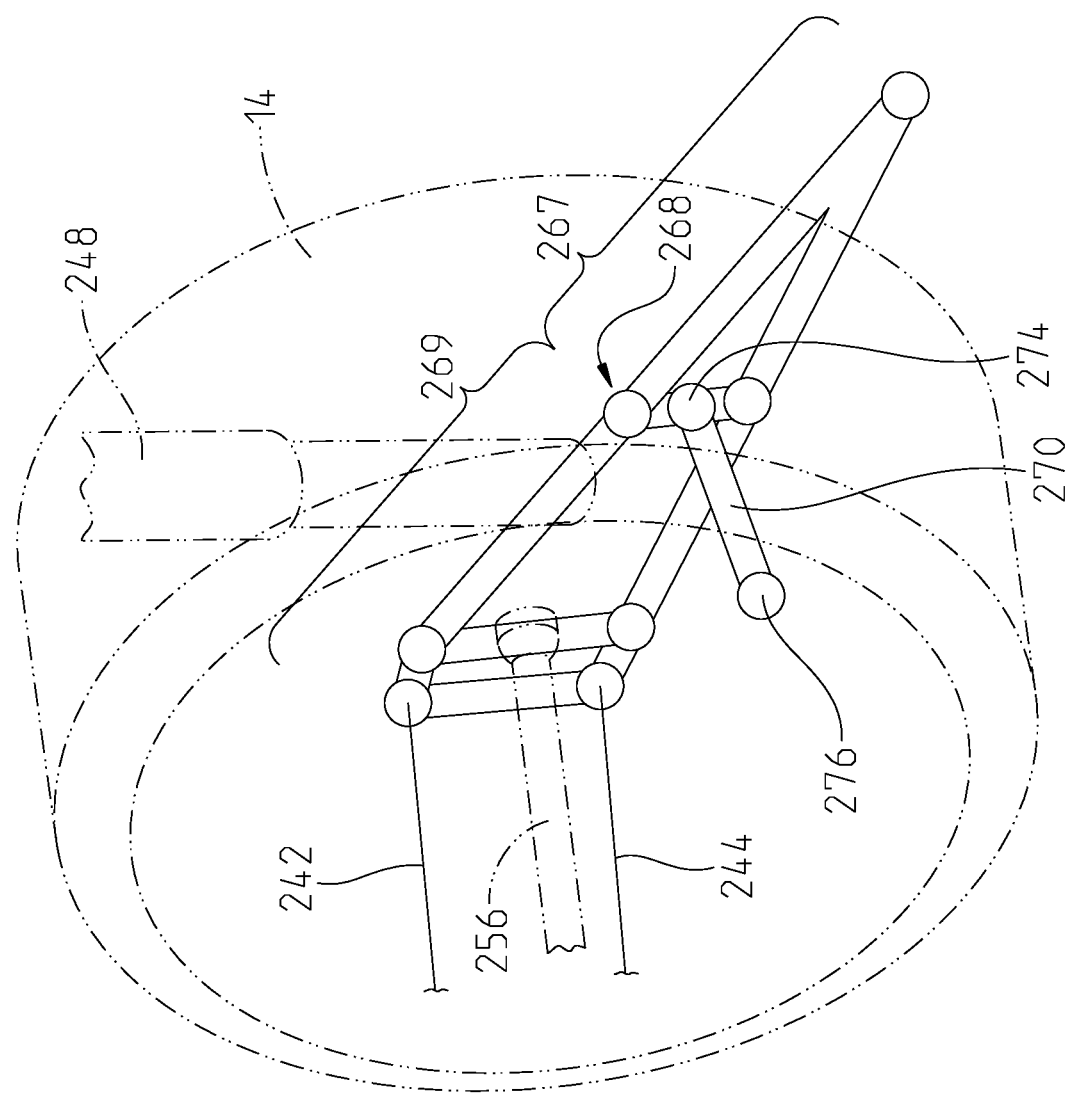
FIG. 49 is an expanded view of the rear suspension assembly of FIG. 43 engaged with a rear-ground engaging member.
Figure 50:
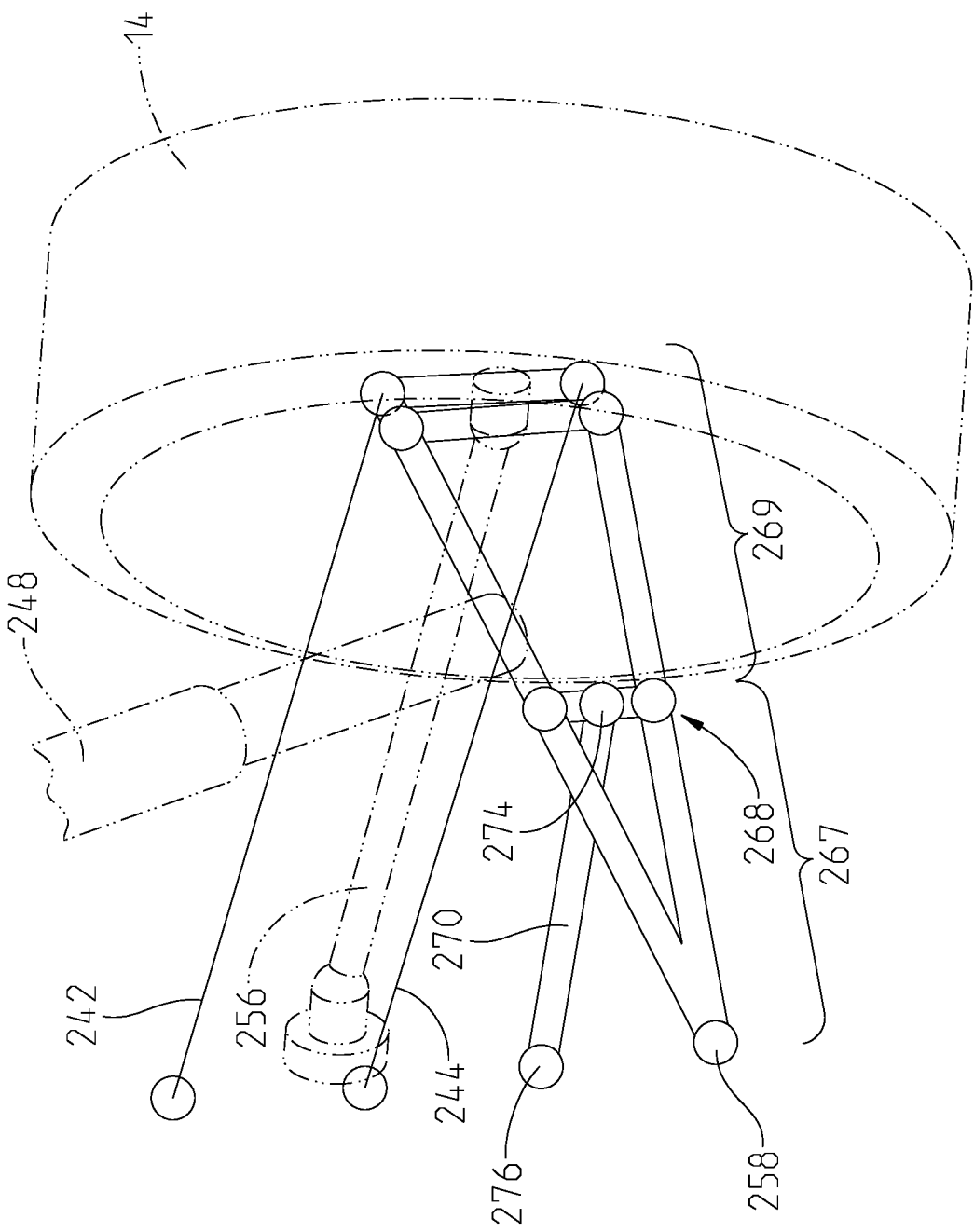
FIG. 50 is another detailed view of the rear suspension assembly of FIG. 49.

Referring for FIG. 46, the rear suspension assembly 226 is illustrated from a top view. The first portion 272A of the suspension member 270 is coupled to the trailing arm 270 at a position between the first and second longitudinal portions 267, 269 (e.g., the first longitudinal portion 267 being positioned forward of the coupling of the suspension member 270 to the trailing arm 240 and the second longitudinal portion 269 being positioned rearward of the coupling of the suspension member 270 to the trailing arm 240). A second coupler 276 may be positioned on the frame assembly 20 to which the second portion 272B of the suspension member 270 is coupled and which is operable to allow the suspension member 270 to pivot relative to the frame assembly 20. In some embodiments, the suspension member 70 may include an actuator that allows for active control of toe of the rear ground-engaging members 14 (e.g., pneumatic, motor, and so forth).

Referring still to FIG. 46, the first radius rod 242 is shown with a coupling position 243 at which the first radius rod 242 couples to the frame assembly 20. A plane P is illustrated extending between the first coupler 258 of the trailing arm 240 and the coupling position 243 of the first radius rod 242, the plane P extending vertically into and out of the page. The suspension member 270 couples to the frame assembly 20 at the second coupler 276, wherein the second coupler 276 is positioned within or adjacent the plane P defined between the first coupler 258 of the trailing arm 240 and the coupling position 243 of the first radius rod 242. For example, the second coupler 276 is coupled to the frame assembly 20 such that the distance between the second coupler 276 of the suspension member 270 and the nearest point on the plane P is about 1:12 of the distance from the first coupler 258 of the trailing arm and the coupling position 243 of the first radius rod 242 which define the plane P. Various rations of the distances described above are contemplated including about 1:15, 1:20, 1:25, 1:30, 1:35, 1:40, 1:45, 1:50, 1:55, 1:60, or less. In some embodiments, another way of defining the relative position of the second coupler 276 with respect to components of the rear suspension assembly 226 includes defining a zone Z within which the second coupler 276 is positioned. The zone Z is defined as a space as viewed from above and bounded by the trailing arm 240, the first radius rod 242, and an interior edge defined between the front end of the trailing arm and the inner end of the upper radius rod as viewed from above (i.e., the plane P described previously). The second coupler 276 is positioned within the zone Z adjacent the interior edge (i.e., the plane P).

As illustrated in FIG. 46, the shock absorber 248 is coupled to the trailing arm 240 rearward of the position at which the suspension member 270 couples to the trailing arm 240. In some embodiments, the shock absorber 248 is coupled between a longitudinal midpoint of the second longitudinal portion 269 of the trailing arm 240 and the position at which the suspension member 270 couples to the trailing arm 240 (in some embodiments closer to the position at which the suspension member 270 couples to the trailing arm 240 than to the longitudinal midpoint). The placement of the coupling between the shock absorber 248 and the trailing arm 240 in combination with the first coupler 274 of the suspension member 270 to the trailing arm 240 provides control of toe of the rear ground-engaging members 14. The lengths of the first and second longitudinal portions 267, 269 are substantially equal to each other (within about 75% or more of each other).

Referring to FIGS. 51-60, the embodiment of FIG. 43 is illustrated with the rear suspension assembly 226 in various positions through the travel of the rear suspension assembly 226 (i.e., through travel of the shock absorber 248 in loaded, unloaded, and partially loaded conditions). FIGS. 51-55 show views of the rear suspension assembly 126 through its travel from a frontal view, and FIGS. 56-60 show views of the rear suspension assembly 226 through its travel from a top view. The position of the rear suspension assembly 226 of FIG. 51 corresponds with the position of the rear suspension assembly 226 of FIG. 56, the position of the rear suspension assembly 226 of FIG. 52 corresponds with the position of the rear suspension assembly 226 of FIG. 57, the position of the rear suspension assembly 226 of FIG. 53 corresponds with the position of the rear suspension assembly 226 of FIG. 58, the position of the rear suspension assembly 226 of FIG. 54 corresponds with the position of the rear suspension assembly 26 of FIG. 59, and the position of the rear suspension assembly 226 of FIG. 55 corresponds with the position of the rear suspension assembly 26 of FIG. 60. Although the frame assembly 20 is not shown in these figures, it is understood that the coupling positions of the rear suspension assembly 226 to the frame assembly 20 (e.g., coupling position 243, first coupler 258, and second coupler 276) represent the correct positions of the couplings (e.g., those positions are substantially static) and the rear suspension assembly 226 moves with respect to the frame assembly 20.

Figure 51:
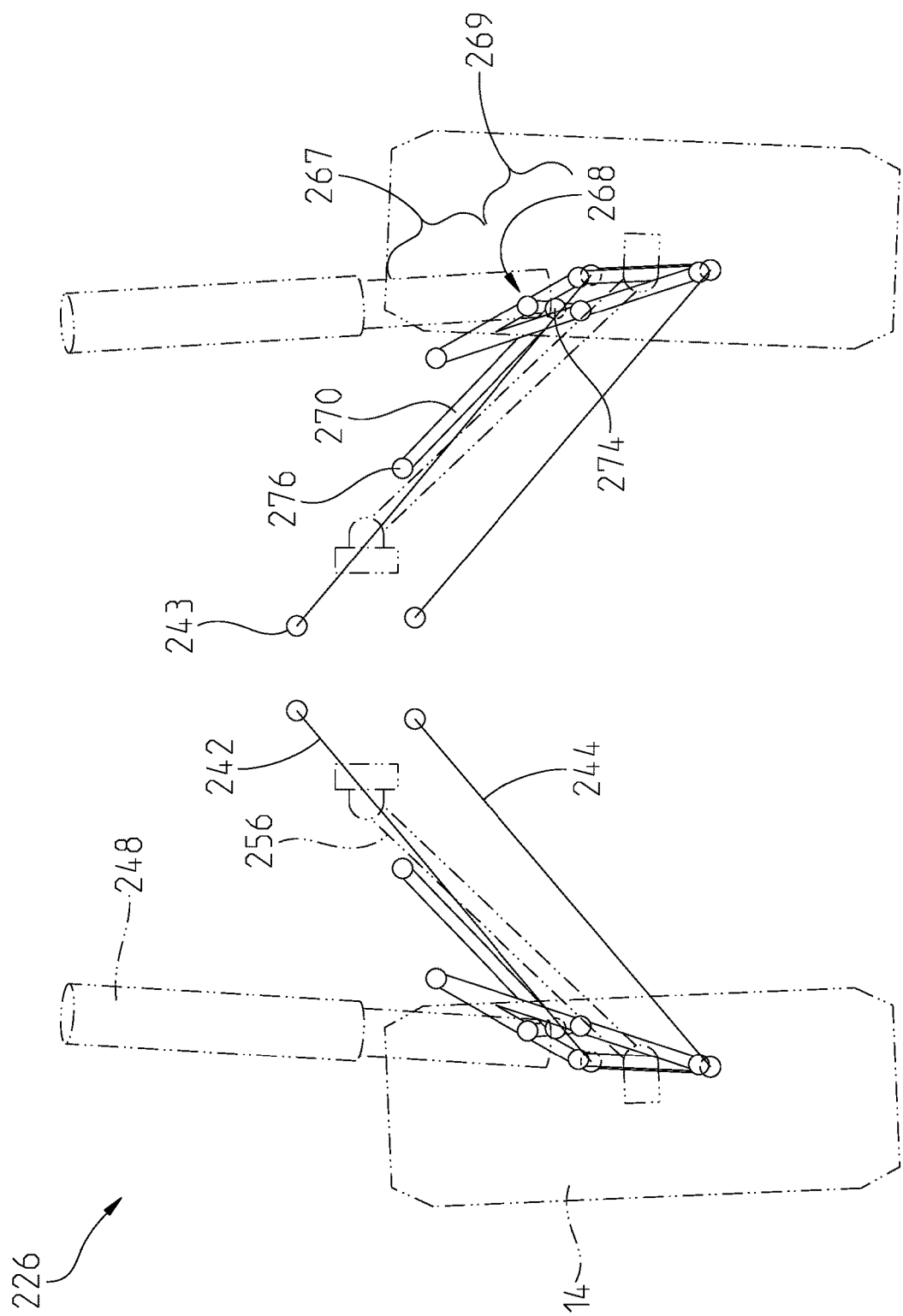
FIGS. 51-55 are front views of the rear suspension assembly of FIG. 43 illustrated throughout varying loading configurations of the rear suspension assembly.
Figure 52:
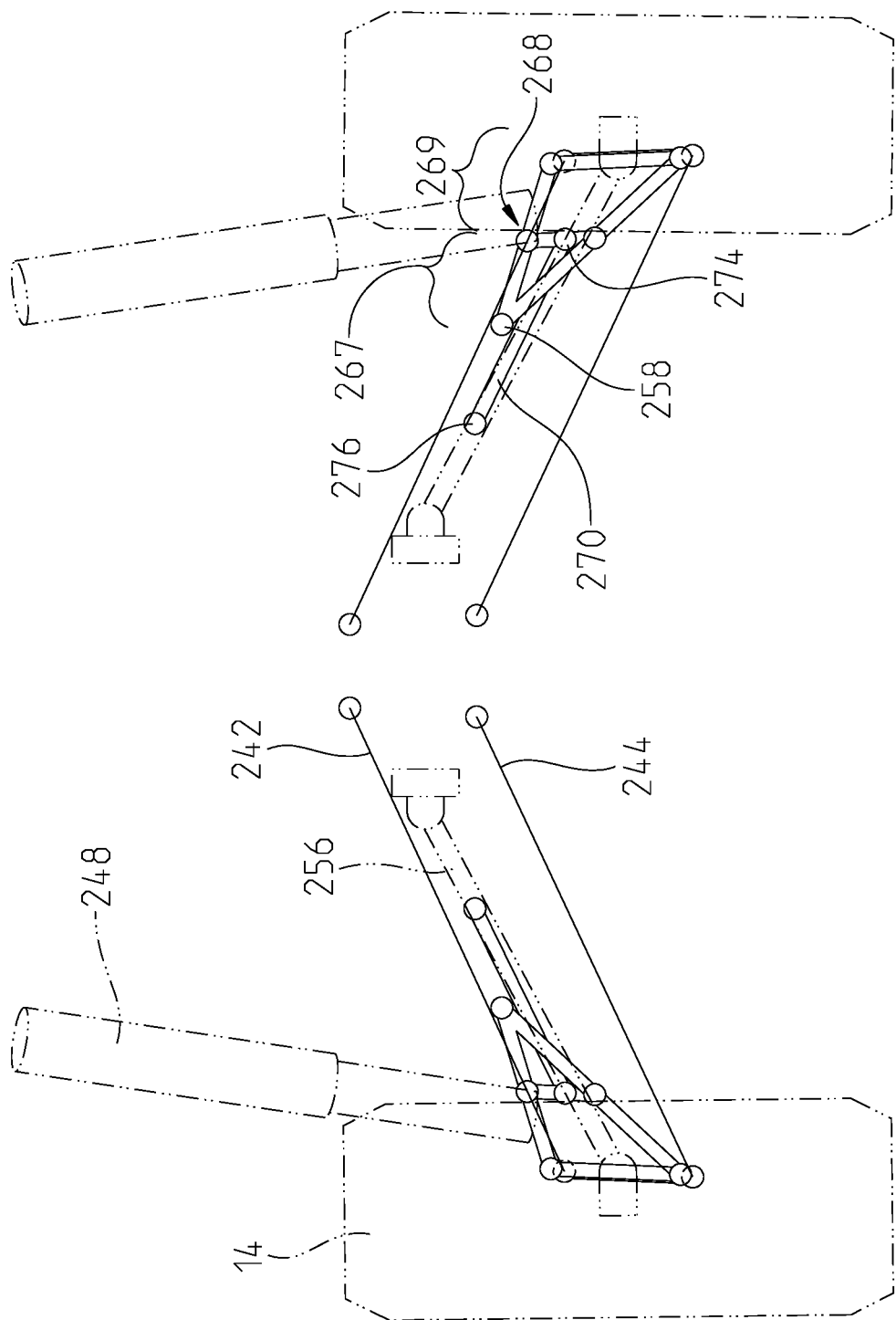
Figure 53:
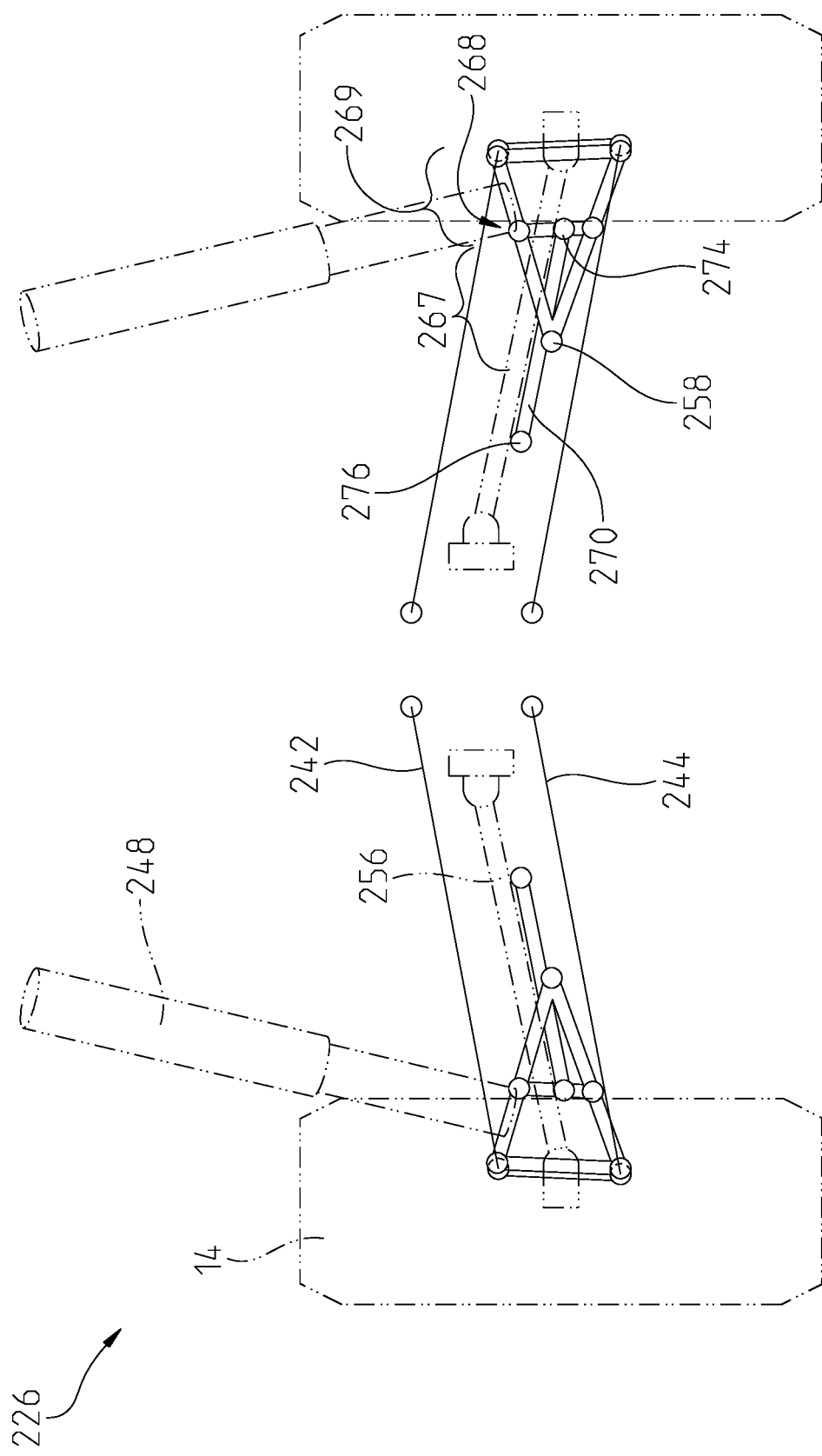
Figure 54:
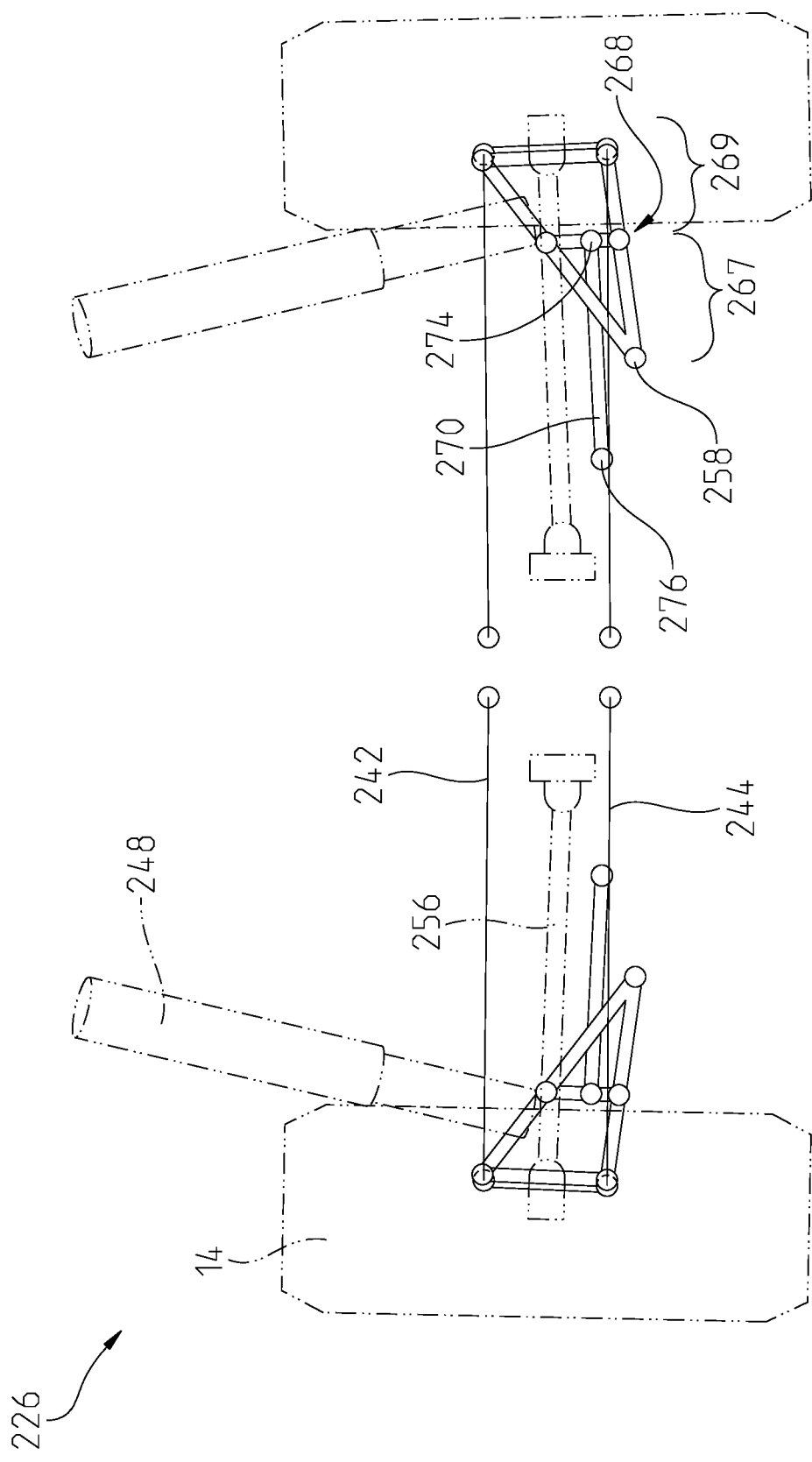
Figure 55:
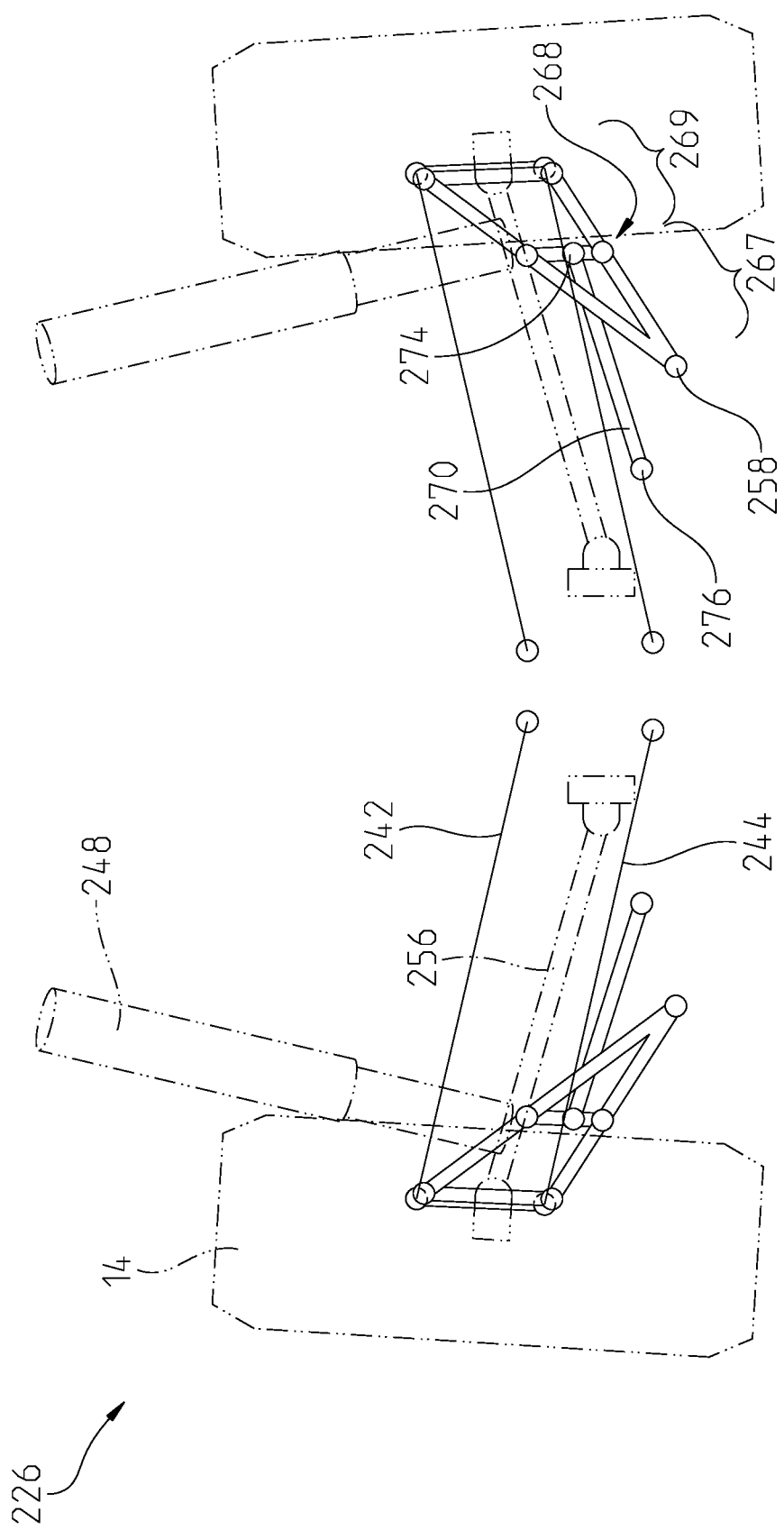
Figure 56:
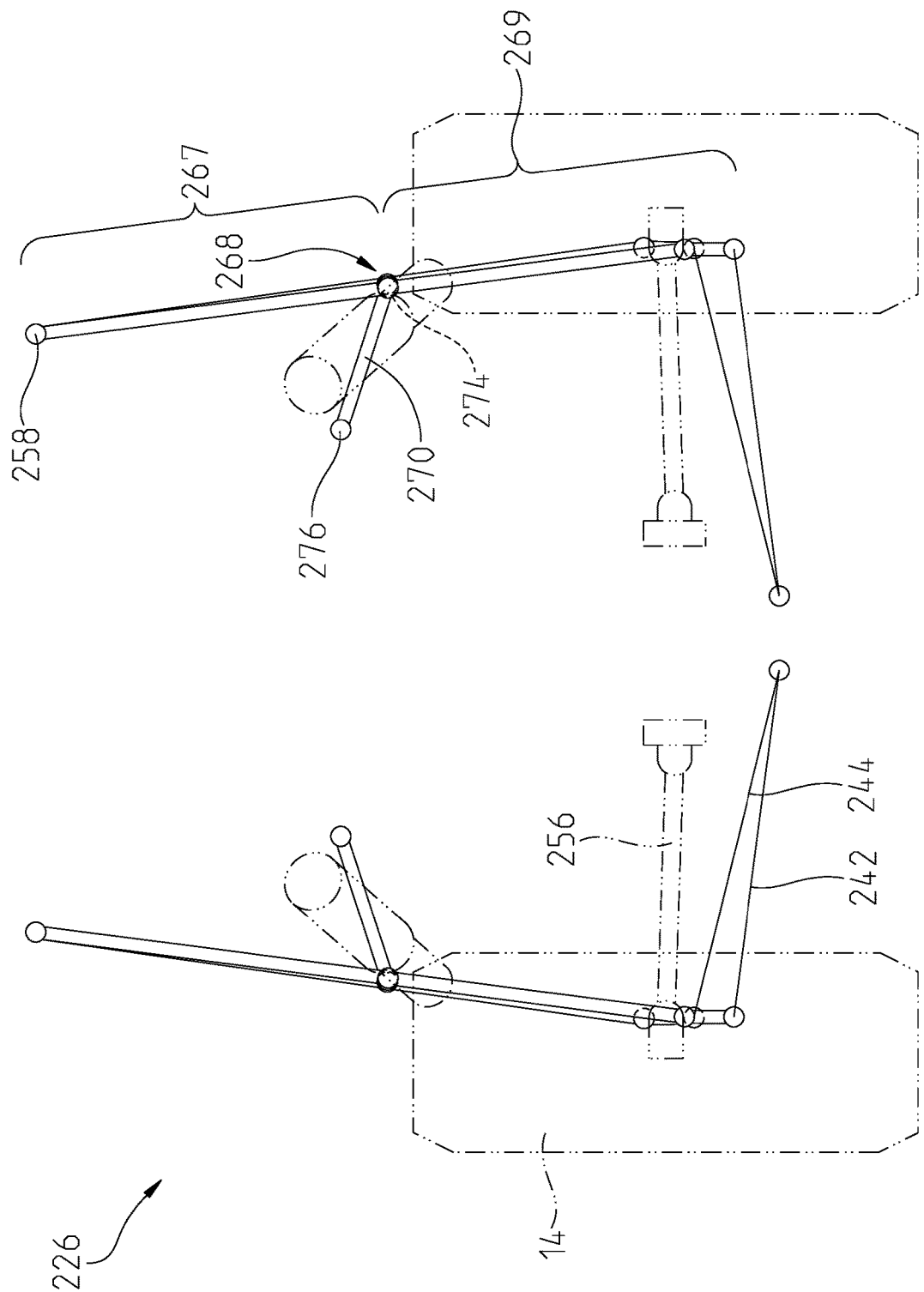
FIGS. 56-60 are top views of the rear suspension assembly of FIG. 43 illustrated throughout varying loading configurations of the rear suspension assembly.
Figure 57:
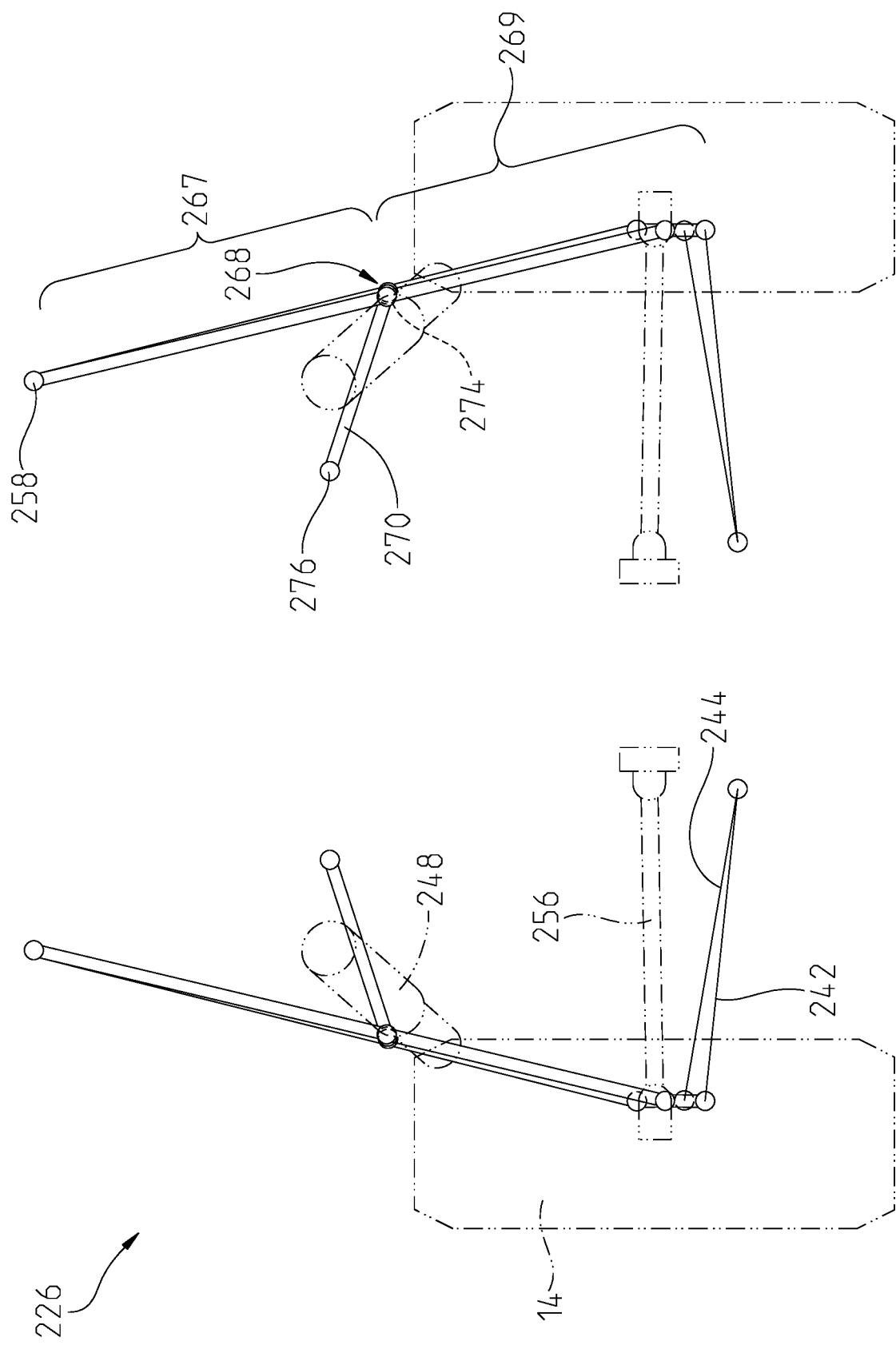
Figure 58:
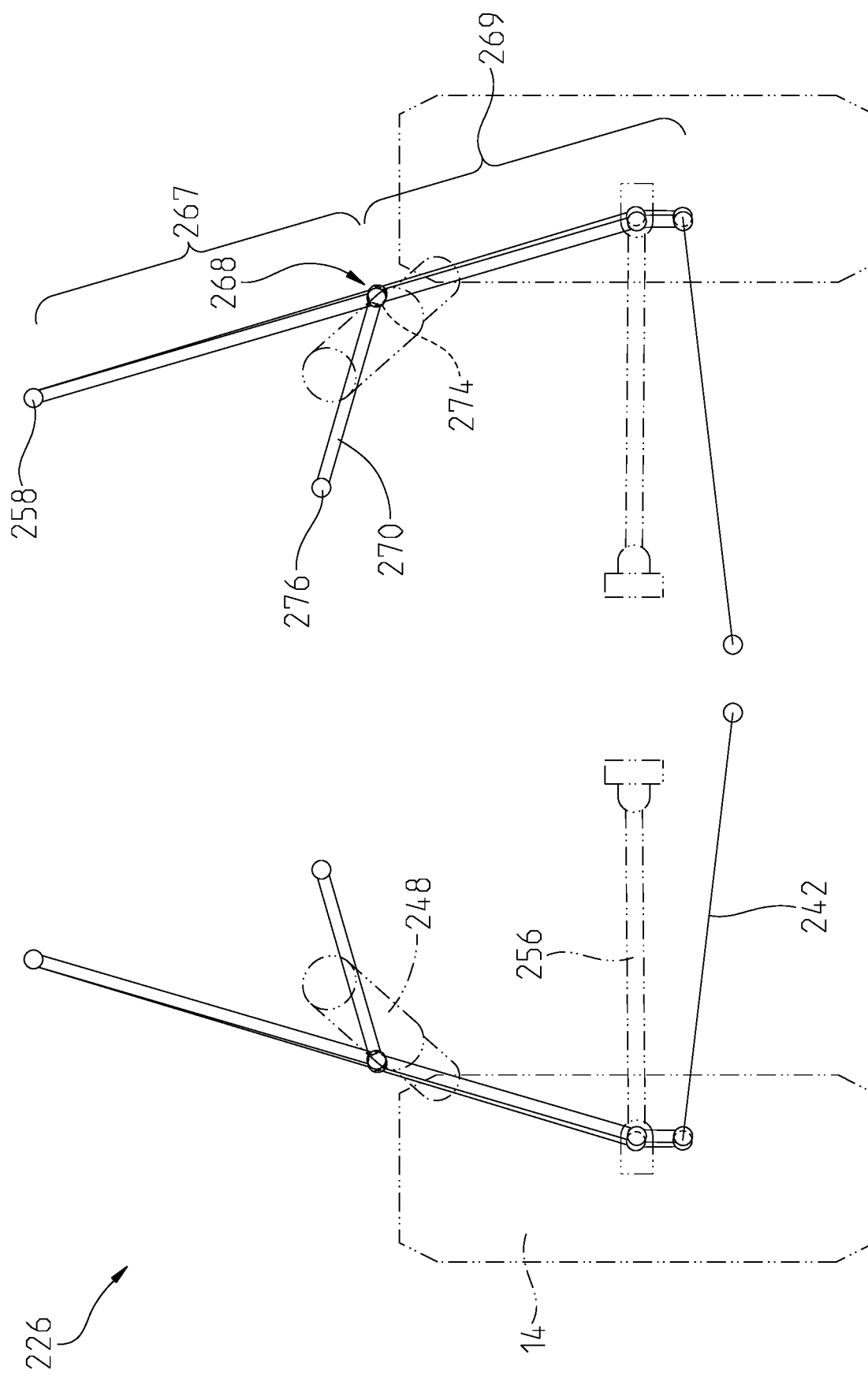
Figure 59:
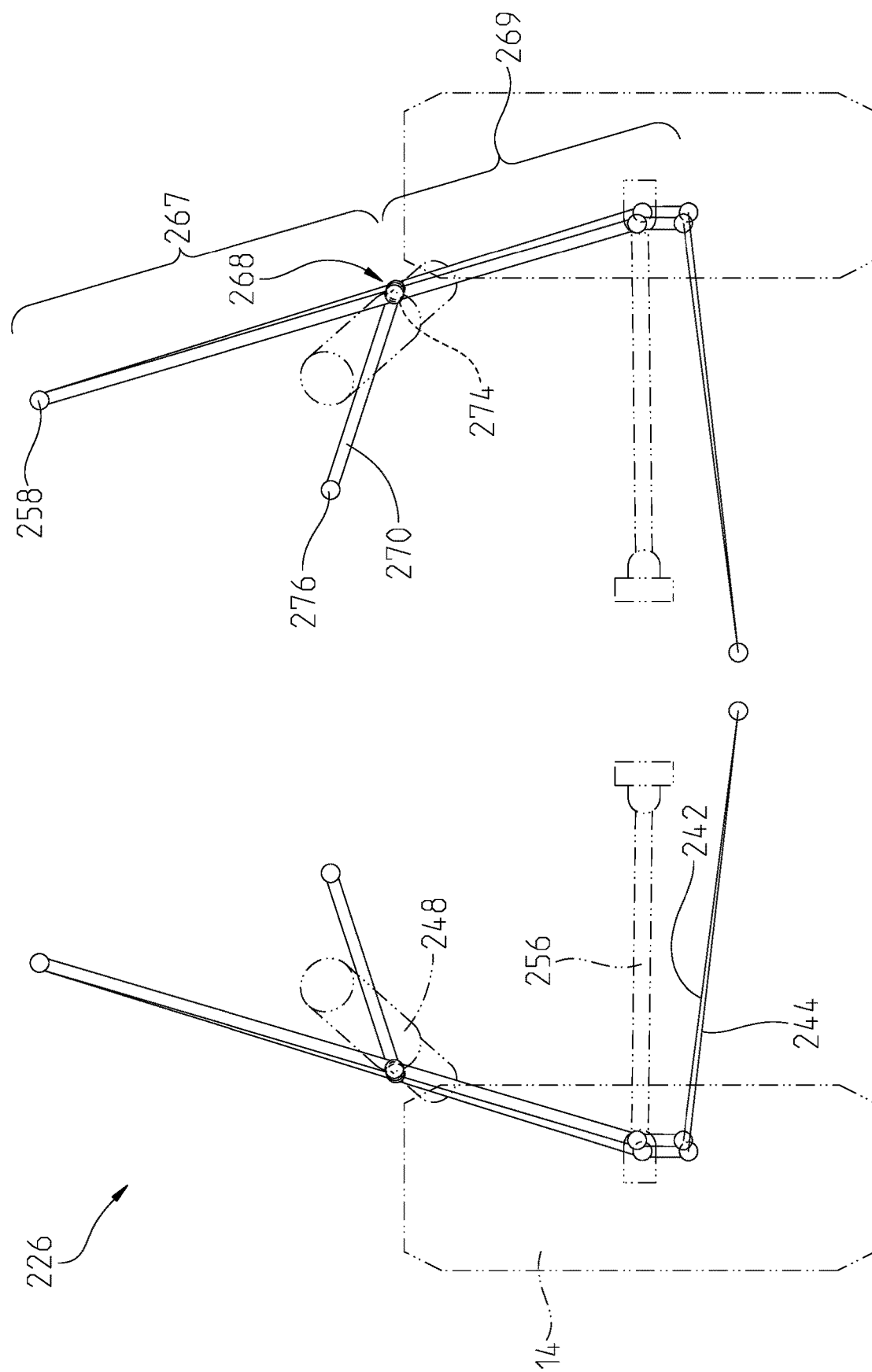
Figure 60:
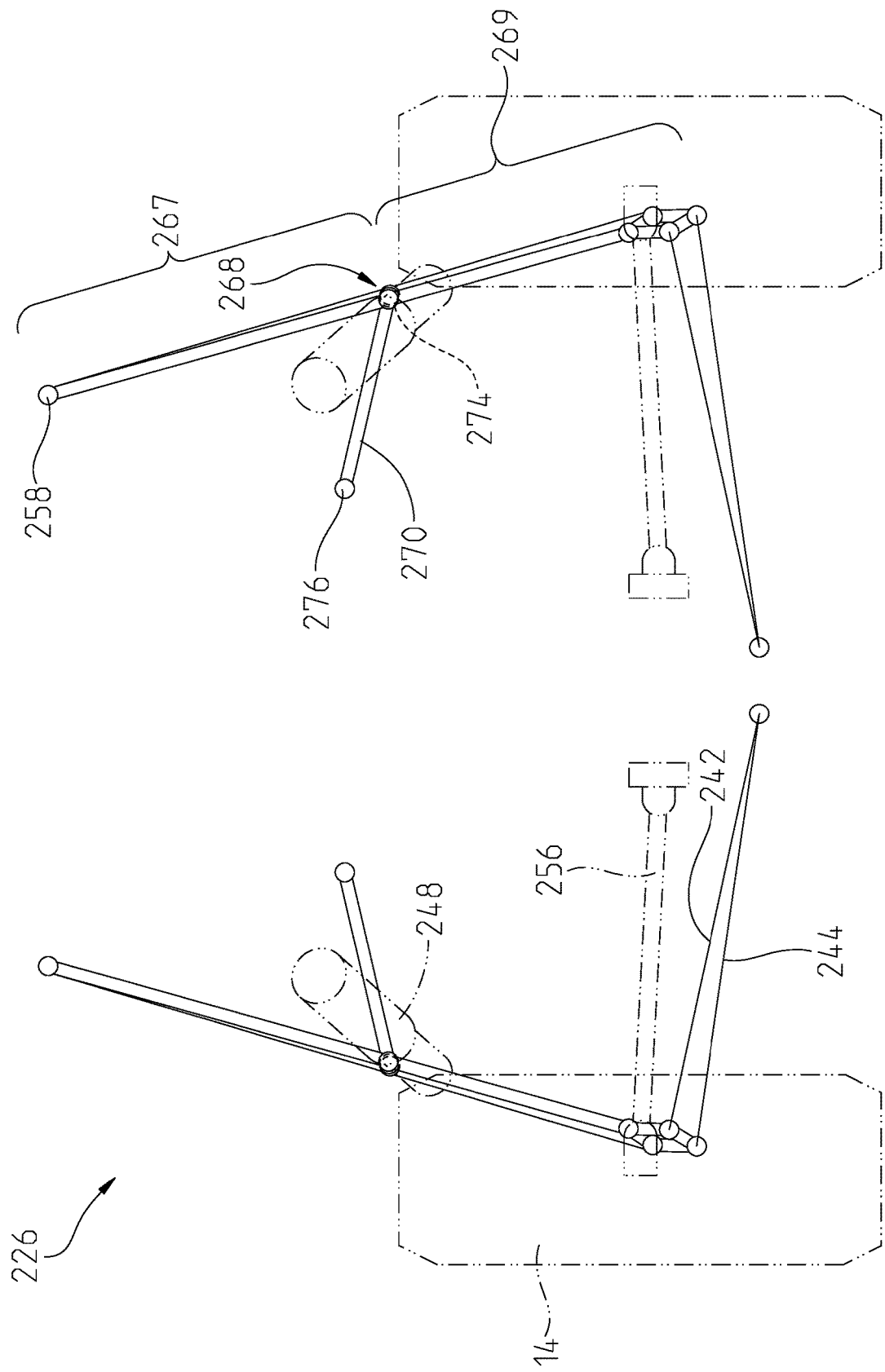

FIGS. 51 and 56 illustrate the rear suspension assembly 226 in a substantially unloaded state. As discussed, the coupling positions at which the rear suspension assembly 226 is coupled to the frame assembly 20 are substantially static. The toe of the rear ground-engaging members 14 is generally neutral or zero (or at a predetermined toe such as plus or minus three degrees) when the rear suspension assembly 226 is in a substantially unloaded state. The trailing arm 240 pivots with respect to hub 241 at the joint 268. This pivoting and moving of the trailing arm 240 can be appreciated in the remaining FIGS. 52-55 and 57-60. FIGS. 52-54 and 57-59 show a progression of the rear suspension assembly 126 through loading of the rear suspension assembly 126 until the rear suspension assembly 226 is illustrated in a fully loaded state in FIGS. 55 and 60.

As the suspension is loaded, the suspension member 270 pivots relative to the frame assembly 20 and the trailing arm 240 in order to constrain the trailing arm 240 in a configuration that maintains the rear ground-engaging member 14 in a neutral toe configuration (or at a predetermined toe such as plus or minus three degrees) while permitting the remaining components of the rear suspension assembly 226 to pivot and move as appropriate to travel during loading and unloading. The relative positioning of the coupling positions (e.g., the first coupler 274 of the suspension member 270, and the coupling of the shock absorber 248 to the trailing arm 240) is operable to adjust the sensitivity of the toe control of suspension member 270. As mentioned, the relative position of the second coupler 276 relative to the coupling position 243 of the first radius rod 242 and the first coupler 258 of the trailing arm 240 is operable to adjust the sensitivity of the toe control of suspension member 270. It is noted that in some embodiments, the toe of the rear ground-engaging member 14 may not be such that the rear ground-engaging member 14 are exactly parallel to each other, however, the toe of the rear ground-engaging members 14 is constrained to less than degrees off-axis of the desired longitudinal axis of the rear ground-engaging members 14 as the rear suspension assembly 226 travels through varying levels of loading (e.g., compression and decompression of the shock absorbers 48).

Referring now to FIGS. 61-77, another embodiment of a rear suspension assembly 326 is provided. Referring more specifically to FIG. 62, a schematic of the rear suspension assembly 326 is illustrated in which the rear suspension assembly 326 is coupled to rear ground-engaging members 14. The rear suspension assembly 326 of this embodiment includes a trailing arm 340 with a first longitudinal portion 367 and a second longitudinal portion 369 coupled at a joint 368. The rear suspension assembly 326 includes an upper or first radius rod 342 coupled to the second longitudinal portion 369 of the trailing arm and a lower or second radius rod 344 coupled to the second longitudinal portion 369 of the trailing arm 340 at a position vertically lower than the coupling position of the first radius rod 342.

Figure 62:
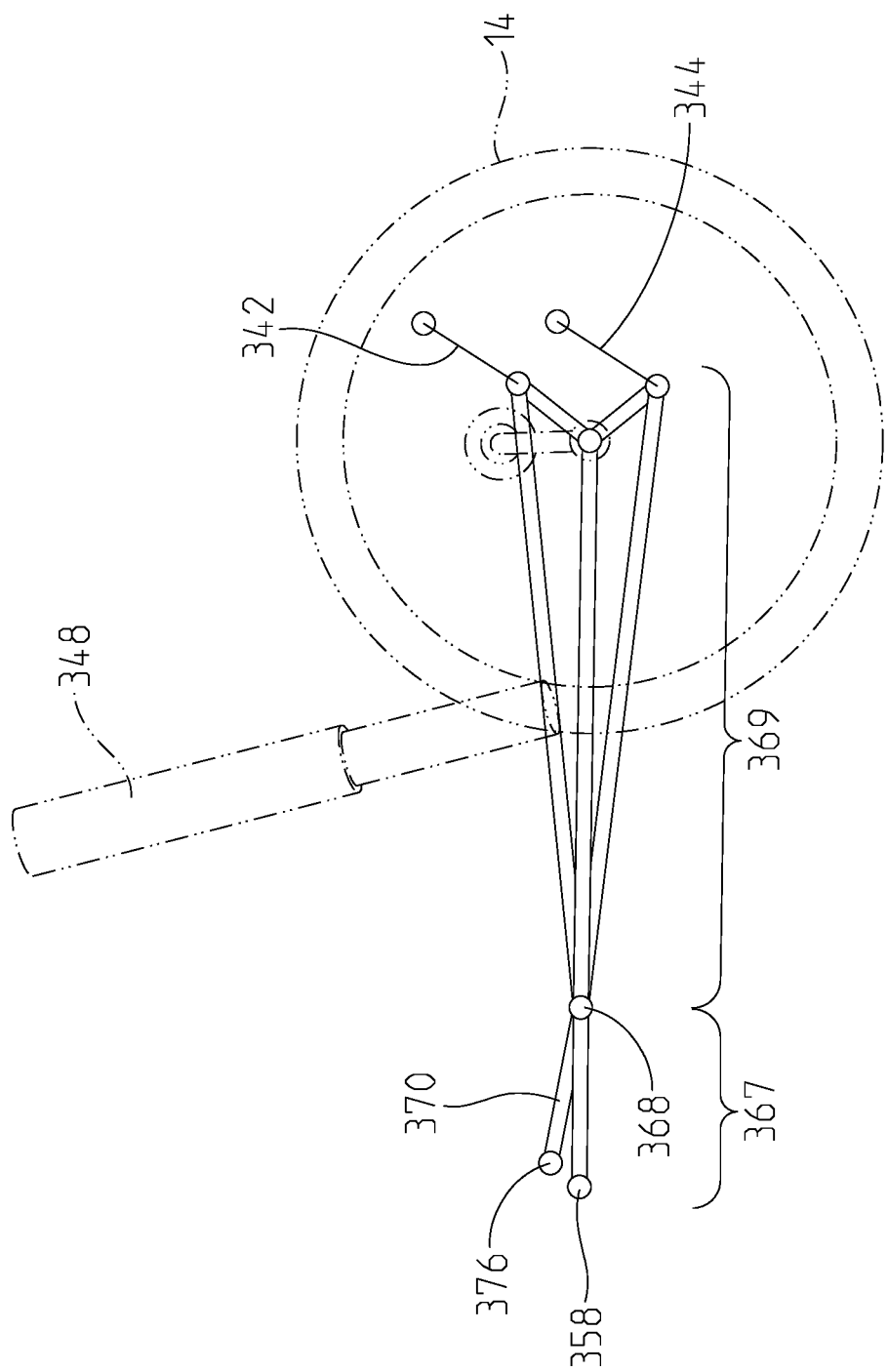
FIG. 62 is a side view of the rear suspension assembly of FIG. 61.
Figure 63:
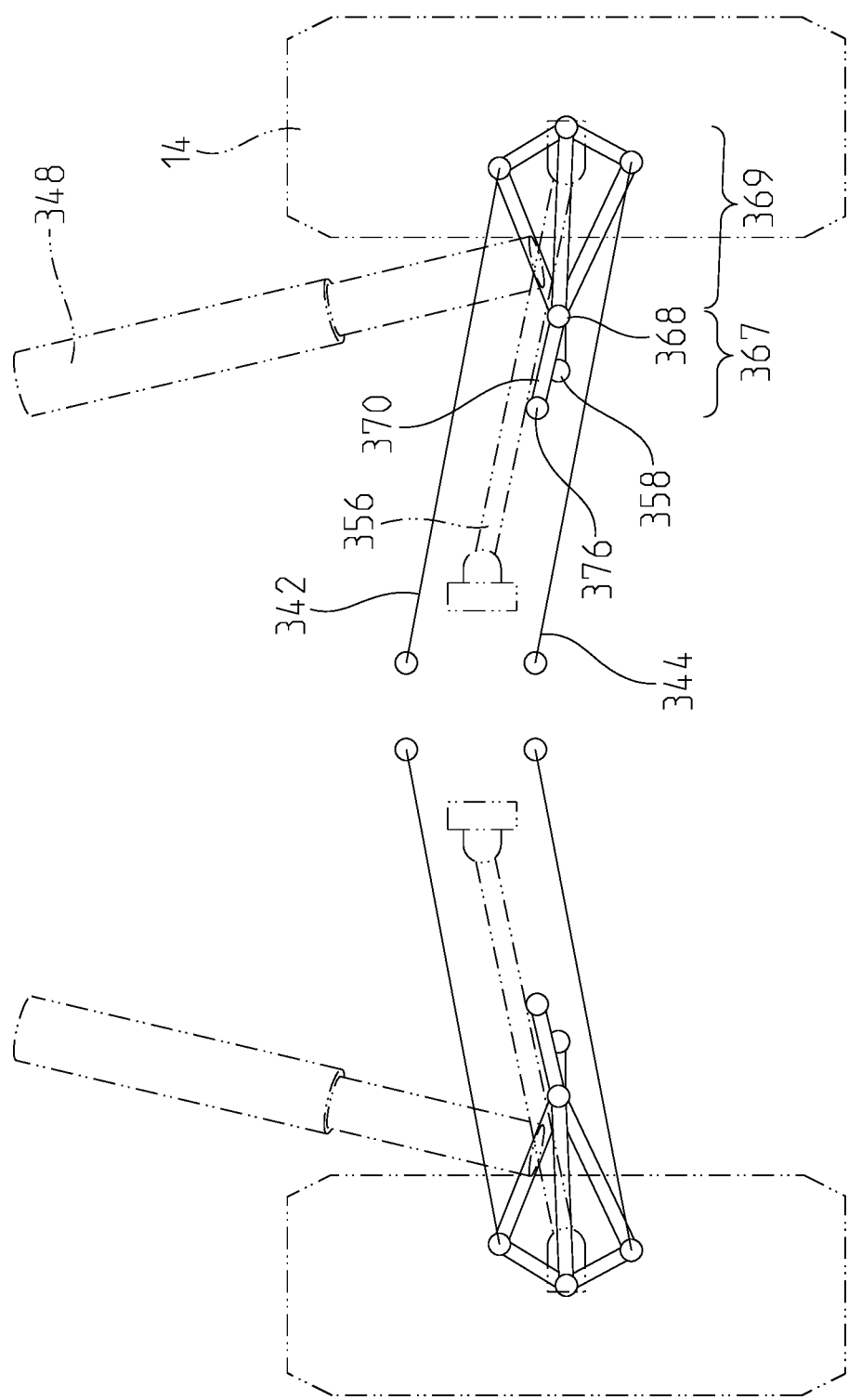
FIG. 63 is a rear view of a rear suspension assembly of FIG. 61.

FIG. 63 illustrates a side schematic view of the embodiment of FIG. 62 which includes a shock absorber 348 coupled to the second longitudinal portion 369 of the trailing arm 340 at a position longitudinally rearward of the joint 368. The rear suspension assembly 326 includes a suspension member 370 that is coupled to the second longitudinal portion 369 of the trailing arm 340 forward of and longitudinally spaced from the coupling position of the shock absorber 348 to the second longitudinal portion 369. The suspension member 370 is coupled to the second longitudinal portion 369 at a first coupler 374 that is longitudinally proximate or at the joint 368 and forward of the position at which the shock absorber 348 is coupled to the trailing arm 340. The suspension member 370 extends from the trailing arm 340 at an angle greater than zero degrees, for example laterally inward and longitudinally forward (see FIGS. 45-49) relative to the trailing arm 340. In some embodiments, the first coupler 374 includes a bearing carrier or hub.

Figure 64:
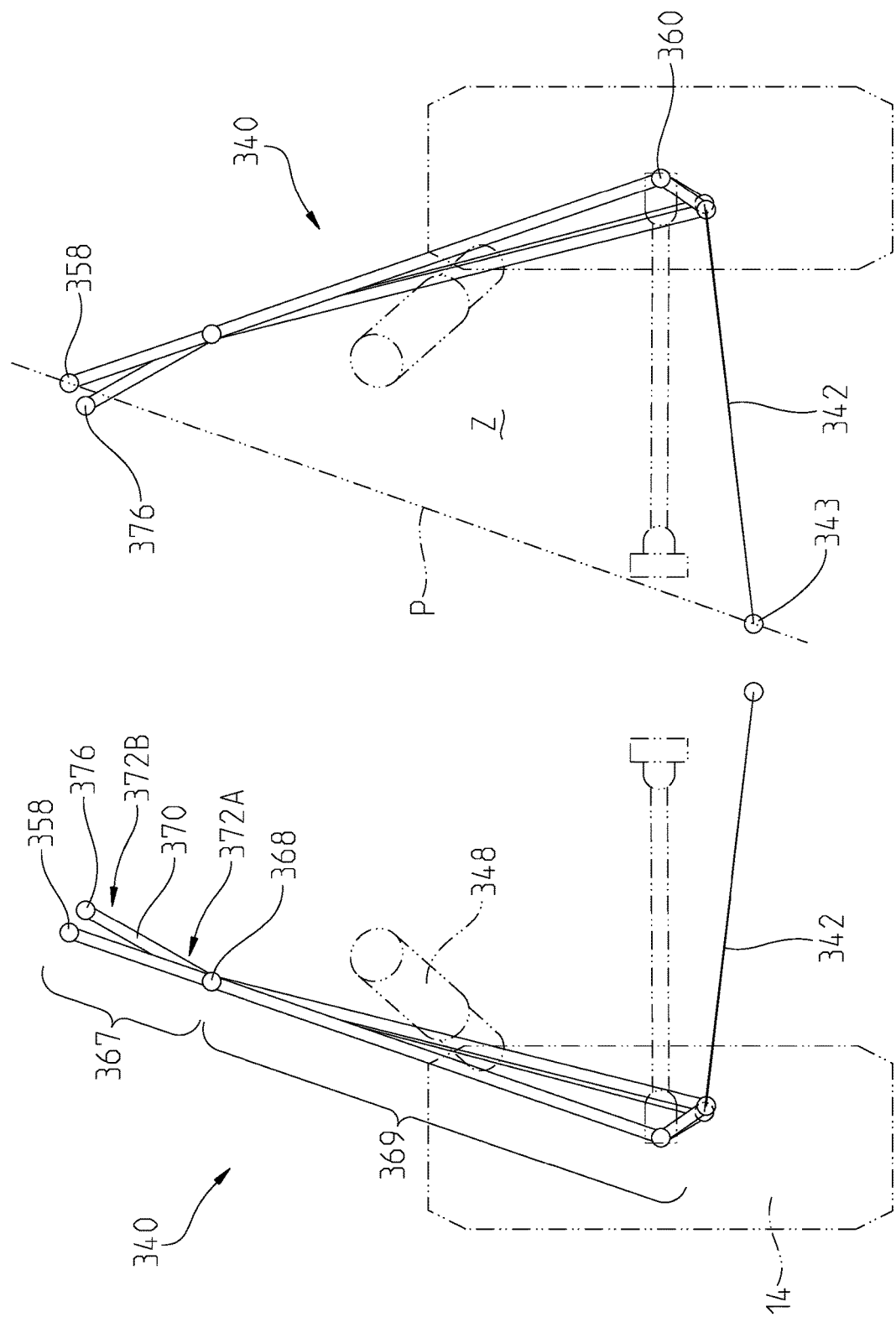
FIG. 64 is a top view of the rear suspension assembly of FIG. 61.
Figure 65:
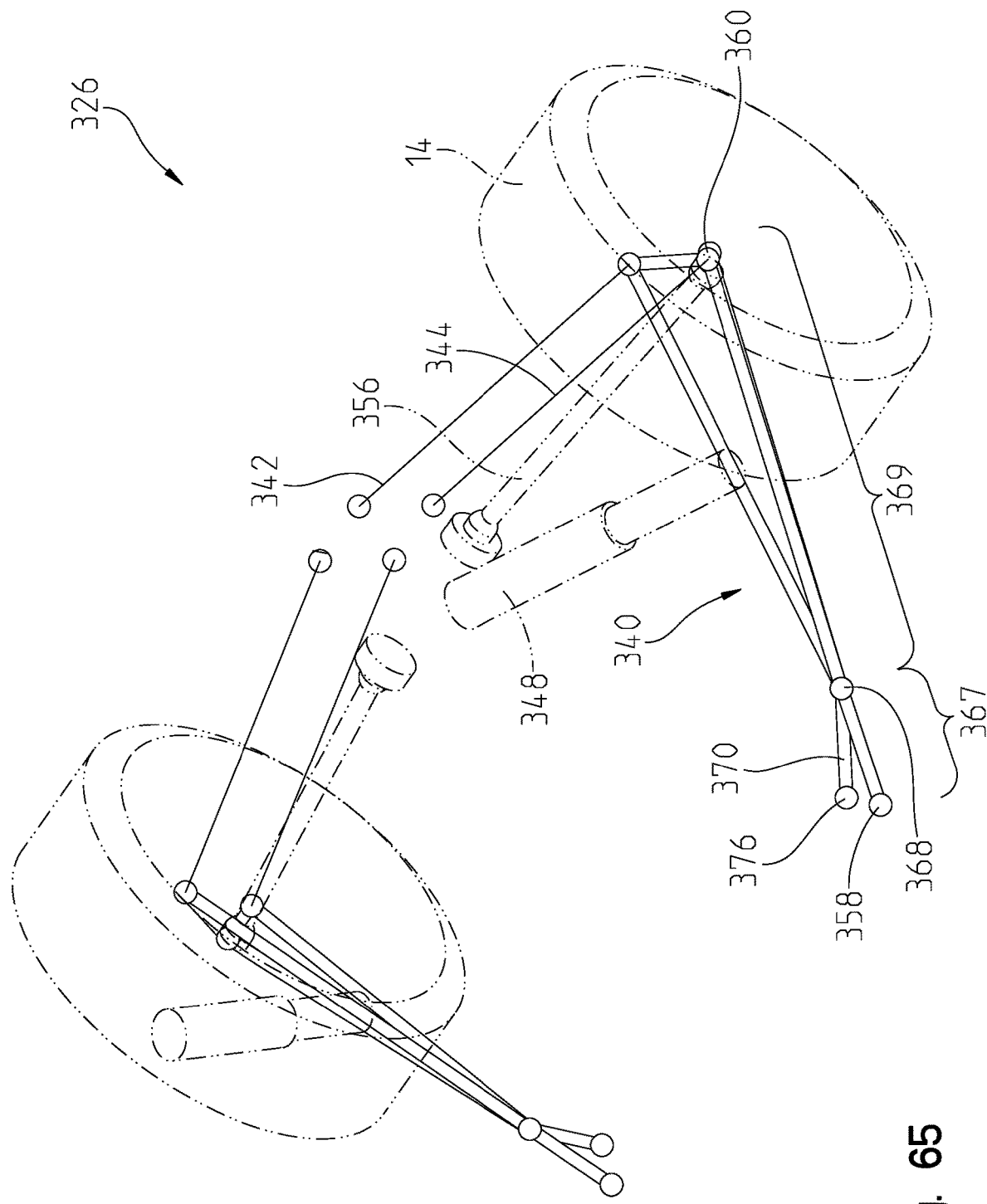
FIG. 65 is a front left perspective view of the rear suspension assembly of FIG. 61.
Figure 66:
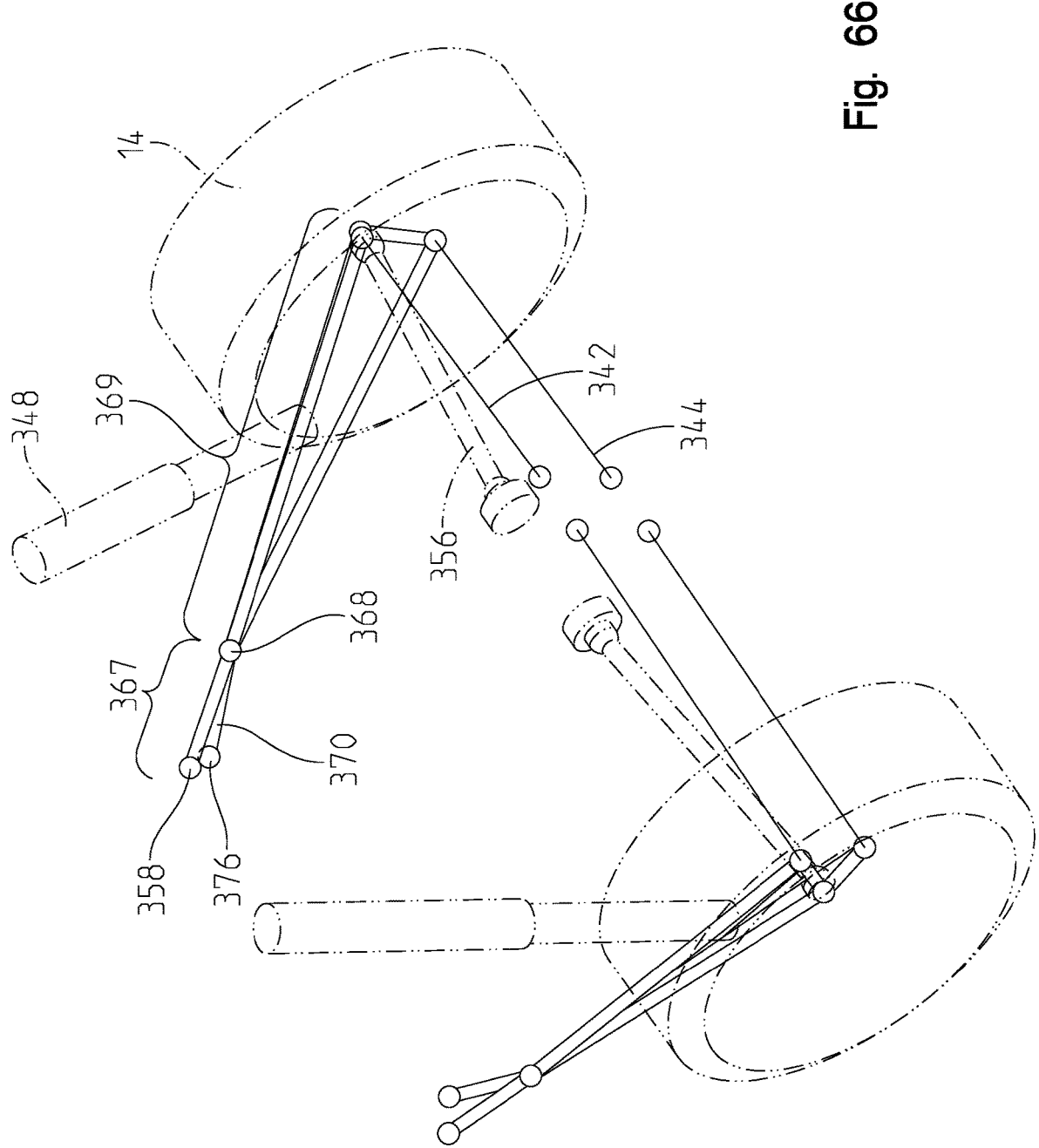
FIG. 66 is a rear left perspective view of the rear suspension assembly of FIG. 61.
Figure 67:
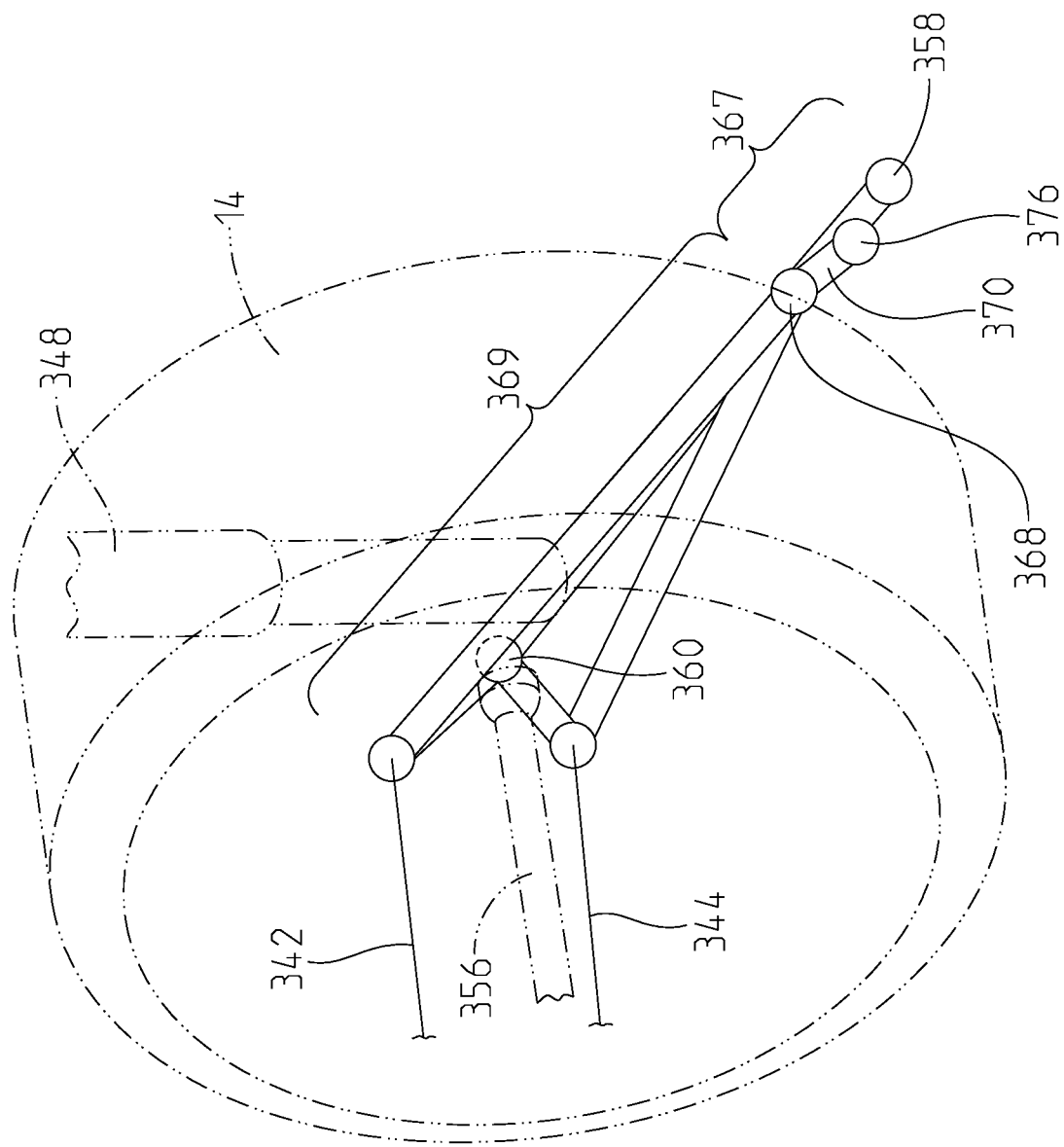
FIG. 67 is an expanded view of the rear suspension assembly of FIG. 61 engaged with a rear-ground engaging member.
Figure 68:
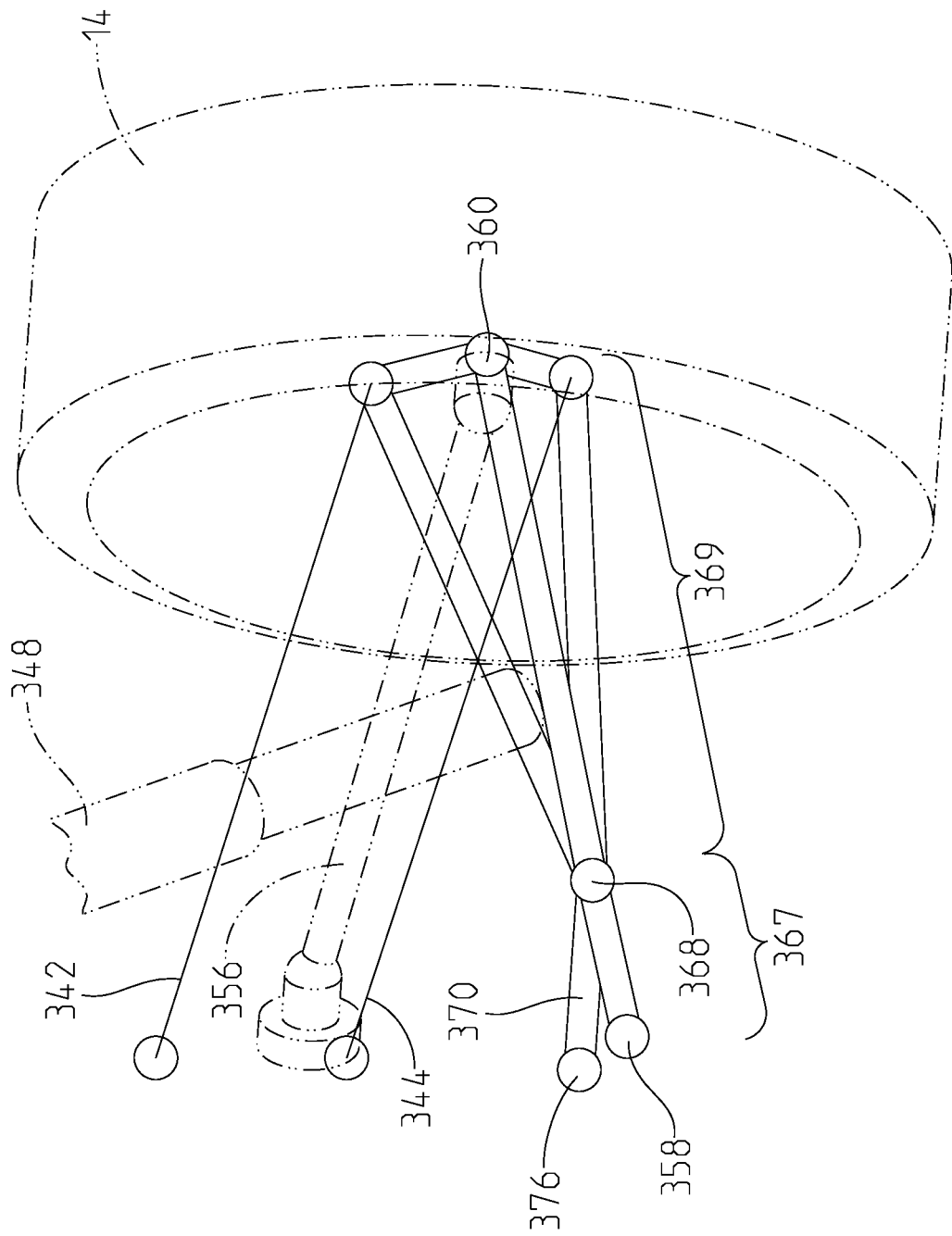
FIG. 68 is another detailed view of the rear suspension assembly of FIG. 67.

Referring to FIG. 64, the rear suspension assembly 326 is illustrated from a top view. The first portion 372A of the suspension member 370 is coupled to the trailing arm 370 at the joint 368 between the first and second longitudinal portions 367, 369 (e.g., at the first coupler 374 which is positioned on the joint 368). A second coupler 376 may be positioned on the frame assembly 20 to which the second portion 372B of the suspension member 370 is coupled and which is operable to allow the suspension member 370 to pivot relative to the frame assembly 20. In some embodiments, the suspension member 70 may include an actuator that allows for active control of toe of the rear ground-engaging members 14 (e.g., pneumatic, motor, and so forth).

Referring still to FIG. 64, the first radius rod 342 is shown with a coupling position 343 at which the first radius rod 342 couples to the frame assembly 20. A plane P is illustrated extending between the first coupler 358 of the trailing arm 340 and the coupling position 343 of the first radius rod 342, the plane extending vertically into and out of the page. The suspension member 370 couples to the frame assembly 20 at the second coupler 376, wherein the second coupler 376 is positioned within or adjacent the plane P defined between the first coupler 358 of the trailing arm 340 and the coupling position 343 of the first radius rod 342. For example, the second coupler 376 is coupled to the frame assembly 320 such that the distance between the second coupler 376 of the suspension member 370 and the nearest point on the plane P is about 1:12 of the distance from the first coupler 358 of the trailing arm and the coupling position 343 of the first radius rod 342 which define the plane P. Various rations of the distances described above are contemplated including about 1:15, 1:20, 1:25, 1:30, 1:35, 1:40, 1:45, 1:50, 1:55, 1:60, or less. In some embodiments, another way of defining the relative position of the second coupler 376 with respect to components of the rear suspension assembly 326 includes defining a zone Z within which the second coupler 376 is positioned. The zone Z is defined as a space as viewed from above and bounded by the trailing arm 340, the first radius rod 342, and an interior edge defined between the front end of the trailing arm and the inner end of the upper radius rod as viewed from above (i.e., the plane P described previously). The second coupler 376 is positioned within the zone Z adjacent the interior edge (i.e., the plane P).

As illustrated in FIG. 64, the shock absorber 348 is coupled to the trailing arm 340 rearward of the joint 368. In some embodiments, the shock absorber 348 is coupled between a longitudinal midpoint of the second longitudinal portion 369 of the trailing arm 340 and the joint 368 (in some embodiments closer to the joint 368 than to the longitudinal midpoint). The placement of the coupling between the shock absorber 348 and the trailing arm 340 in combination with the first coupler 374 of the suspension member 370 to the trailing arm 340 provides control of toe of the rear ground-engaging members 14.

Figure 61:
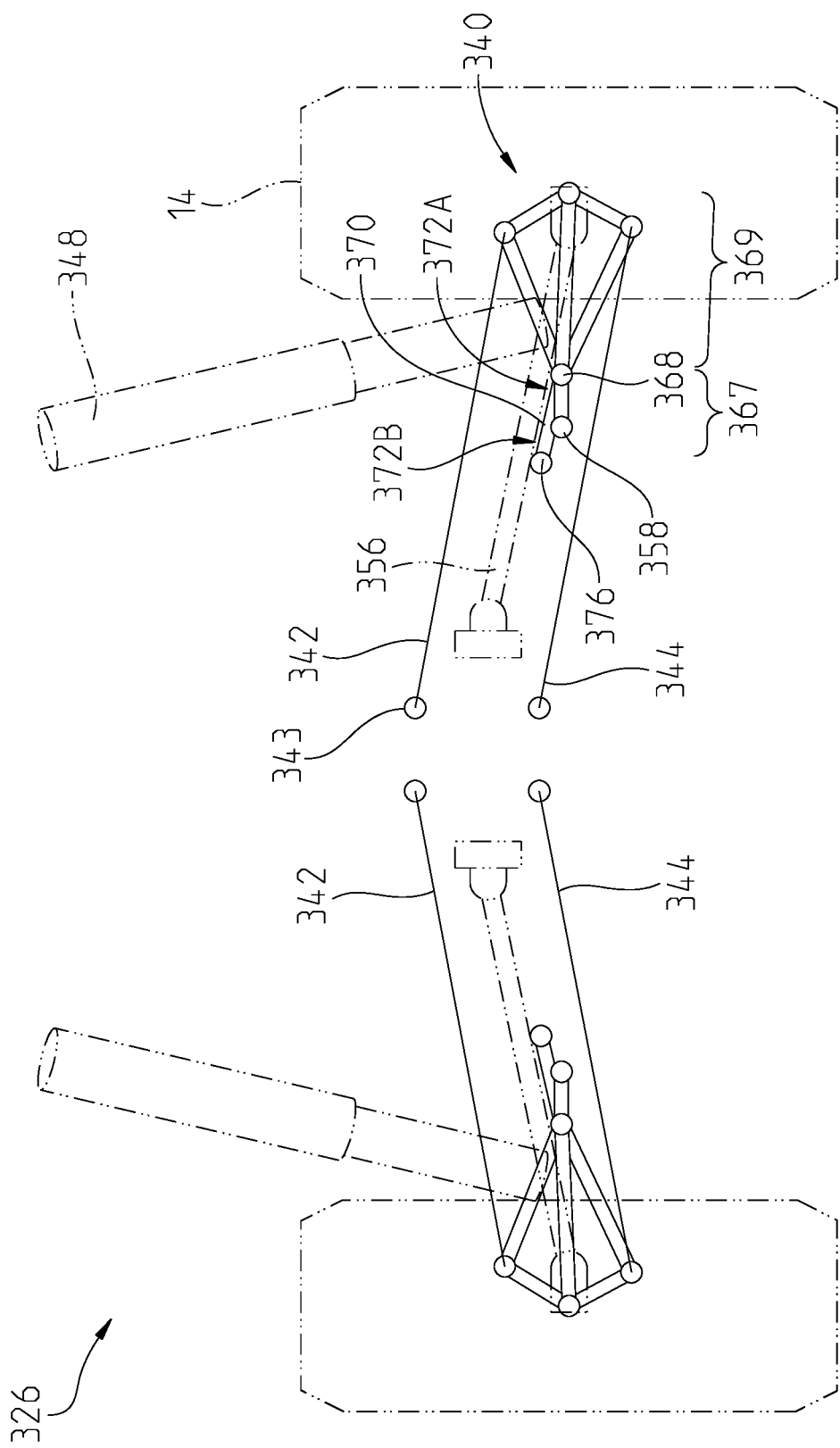
FIG. 61 is a front view of another embodiment of a rear suspension assembly of the vehicle of FIG. 1.

Referring to FIGS. 69-77, the embodiment of FIG. 61 is illustrated with the rear suspension assembly 326 in various positions through the travel of the rear suspension assembly 326 (i.e., through travel of the shock absorber 348 in loaded, unloaded, and partially loaded conditions). FIGS. 69-73 show views of the rear suspension assembly 326 through its travel from a frontal view, and FIGS. 74-77 show views of the rear suspension assembly 326 through its travel from a top view. The position of the rear suspension assembly 326 of FIG. 69 corresponds with the position of the rear suspension assembly 326 of FIG. 74, the position of the rear suspension assembly 326 of FIG. 70 corresponds with the position of the rear suspension assembly 326 of FIG. 75, the position of the rear suspension assembly 326 of FIG. 71 corresponds with the position of the rear suspension assembly 326 of FIG. 76, the position of the rear suspension assembly 326 of FIG. 72 corresponds with the position of the rear suspension assembly 326 of FIG. 77. Although the frame assembly 20 is not shown in these figures, it is understood that the coupling positions of the rear suspension assembly 326 to the frame assembly 20 (e.g., coupling position 343, first coupler 358, and second coupler 376) represent the correct positions of the couplings (e.g., those positions are substantially static) and the rear suspension assembly 326 moves with respect to the frame assembly 20.

Figure 69:
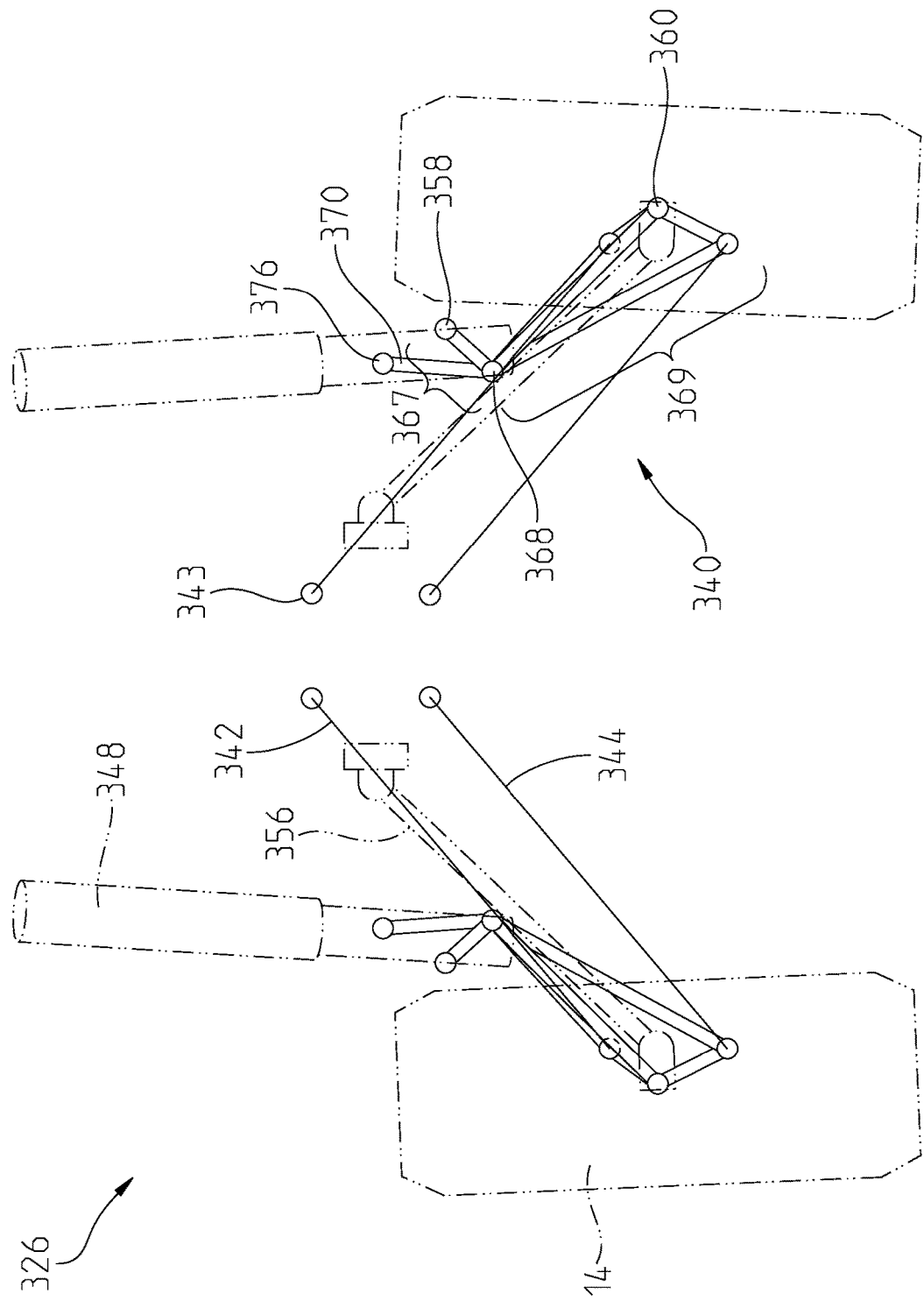
FIGS. 69-73 are front views of the rear suspension assembly of FIG. 61 illustrated throughout varying loading configurations of the rear suspension assembly.
Figure 70:
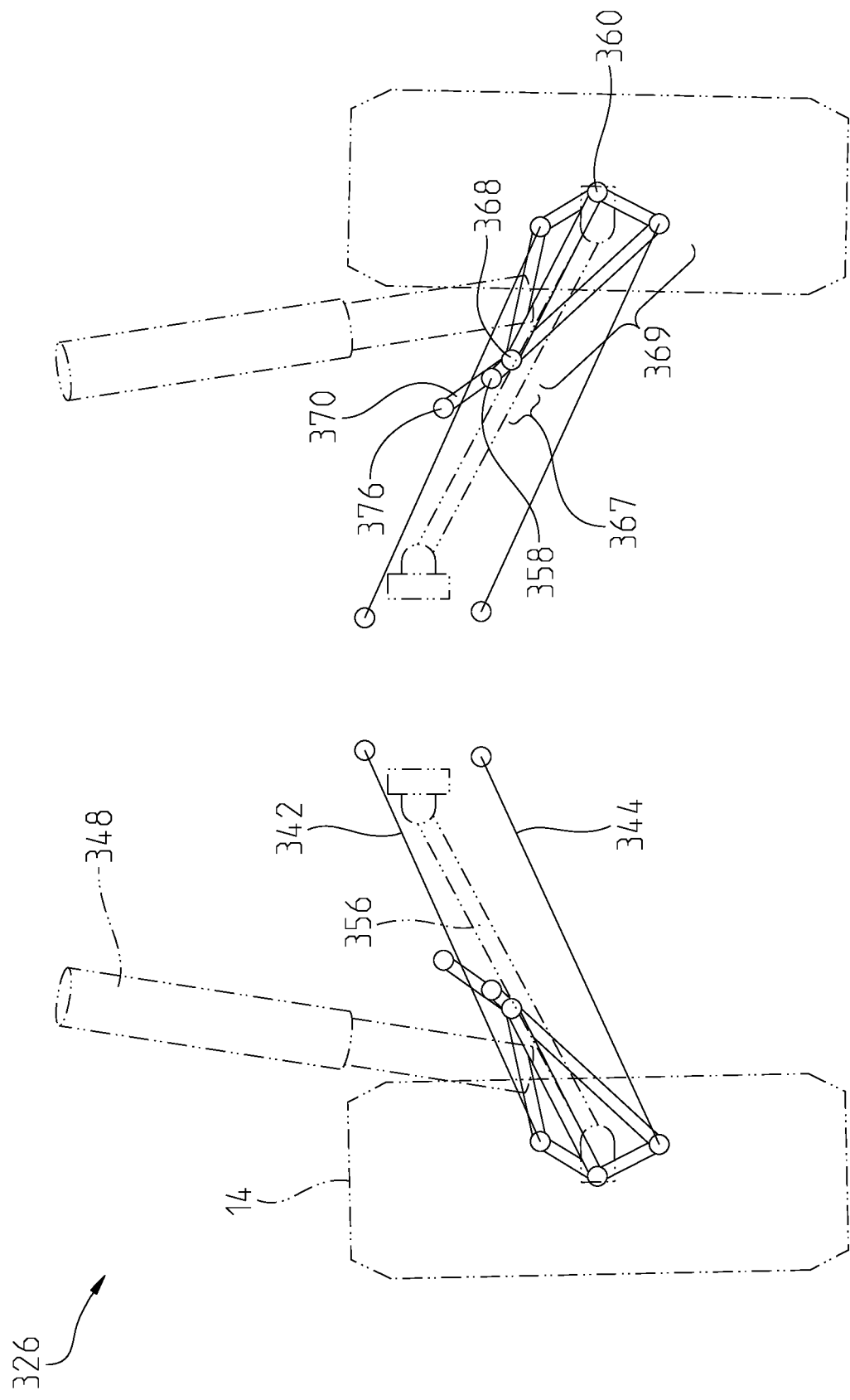
Figure 71:
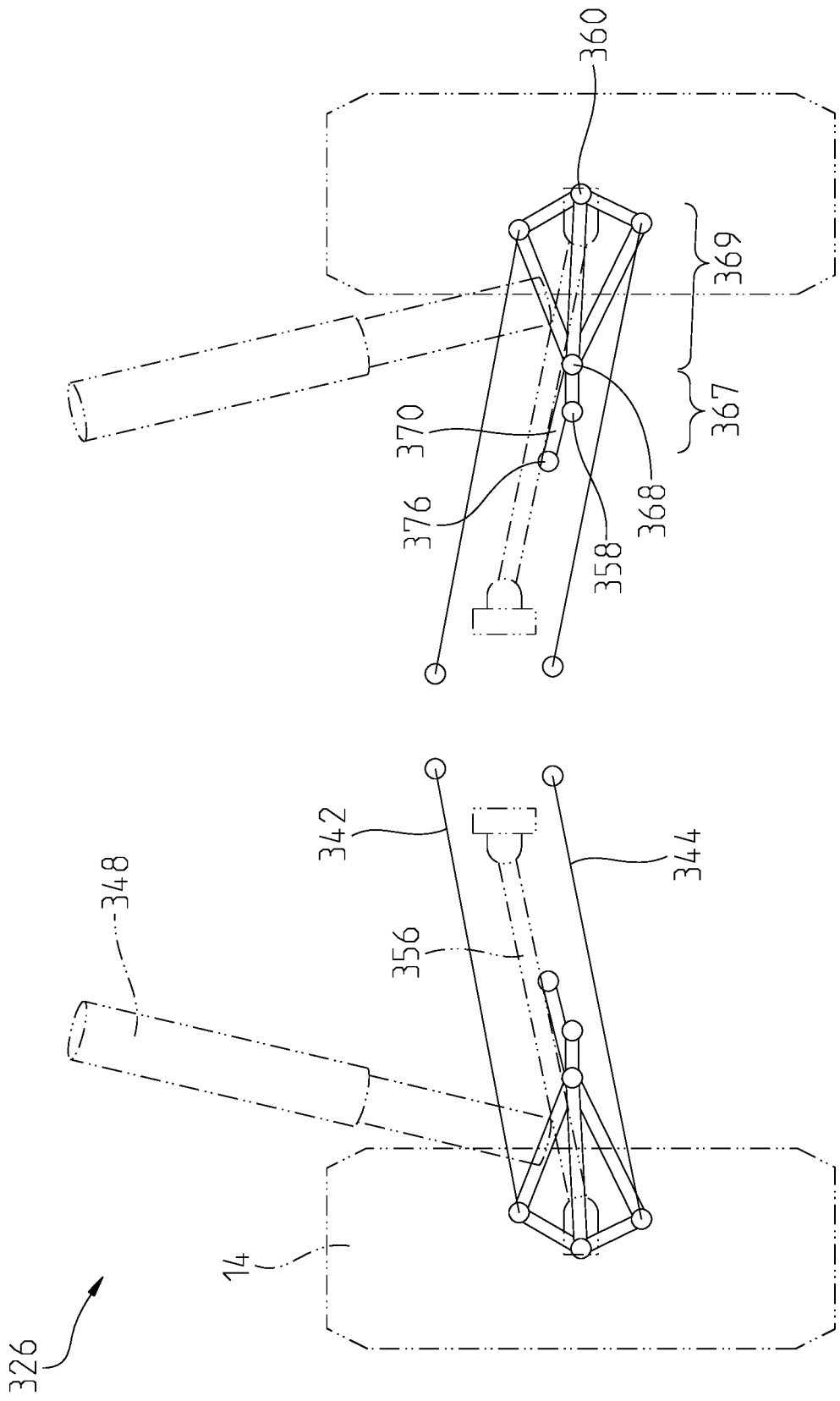
Figure 72:
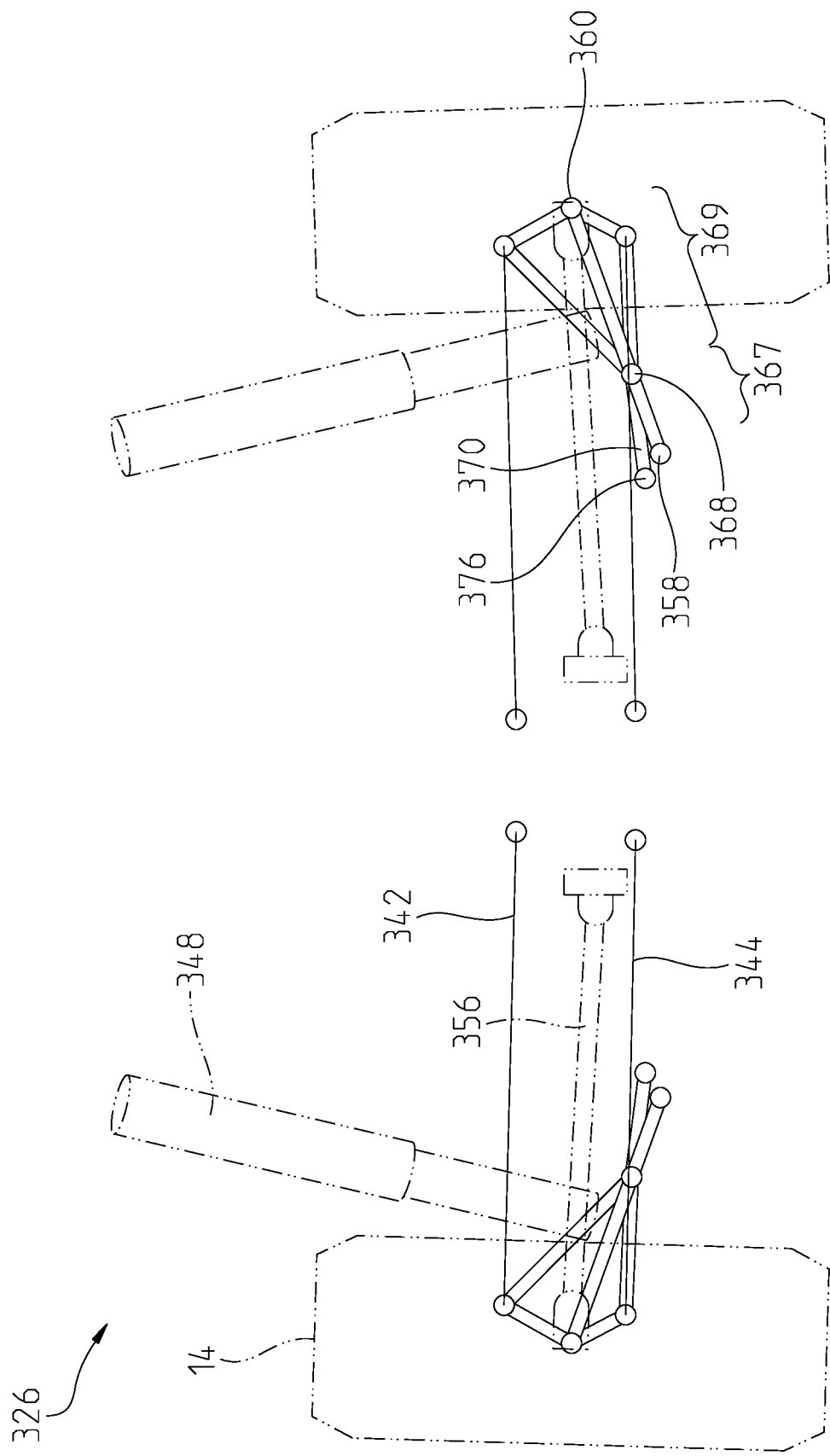
Figure 73:
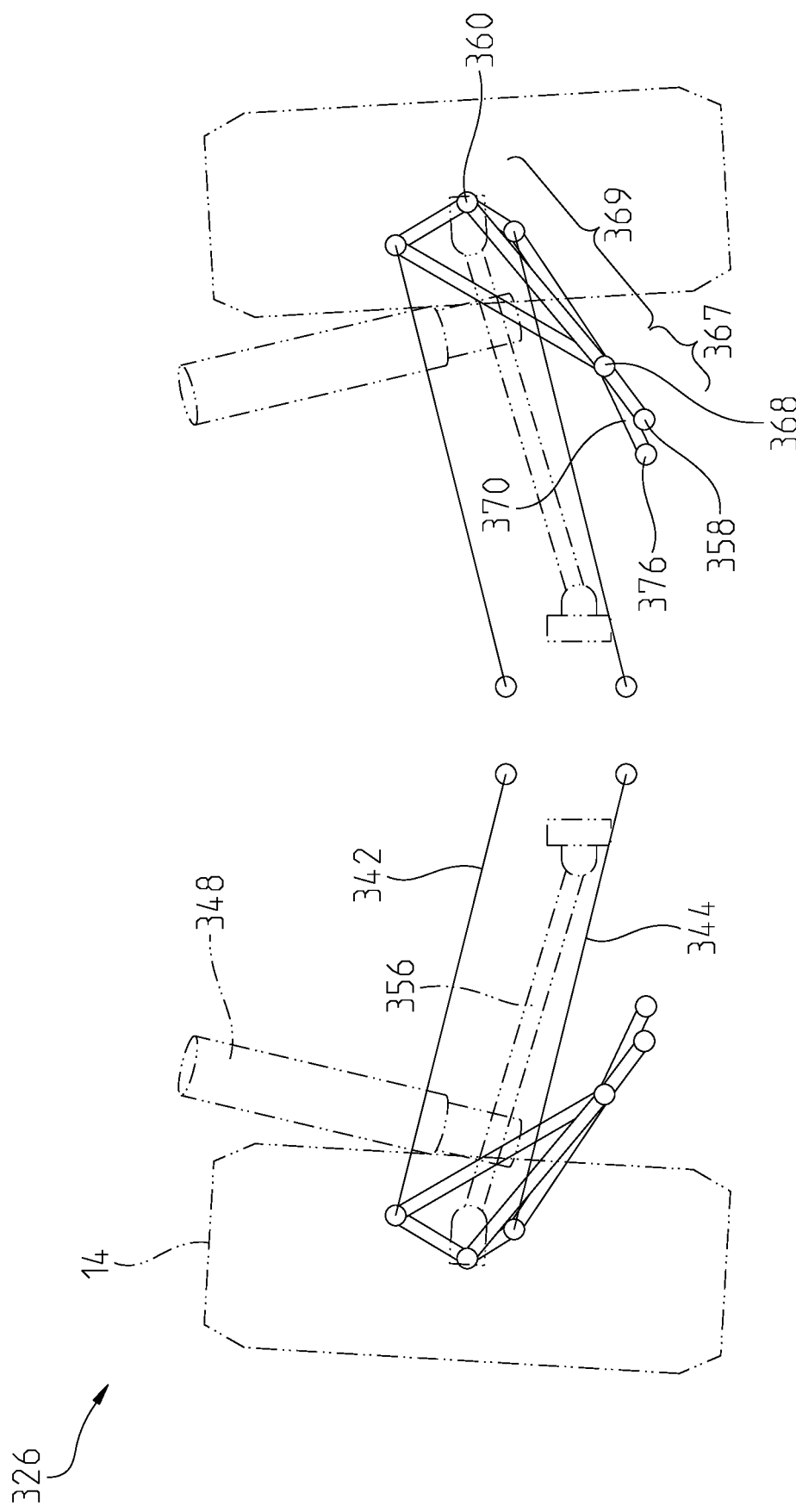
Figure 74:
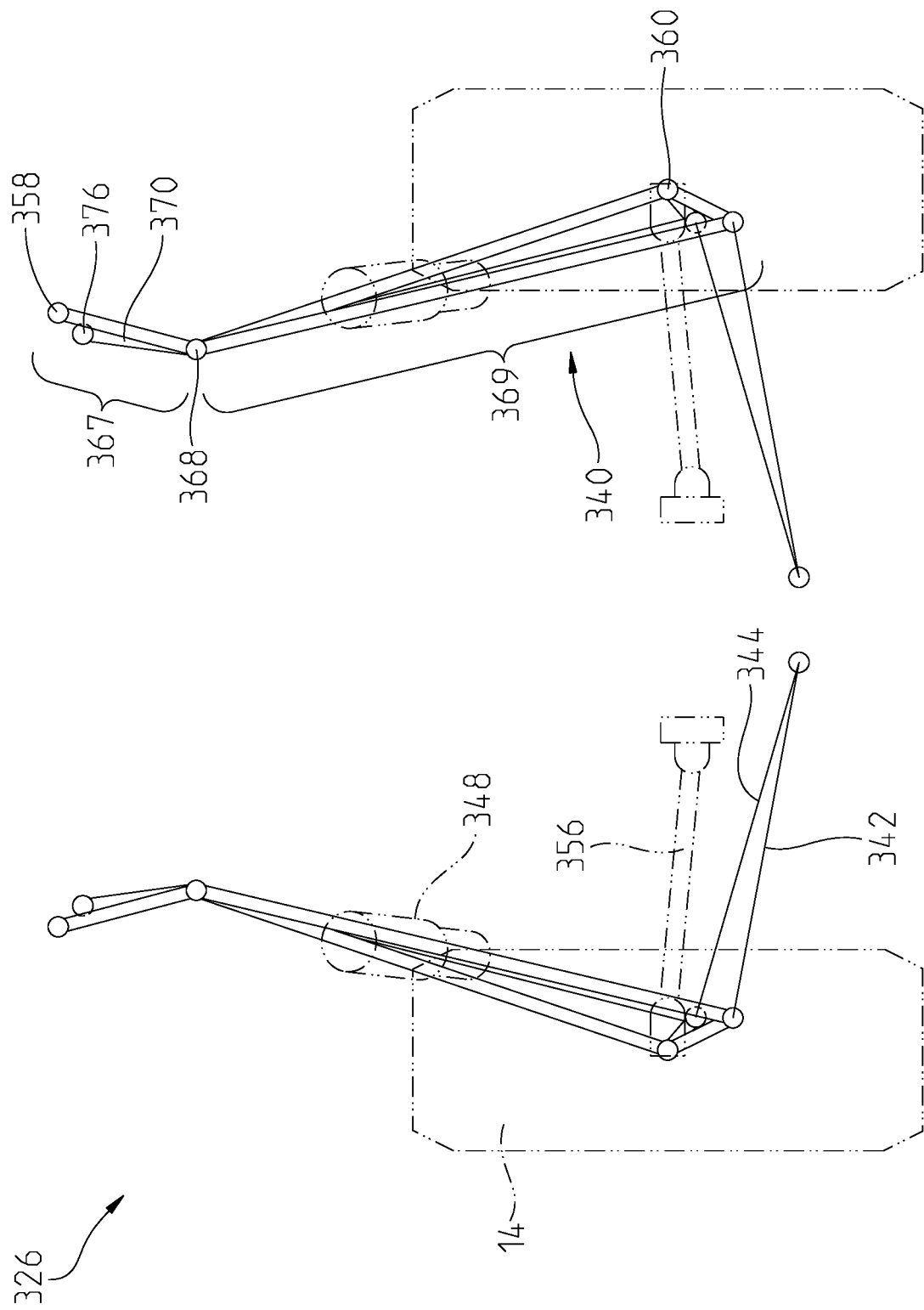
FIGS. 74-77 are top views of the rear suspension assembly of FIG. 61 illustrated throughout varying loading configurations of the rear suspension assembly.
Figure 75:
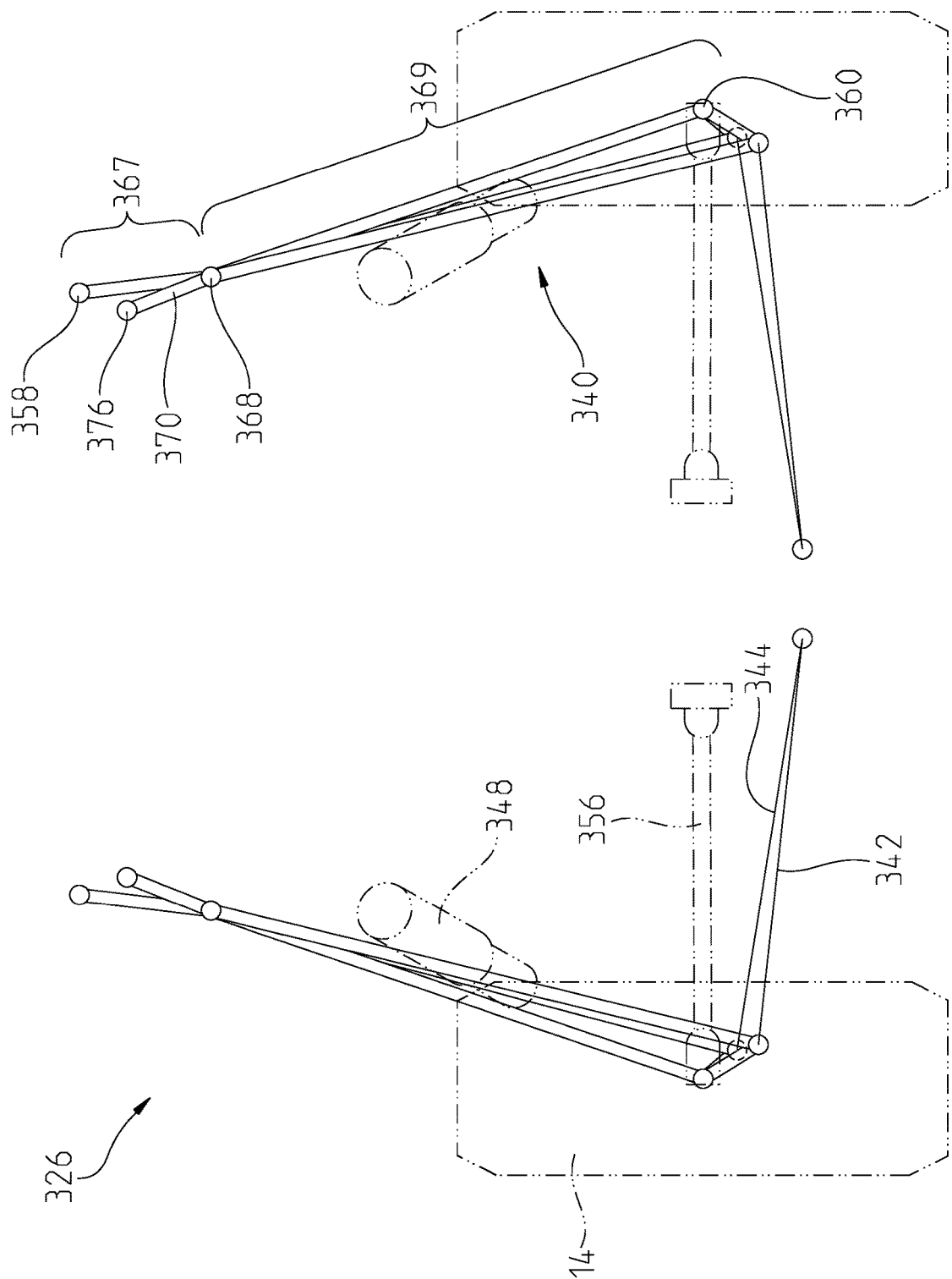
Figure 76:
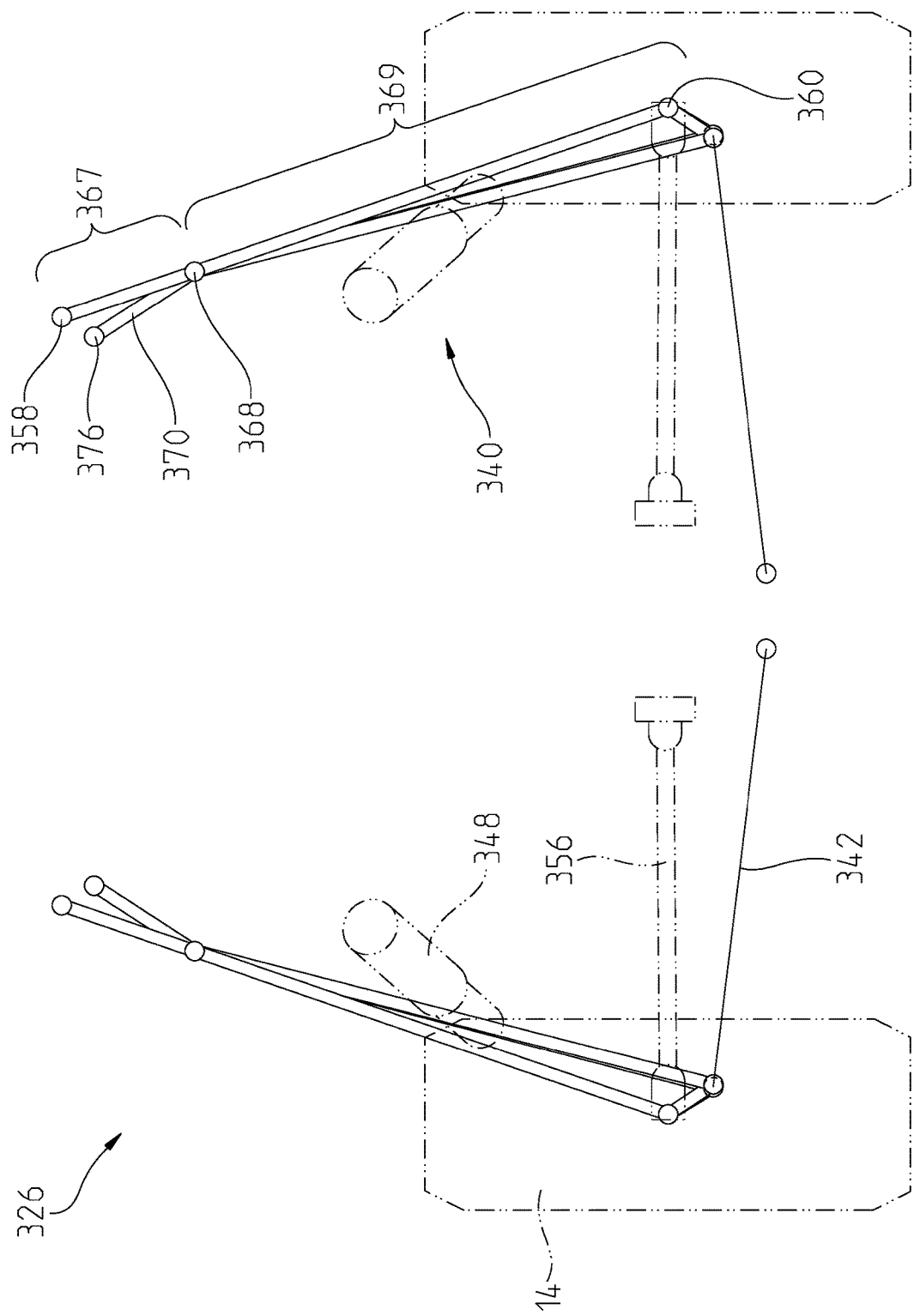
Figure 77:
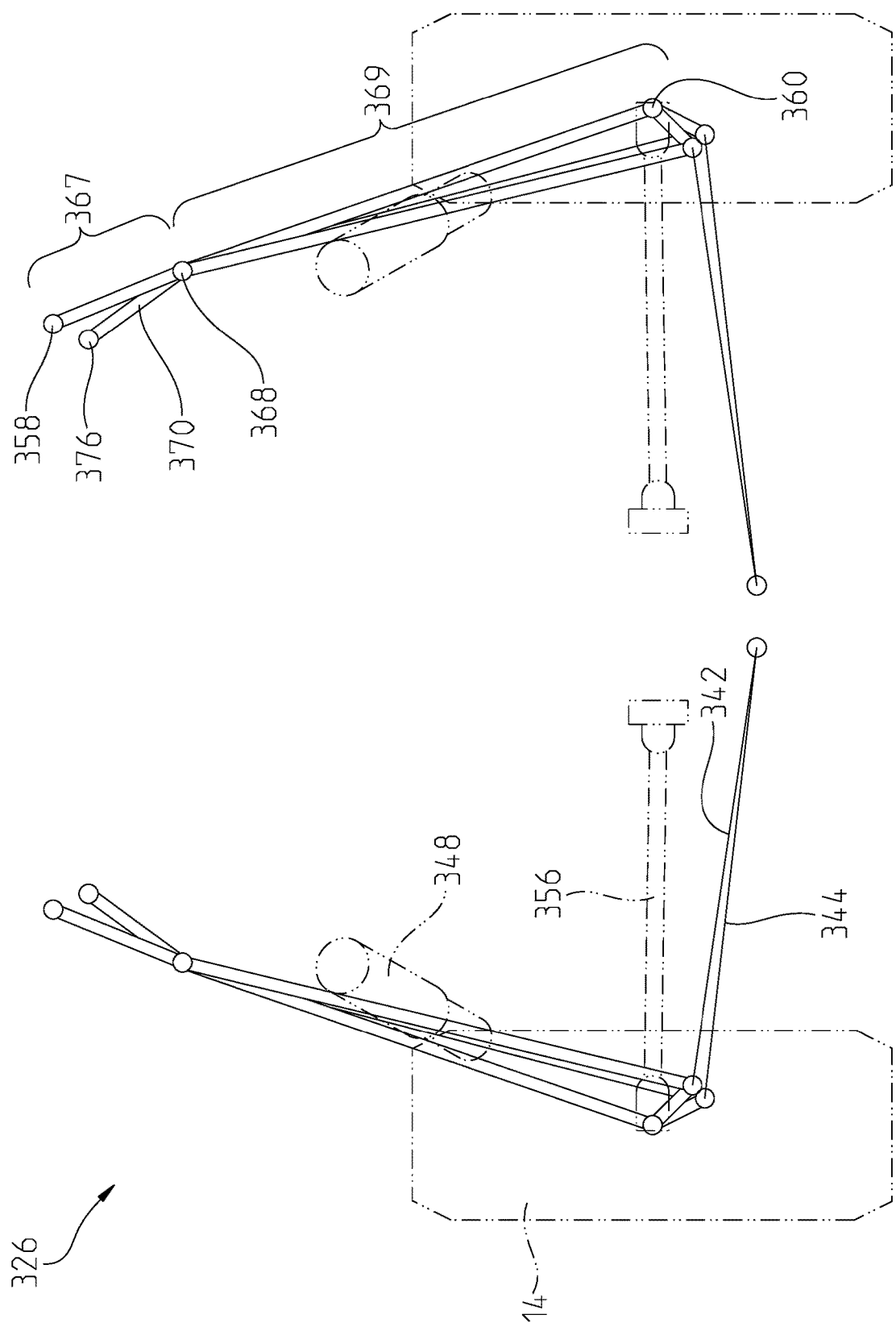

FIGS. 69 and 74 illustrate the rear suspension assembly 326 in a substantially unloaded state. As discussed, the coupling positions at which the rear suspension assembly 326 is coupled to the frame assembly 20 are substantially static. The toe of the rear ground-engaging members 14 is generally neutral or zero (or at a predetermined toe such as plus or minus three degrees) when the rear suspension assembly 326 is in a substantially unloaded state. The joint 368 between the first and second longitudinal portions 367, 369 of the trailing arm 340 allows the second longitudinal portion 369 to have a substantially fixed configuration relative to the rear ground-engaging member 14 while the first longitudinal portion 367 pivots generally laterally at the joint 368 and relative to the first coupler 358 to adjust for positional adjustment of other components of the rear suspension assembly 326. This pivoting and moving of the first longitudinal portion 367 can be appreciated in the remaining FIGS., as well as a progression of the rear suspension assembly 326 through loading of the rear suspension assembly 326 until the rear suspension assembly 326.

As the suspension is loaded, the suspension member 370 pivots relative to the frame assembly 20 and the trailing arm 340 in order to constrain the trailing arm 340 in a configuration that maintains the rear ground-engaging member 14 in a neutral toe configuration (or at a predetermined toe such as plus or minus three degrees) while permitting the remaining components of the rear suspension assembly 326 to pivot and move as appropriate to travel during loading and unloading. The relative positioning of the coupling positions (e.g., the joint 368, the first coupler 374 of the suspension member 370, and the coupling of the shock absorber 348 to the trailing arm 340) is operable to adjust the sensitivity of the toe control of suspension member 370. As mentioned, the relative position of the second coupler 376 relative to the coupling position 343 of the first radius rod 342 and the first coupler 358 of the trailing arm 340 is operable to adjust the sensitivity of the toe control of suspension member 370. It is noted that in some embodiments, the toe of the rear ground-engaging member 14 may not be such that the rear ground-engaging member 14 are exactly parallel to each other, however, the toe of the rear ground-engaging members 14 is constrained to less than five degrees off-axis of the desired longitudinal axis of the rear ground-engaging members 14 as the rear suspension assembly 326 travels through varying levels of loading (e.g., compression and decompression of the shock absorbers 348).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a frame assembly extending longitudinally along a centerline of the utility vehicle;
at least one front ground-engaging member supporting the frame assembly;
at least one rear ground-engaging member supporting the frame assembly; and
a rear suspension assembly operably coupled to the frame assembly and the at least one rear ground-engaging member, the rear suspension assembly comprising:
a trailing arm generally extending longitudinally and operably coupled to the frame assembly and the at least one rear ground-engaging member, the trailing arm including a joint along a longitudinal length of the trailing arm;
an upper radius rod extending in a generally lateral direction relative to the centerline of the utility vehicle and operably coupled to the trailing arm;
a lower radius rod extending in the generally lateral direction relative to the centerline of the utility vehicle and operably coupled to the trailing arm; and
a suspension member configured to control toe of the at least one rear ground-engaging member and operably coupled to the trailing arm and to the frame assembly, the suspension member including a forward end and a rearward end, the forward end being coupled to the trailing arm forward of a knuckle of the utility vehicle.

2. The utility vehicle of claim 1, wherein the suspension member is operably coupled to the trailing arm forward of the joint.

3. The utility vehicle of claim 1, wherein the suspension member is operably coupled to the trailing arm rearward of the joint.

4. The utility vehicle of claim 1, wherein the suspension member includes a first link positioned at least partially forward of a longitudinal midpoint of the at least one rear ground-engaging member and a second link positioned at least partially rearward of the longitudinal midpoint of the at least one rear ground-engaging member, the suspension member being coupled to the first link forward of the longitudinal midpoint of the at least one rear ground-engaging member.

5. The utility vehicle of claim 1, wherein the suspension member is operably coupled to the trailing arm at the joint.

6. The utility vehicle of claim 1, wherein the joint includes one degree of freedom.

7. The utility vehicle of claim 6, wherein the joint includes a substantially vertical axis of rotation.

8. The utility vehicle of claim 1, wherein the rear suspension assembly includes a shock absorber having an upper end operably coupled to the frame assembly and a lower end operably coupled to the trailing arm rearward of the joint.

9. A utility vehicle, comprising:
a frame assembly extending longitudinally along a centerline of the utility vehicle;
at least one front ground-engaging member supporting the frame assembly;
at least one rear ground-engaging member supporting the frame assembly; and
a rear suspension assembly operably coupled to the frame assembly and the at least one rear ground-engaging member, the rear suspension assembly comprising:
a trailing arm generally extending longitudinally and including a front end operably coupled to the frame assembly and a rear end operably coupled to the at least one rear ground-engaging member;
a shock absorber coupled to the trailing arm and to the frame assembly;
an upper radius rod extending in a generally lateral direction relative to the centerline of the utility vehicle and including an outside end operably coupled to the trailing arm and an inside end extending toward the centerline of the utility vehicle;
a lower radius rod extending in the generally lateral direction relative to the centerline of the utility vehicle and operably coupled to the trailing arm; and
a suspension member configured to control toe of the at least one rear ground-engaging member and operably coupled to the trailing arm at a position forward of a position at which the shock absorber is coupled to the trailing arm.

10. The utility vehicle of claim 9, wherein a distance between a position at which the suspension member is coupled to the frame assembly and a nearest point on a plane P is about 1:12 of a distance from the front end of the trailing arm and an inner end of the upper radius rod which define the plane P.

11. The utility vehicle of claim 9, wherein the trailing arm includes a first longitudinal portion and a second longitudinal portion, the first longitudinal portion and second longitudinal portion are pivotable relative to each other at a joint.

12. The utility vehicle of claim 11, wherein the joint includes one degree of freedom.

13. The utility vehicle of claim 12, wherein the joint defines a substantially vertical pivot axis.

14. The utility vehicle of claim 11, wherein the suspension member is coupled to the first longitudinal portion of the trailing arm.

15. The utility vehicle of claim 11, wherein the suspension member is coupled to the second longitudinal portion of the trailing arm.

16. The utility vehicle of claim 11, wherein the suspension member includes a first link positioned at least partially forward of a longitudinal midpoint of the at least one rear ground-engaging member and a second link positioned at least partially rearward of the longitudinal midpoint of the at least one rear ground-engaging member, the suspension member being coupled to the first link forward of the longitudinal midpoint of the at least one rear ground-engaging member.

17. The utility vehicle of claim 11, wherein the suspension member is coupled to the trailing arm at the joint.

18. The utility vehicle of claim 9, wherein at least one rear ground-engaging member includes a knuckle, the trailing arm and the upper radius rod and lower radius rod being coupled to the knuckle.

19. The utility vehicle of claim 9, wherein a second longitudinal portion of the trailing arm is angled relative to the centerline of the utility vehicle at a fixed angle and the rear suspension assembly is operable to maintain the second longitudinal portion at the fixed angle relative to the centerline of the utility vehicle through travel of the rear suspension assembly.

* * * * *